(12) United States Patent
Gan et al.

(10) Patent No.: US 12,454,545 B2
(45) Date of Patent: Oct. 28, 2025

(54) METHOD FOR PREPARING CHOLESTEROL, DERIVATIVE THEREOF, AND ANALOG THEREOF

(71) Applicant: HUNAN KEREY PHARMACEUTICAL CO., LTD, Hunan (CN)

(72) Inventors: Hongxing Gan, Hunan (CN); Laibin Xie, Hunan (CN); Xiangxin Yang, Hunan (CN)

(73) Assignee: HUNAN KEREY PHARMACEUTICAL CO., LTD, Hunan (CN)

( * ) Notice: Subject to any disclaimer, the term of this patent is extended or adjusted under 35 U.S.C. 154(b) by 992 days.

(21) Appl. No.: 17/617,956

(22) PCT Filed: Dec. 16, 2020

(86) PCT No.: PCT/CN2020/136678
§ 371 (c)(1),
(2) Date: Dec. 10, 2021

(87) PCT Pub. No.: WO2021/121239
PCT Pub. Date: Jun. 24, 2021

(65) Prior Publication Data
US 2022/0315620 A1    Oct. 6, 2022

(30) Foreign Application Priority Data

Dec. 19, 2019  (WO) ............... PCT/CN2019/126744

(51) Int. Cl.
*C07J 9/00*    (2006.01)
(52) U.S. Cl.
CPC ..................... *C07J 9/00* (2013.01)
(58) Field of Classification Search
CPC .......................................... C07J 9/00
See application file for complete search history.

(56) References Cited

U.S. PATENT DOCUMENTS 3,801,607 A * 4/1974 Goffinet ............. C07J 9/00
                                                   552/546

FOREIGN PATENT DOCUMENTS

| CN | 1772760 A | 5/2006 |
|---|---|---|
| CN | 100494149 C | 6/2009 |
| CN | 102030794 B | 7/2013 |
| CN | 105218610 A | 1/2016 |
| CN | 105237603 A | 1/2016 |
| CN | 105669813 A | 6/2016 |
| CN | 104910231 B | 8/2016 |
| CN | 105886418 A | 8/2016 |
| CN | 106632565 A | 5/2017 |
| CN | 106831921 A | 6/2017 |
| CN | 106854630 A | 6/2017 |
| CN | 106866772 A | 6/2017 |
| CN | 108640961 A | 10/2018 |
| CN | 109021059 A | 12/2018 |
| CN | 109180766 A | 1/2019 |
| EP | 0594229 A1 | 4/1994 |
| JP | S61227592 A | 10/1986 |
| WO | 2019105914 A1 | 6/2019 |

OTHER PUBLICATIONS

Larry D. Gruenke and J. Cymerman Craig. "The Synthesis of CHOLESTEROL-2, 2, 4, 4, 6-d5" «Journal of Labelled Compounds and Radiopharmaceuticals»,vol. XVI, No. 3, Dec. 31, 1978, ISSN: 0362-4803, pp. 495-500.
J. T. Edward and N. E. Lawson. "The Conversion of Cholesterol into 10α-Cholesterol" «The Journal of Organic Chemistry» , vol. 35, No. 5, Dec. 31, 1969, ISSN: 0022-3263,pp. 1426-1430.
Fujimoto, G. I. et al. "A Preparation of ß-Sitosterol" «The Journal of Organic Chemistry» , vol. 29, No. 11, Dec. 31, 1964, ISSN: 0022-3263,pp. 3377-3381.
Kurath, P.: Capezzuto, Margaret. "A Method for the Synthesis of C21-Labeled Cholesterol", Journal of the American Chemical Society, Dec. 31, 1956, ISSN: 0002-7863, pp. 3527-3529.
International Search Report for PCT/CN2019/126744 mailed on Aug. 25, 2020, ISA/CN.
International Search Report for PCT/CN2020/136678 mailed Mar. 17, 2021, ISA/CN.
Seok Si Toh et al., Improved methods in the synthesis of 1α-hydroxylated vitaminD,Steroids, vol. 56, No. 1, Jan. 31, 1991.
Lutfun Nahar et al., Synthesis of 3β,6α-dihydroxy-5α-cholan-23-one, Tetrahedron, vol. 59, No. 43, Sep. 30, 2003. pp. 8623-8628.
Kurt Schonauer et al., Synthese des 7,8-Didehydrodesmosterols, Liebigs Ann. Chem., No. 6, Jun. 15, 1983, pp. 1031-1042.
Masuo Morisaki et al., Studies on steroids LXIII. Synthesis of cholesterol analogs with a modified side chain, Chem. Pharm.Bull., vol. 28, No. 2, Dec. 31, 1980,pp. 606-611.
Disclosed Anonymously. Reduction of 3-ketosteroids, IP.com, vol. 13, No. 11B, Nov. 14, 2013.
Nakagawa, Yasuo et al. "Axial Hydrogen at C7 Position and Bumpy Tetracyclic Core Markedly Reduce Sterol's Affinity to Amphotericin B in Membrane" «Biochemistry» , vol. 54, No. 2, Dec. 31, 2015, ISSN: 0006-2960,p. S7.
Dauben, W. G. et al. "The preparation of Δ5, 7-steroidal dienes", Journal of the American Chemical Society, Dec. 31, 1953, ISSN: 0002-7863,pp. 3255-3256.

(Continued)

*Primary Examiner* — Erich A Leeser
(74) *Attorney, Agent, or Firm* — Yue (Robert) Xu; Apex Attorneys at Law, LLP

(57) ABSTRACT

The present invention relates to the field of pharmaceutical chemistry, and specifically to a method for preparing cholesterol, a derivative thereof, and an analog thereof. The derivative of cholesterol comprises, but is not limited to, 7-dehydrocholesterol, 25-hydroxycholesterol, 25-hydroxy-7-dehydrocholesterol, and ergosterol. In the present invention, a compound represented by formula I can be prepared by means of a microbial transformation using phytosterols as a raw material, followed by preparing cholesterol, the derivative thereof, and the analog thereof.

7 Claims, No Drawings

(56) References Cited

OTHER PUBLICATIONS

John M. Wetzel et al. "Diversity in Steroidogenesis of Symbiotic Microorganisms From Planthoppers" «Journal of Chemical Ecology», vol. 18, No. 11, Dec. 31, 1992, ISSN:0098-0331,p. 2088.
Yuan, Sun Shine. "Synthesis of 3, 4-13C2 steroids" «Steroids» , vol. 39, No. 3, Dec. 31, 1982,ISSN: 0039-128X, p. 280.
Ray, Rahul; Holick, Michael F. "Synthesis of [3α-3H]vitamin D3 and 1α, 25-dihydroxy[1β-3H]vitamin D3" «Methods in Enzymology» , vol. 282, Dec. 31, 1997, ISSN: 0076-6879,p. 158.
Zhong Qi Wang et al., Chemistry of Hyodeoxycholic Acid 5. Concise Synthesis of 25-Hydroxycholesterol From Hyodeoxycholic Acid, A Key Intermediate of 25-Hydroxyvitamin D3, Chin. Chem. Lett., 1992, vol. 3, No. 6,p. 409.
Edward J. Parish et al.,Remote Functionalization of the Cholestane Side-chain by Chromyl Acetates, J. Chem. Research, 1999, p. 708-409.
Alicja Kurek-Tyrlik et al., Synthesis of 17-epi-Calcitriol from a Common Androstane Derivative, Involving the Ring B Photochemical Opening and the Intermediate Triene Ozonolysis, Journal of Organic Chemistry, 2005, 70(21), 8513-8521.
Alicja Kurek-Tyrlik et al., A synthesis of 17-epi-calcidiol, Tetrahedron Letters, 2004, 45 (40), 7479-7482.
Miyamoto Katsuhito et al: "Synthetic Studies on Vitamin D Analogues VI. A New Synthesis of 25 Hydroxycholesterol from Lithocholic Acid", Synthetic Communications, vol. 16, No. 5, Apr. 1, 1986 (Apr. 1, 1986), pp. 513-521, XP055969094, US, ISSN: 0039-7911, DOI: 10.1080/00397918608078765 Retrieved from the Internet: URL:http://dx.doi.org/10.1080/003979186080 78765>.
Nagai Toshiya et al: "Synthesis of 3[beta]-tert-Butyldimethylsiloxy-22-phenylthio-23,24-bisnorchola-5,9(11)-diene and Reductive Nucleophilic Attack on a Branched Aliphatic Aldehyde", Chemical and Pharmaceutical Bulletin, vol. 66, No. 3,Jan. 1, 2018 (Jan. 1, 2018), pp. 334-338, KP055969050,JP, ISSN: 0009-2363, DOI:10.1248/cpb.C17-00979.
European Search Report issued on Oct. 18, 2022 for EP20902848.9.
The Japanese 1st Office Action mailed on Jan. 17, 2023 for JP2021-575975.
Mickael Denance et al.,Short synthesis of 16β-hydroxy-5α-cholestane-3,6-dione a novel cytotoxic marine oxysterol, steroids 71 (2006)599-602, journal homepage: www.elsevier.com/locate/steroids.
Madimir A. Khripach et al, Preparation of (25R)- and (25S)-26-functionalized steroids as tools for biosynthetic studies of cholic acids, Steroids 70 (2005) 551-562.

* cited by examiner

METHOD FOR PREPARING CHOLESTEROL, DERIVATIVE THEREOF, AND ANALOG THEREOF

This application is the national phase of International Application No. PCT/CN2020/136678, titled "METHOD FOR PREPARING CHOLESTEROL, DERIVATIVE THEREOF, AND ANALOG THEREOF", filed on Dec. 16, 2020, which claims the priority to a PCT Patent Application with an international application number of PCT/CN2019/126744, titled "METHOD FOR PREPARING CHOLESTEROL, DERIVATIVE AND ANALOGUE THEREOF", filed on Dec. 19, 2019 with the China National Intellectual Property Administration, which is incorporated herein by reference in entirety.

FIELD

The present disclosure relates to the field of medicinal chemistry, and specifically to a method for preparing cholesterol, a derivative thereof, and an analog thereof. Cholesterol derivatives include but are not limited to 7-dehydrocholesterol, 25-hydroxycholesterol, 25-hydroxy-7-dehydrocholesterol, and ergosterol.

BACKGROUND

Steroid is a derivative of cyclopentane polyhydrophenanthrene, and its basic structure contains rings A, B, C and D as shown in the figure below.

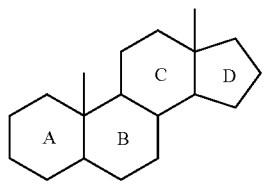

Cholesterol is an important steroid compound, widely found in animals. It is not only involved in the formation of cell membranes, but also is the raw material for the synthesis of bile acids, 7-dehydrocholesterol and many steroid hormones in the body. 7-dehydrocholesterol is converted into vitamin D3 by ultraviolet radiation.

One of the metabolites of vitamin D3 in the liver is 25-hydroxyvitamin D3, which is several times more effective than vitamin D3. 25-hydroxy-7-dehydrocholesterol, a derivative of 7-dehydrocholesterol, can be used in the industrial synthesis of 25-hydroxyvitamin D3.

Nowadays, the main sources of cholesterol used in the industry are the extraction from animal materials and the semi-synthesis from plant raw materials. The methods of extraction from animal materials (such as CN201811062895.6, CN201810722994.6) have low yield, high purification difficulty, limited raw material sources, and safety risks, such as infection of bovine spongiform encephalopathy and Streptococcus suis disease. The application of semi-synthesis from plant raw materials is limited by the supply and price of plant raw materials. For example, CN1772760A discloses a method for synthesizing cholesterol from diosgenin. CN106632565A and CN105237603A disclose methods for synthesizing cholesterol from stigmasterol.

The main sources of 7-dehydrocholesterol are the extraction from animal subcutaneous tissues and the semi-synthesis from plant raw materials. CN105669813A, CN102030794B, and CN100494149C disclose the following method for synthesizing 7-dehydrocholesterol from cholesterol dehydrogenation, in which the air oxidation method is used and a hydrazone reagent is used.

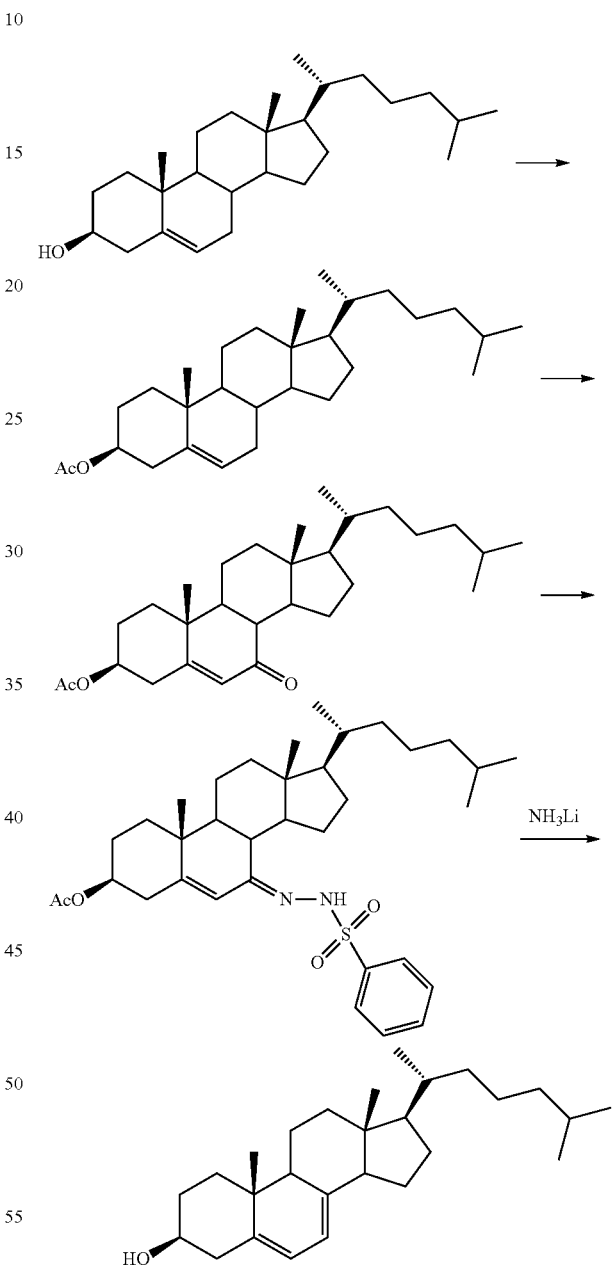

Journal of Organic Chemistry, 2005, 70(21), 8513-8521; Tetrahedron Letters, 2004, 45 (40), 7479-7482 discloses the following method for synthesizing 7-dehydrocholesterol from cholesterol dehydrogenation, in which the bromine substitution-debromination method is used to introduce the 7-double bond.

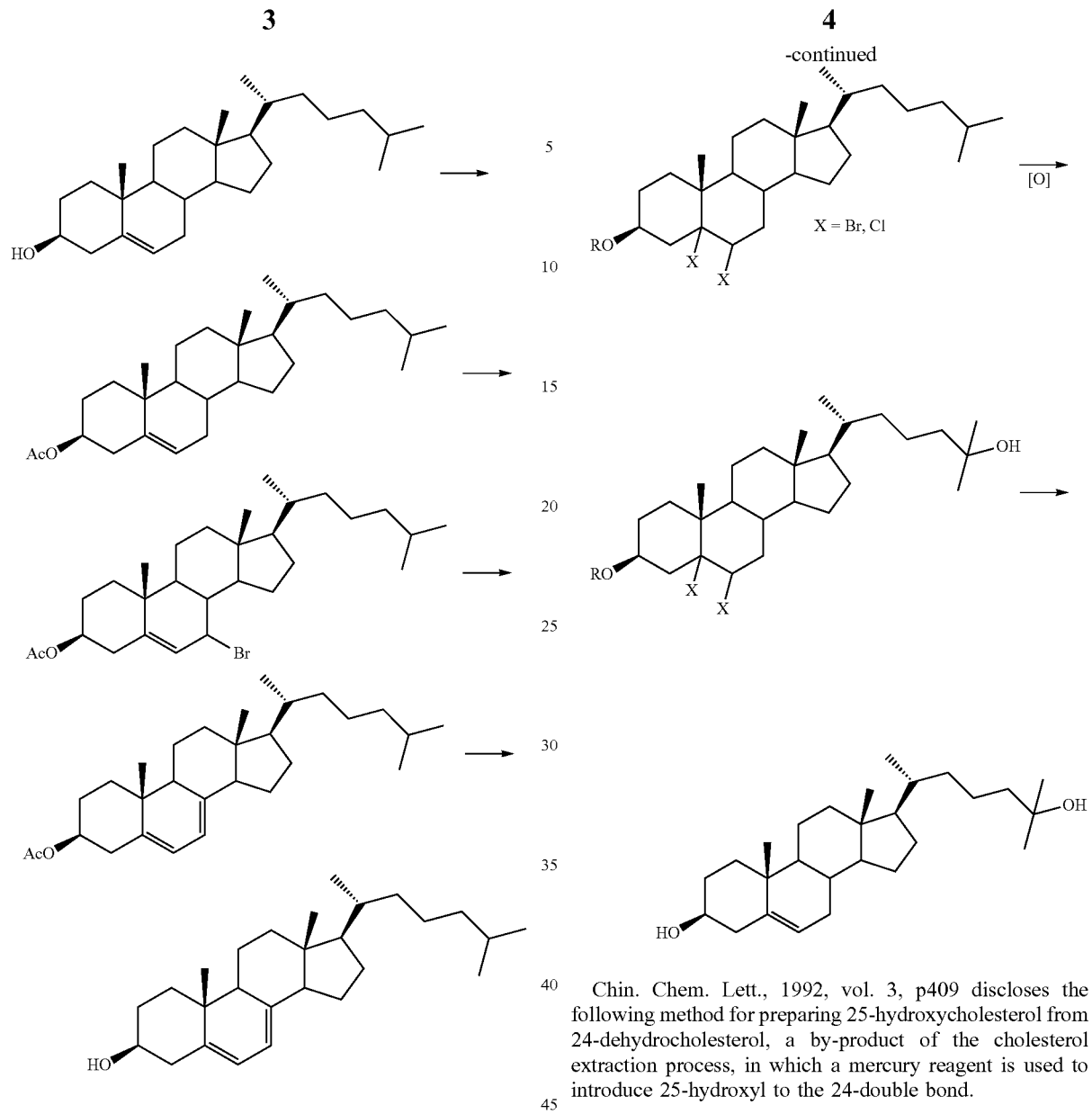

The main sources of 25-hydroxycholesterol and 25-hydroxy-7-dehydrocholesterol are the preparation from cholesterol or cholesterol analogs. EP594229 and J. Chem. Research, 1999, p708 disclose the following method for preparing 25-hydroxycholesterol from cholesterol, in which trifluoroacetone peroxide or chromium trioxide/acetic anhydride is used as an oxidant to introduce 25-hydroxyl.

Chin. Chem. Lett., 1992, vol. 3, p409 discloses the following method for preparing 25-hydroxycholesterol from 24-dehydrocholesterol, a by-product of the cholesterol extraction process, in which a mercury reagent is used to introduce 25-hydroxyl to the 24-double bond.

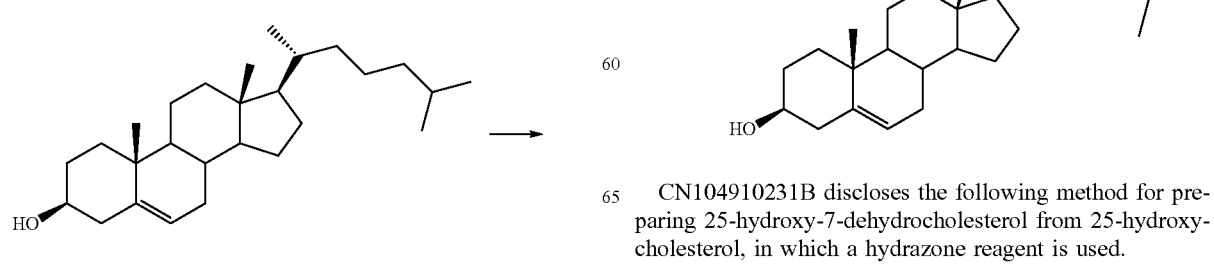

CN104910231B discloses the following method for preparing 25-hydroxy-7-dehydrocholesterol from 25-hydroxycholesterol, in which a hydrazone reagent is used.

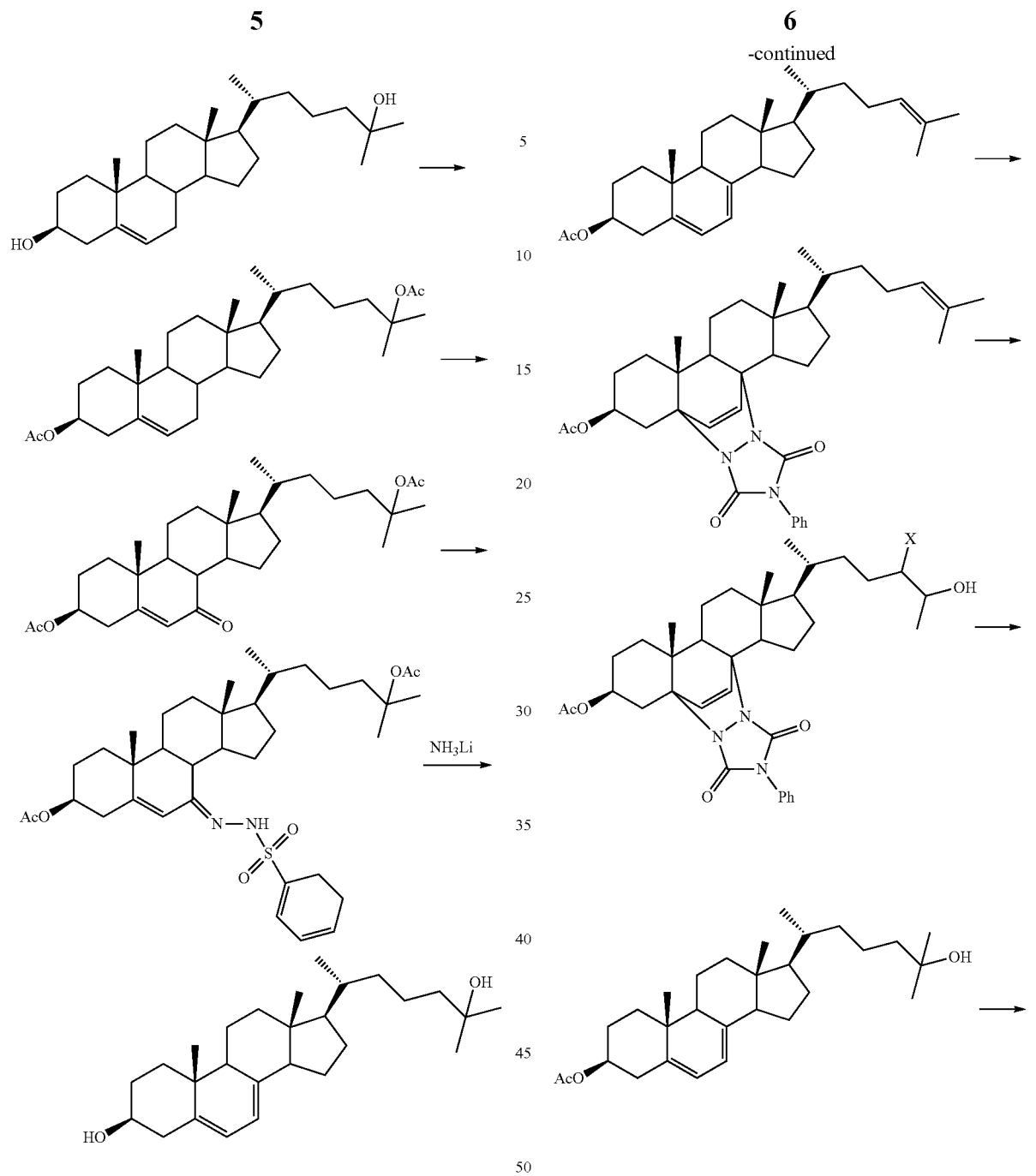
CN106831921A discloses the following method for preparing 25-hydroxy-7-dehydrocholesterol from 5,7,24-triencholesterol, in which Diels-Alder protecting group is used.
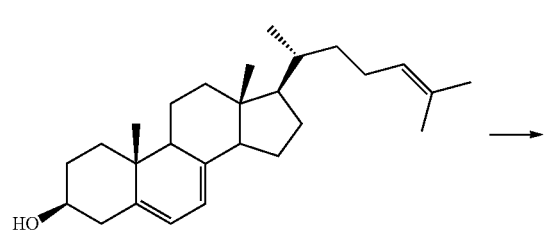
SUMMARY
In one aspect, the present disclosure provides a method for preparing a compound represented by formula III comprising steps (A) and (B), and step (B) comprises step (B-1) or (B-2):

Step (A):

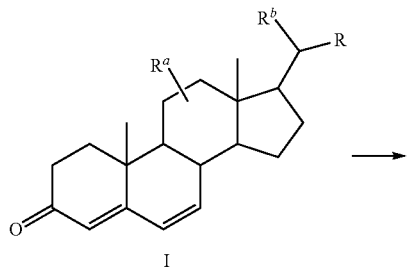

I

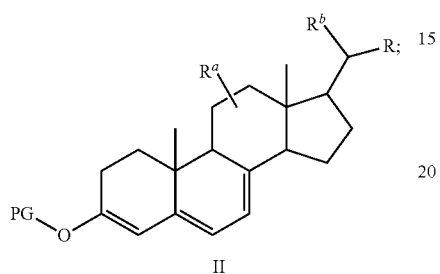

II

Step (B):
Step (B-1):

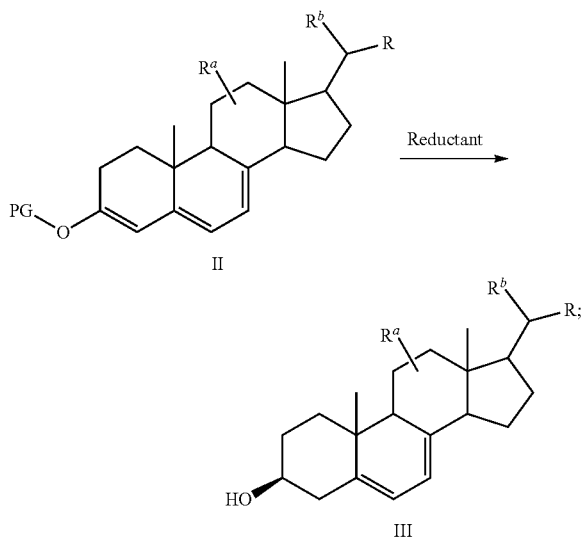

or
Step (B-2):

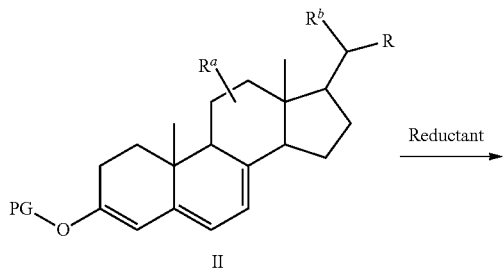

-continued

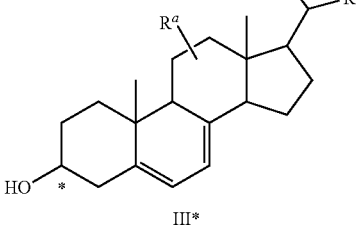

III*

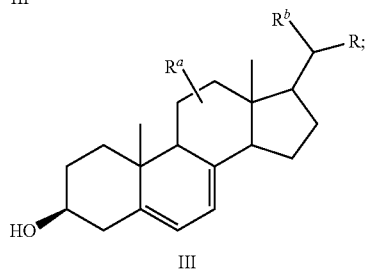

III wherein,

" ︴ " in formula I, formula II, and formula III represents a single bond concurrently, or " ︴ " in formula I, formula II, and formula III represents a double bond concurrently, or " ︴ " in formula I represents a single bond or a double bond, and in formula II and formula III represents a double bond;

$R^a$ and $R^b$ are each independently selected from H, —OH, $C_{1-3}$ alkyl;

PG is a hydroxy protecting group, preferably $C_{1-8}$ silyl, acetyl, trifluoroacetyl, or benzoyl optionally substituted with one or more $C_{1-8}$ alkyl;

R is $L^1$-LG or $L^1$-$R^1$;

$L^1$ is null, or $C_{1-8}$ alkylene;

LG is a leaving group;

$R^1$ is selected from H, $C_{1-8}$ alkyl, $C_{1-8}$ alkenyl, —OH, —O($C_{1-8}$ alkyl), —O-$PG^1$, —C(=O)O($C_{1-8}$ alkyl), —C(=O)N($C_{1-8}$ alkyl)$_2$, wherein the alkyl or alkenyl is optionally substituted with 1, 2 or 3 groups selected from —OH, —O($C_{1-8}$ alkyl), —O-$PG^1$, —C(=O)O($C_{1-8}$ alkyl) and —C(=O)N($C_{1-8}$ alkyl)$_2$;

$PG^1$ is a hydroxyl protecting group, preferably selected from $C_{1-8}$ silyl or a $C_{1-6}$ alkoxy substituted methyl group;

* represents the chiral center.

Specifically, the present disclosure can adopt two methods to prepare a compound represented by formula III. In the first method, AB rings are first constructed and then the side chains are constructed; in the second method, the side chains are first constructed and then AB rings are constructed.

The first method comprises:

Step (1): converting a compound represented by formula ii to a compound represented by formula a;

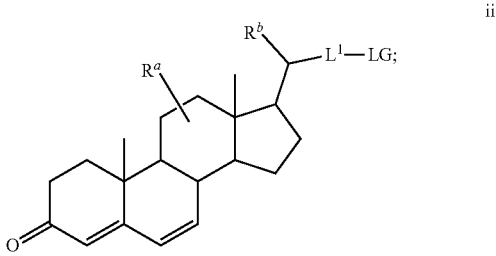

ii

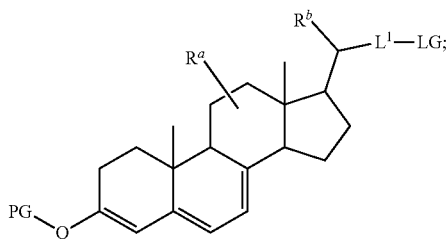

Formula a

Step (2): reducing the compound represented by formula a to a compound represented by formula b under the action of sodium borohydride, calcium chloride and pyridine;

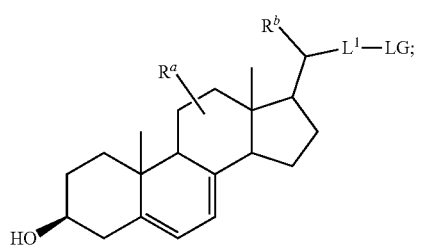

Formula b

Step (3): converting the compound represented by formula b to a compound represented by formula III;

" ~~~~~ ", Ra, Rb, PG, RL1, LG, and R have the same definitions as described above, which will not be repeated here.

The second method comprises:
Step (1): converting a compound represented by formula ii to a compound represented by formula I;
Step (2): converting the compound represented by formula I to a compound represented by formula II;
Step (3): reducing the compound represented by formula II to a compound represented by formula III under the action of sodium borohydride and calcium chloride.
Wherein, " ~~~~~ ", Ra, Rb, PG, RL1, LG, and R have the same definitions as described above, which will not be repeated here.

In a preferred aspect, the structure of the compound represented by formula III is

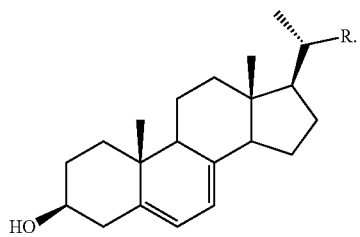

III

In another preferred aspect, the compound represented by formula III is selected from cholesterol, 7-dehydrocholesterol, 25-hydroxycholesterol, 25-hydroxy-7-dehydrocholesterol, derivatives or analogs thereof.

DETAILED DESCRIPTION

Unless otherwise defined, all technical and scientific terms used herein have the same meanings as commonly understood by those of ordinary skill in the art to which the present disclosure belongs. If there is a conflict, the definition provided in this application shall prevail. When a trade name appears herein, it is meant to refer to its corresponding commodity or its active ingredient. All patents, published patent applications and publications cited herein are all incorporated herein by reference.

General Terms and Definitions

Unless otherwise defined, all technical and scientific terms used herein have the same meanings as commonly understood by those of ordinary skill in the art to which the present disclosure belongs. If there is a conflict, the definition provided in this application shall prevail. When a trade name appears herein, it is meant to refer to its corresponding commodity or its active ingredient. All patents, published patent applications and publications cited herein are all incorporated herein by reference.

The term "one or more" or similar expressions "at least one" can mean, for example, 1, 2, 3, 4, 5, 6, 7, 8, 9, 10 or more.

The expression m-n used herein refers to the range of m to n, the sub-range composed of each point value therein, and each point value therein. For example, the expression "$C_1$-$C_8$" or "$C_{1-8}$" covers the range of 1-8 carbon atoms, and should be understood as also covering any sub-range therein and each point value therein, such as $C_2$-$C_5$, $C_3$-$C_4$, $C_1$-$C_2$, $C_1$-$C_3$, $C_1$-$C_4$, $C_1$-$C_5$, $C_1$-$C_6$, $C_1$-$C_7$, etc., and $C_1$, $C_2$, $C_3$, $C_4$, $C_5$, $C_6$, $C_7$, $C_8$, etc. For example, the expression "$C_3$-$C_{10}$" or "$C_{3-10}$" should also be understood in a similar way, for example, it can cover any sub-range therein and point value therein, such as $C_3$-$C_9$, $C_6$-$C_9$, $C_6$-$C_8$, $C_6$-$C_7$, $C_7$-$C_{10}$, $C_7$-$C_9$, $C_7$-$C_8$, $C_8$-$C_9$, etc., and $C_3$, $C_4$, $C_5$, $C_6$, $C_7$, $C_8$, $C_9$, $C_{10}$, etc. For another example, the expression "3- to 10-membered" should be understood as covering any sub-range therein and each point value therein, such as 3- to 5-membered, 3- to 6-membered, 3- to 7-membered, 3- to 8-membered, 4- to 5-membered, 4- to 6-membered, 4- to 7-membered, 4- to 8-membered, 5- to 7-membered, 5- to 8-membered, 6- to 7-membered, 6- to 8-membered, 9- to 10-membered, etc., and 3-membered, 4-membered, 5-membered, 6-membered, 7-membered, 8-membered, 9-membered, 10-membered, etc. Other similar expressions herein should also be understood in a similar way.

The term "alkyl" refers to a linear or branched saturated aliphatic hydrocarbon group composed of carbon atoms and hydrogen atoms, which is attached to the rest of the molecule through a single bond. "Alkyl" can have 1-8 carbon atoms, that is, "$C_{1-8}$ alkyl", such as $C_{1-4}$ alkyl, $C_{1-3}$ alkyl, $C_{1-2}$ alkyl, $C_3$ alkyl, $C_4$ alkyl, $C_{1-6}$ alkyl, and $C_{3-6}$ alkyl. Non limiting examples of alkyl include, but are not limited to, methyl, ethyl, propyl, butyl, pentyl, hexyl, isopropyl, isobutyl, sec-butyl, tert-butyl, isopentyl, 2-methylbutyl, 1-methylbutyl, 1-ethylpropyl, 1,2-dimethylpropyl, neopentyl, 1,1-dimethylpropyl, 4-methylpentyl, 3-methylpentyl, 2-methylpentyl, 1-methylpentyl, 2-ethylbutyl, 1-ethylbutyl, 3,3-dimethylbutyl, 2,2-dimethylbutyl, 1,1-dimethylbutyl, 2,3-dimethylbutyl, 1,3-dimethylbutyl or 1,2-dimethylbutyl, or isomers thereof.

The term "alkylene", when used alone or in combination with other groups herein, refers to a linear or branched saturated divalent hydrocarbon group. For example, the term "$C_{1-6}$ alkylene" refers to an alkylene group having 1-6 carbon atoms, such as $C_{1-5}$ alkylene, $C_{1-4}$ alkylene, $C_{1-3}$ alkylene, $C_{1-2}$ alkylene, $C_3$ alkylene, and $C_1$ alkylene, i.e., methylene. Non-limiting examples of alkylene include, but are not limited to, methylene (—CH$_2$—), 1,1-ethylene (—CH(CH$_3$)—), 1,2-ethylene (—CH$_2$CH$_2$—), 1,1-propylene (—CH(CH$_2$CH$_3$)—), 1,2-propylene (—CH$_2$CH (CH$_3$)—), 1,3-propylene (—CH$_2$CH$_2$CH$_2$—), 1,4-butylene (—CH$_2$CH$_2$CH$_2$CH$_2$—), etc.

The term "alkenyl" refers to a linear or branched unsaturated aliphatic hydrocarbon group composed of carbon atoms and hydrogen atoms, which has at least one double bond. The alkenyl group may have 2-8 carbon atoms, that is, "C$_{2-8}$ alkenyl", such as C$_{2-4}$ alkenyl and C$_{3-4}$ alkenyl. Non-limiting examples of alkenyl include, but are not limited to, vinyl, allyl, (E)-2-methylvinyl, (Z)-2-methylvinyl, (E)-but-2-enyl , (Z)-but-2-enyl, (E)-but-1-enyl, (Z)-but-1-enyl, etc.

The term "alkynyl" refers to a linear or branched unsaturated aliphatic hydrocarbon group composed of carbon atoms and hydrogen atoms, which has at least one triple bond. The alkynyl group may have 2-8 carbon atoms, that is, "C$_{2-8}$ alkynyl", such as C$_{2-4}$ alkynyl and C$_{3-4}$ alkynyl. Non-limiting examples of alkynyl include, but are not limited to, ethynyl, prop-1-ynyl, prop-2-ynyl, but-1-ynyl, but-2-ynyl, but-3-ynyl, etc.

The term "alkoxy" refers to an alkyl group as defined above attached to an oxygen atom by a single bond. The alkoxy group is attached to the rest of the molecule through an oxygen atom. The alkoxy group can be represented as —O(alkyl). "C$_{1-8}$ alkoxy" or "—O(C$_{1-8}$ alkyl)" refers to an alkoxy group containing 1-8 carbon atoms, in which the alkyl moiety can be linear, branched or cyclic. Alkoxy includes, but is not limited to, methoxy, ethoxy, n-propoxy, isopropoxy, n-butoxy, n-pentyloxy, cyclopentyloxy, cyclohexyloxy, etc.

The term "silyl" refers to an alkyl group as defined above in which at least one C atom is substituted with a Si atom. The silyl group is attached to the rest of the molecule through a silicon atom. "C$_{1-8}$ silyl" refers to a silyl group containing 1-8 carbon atoms, in which the alkyl moiety can be linear, branched or cyclic. Silyl includes, but is not limited to, trimethylsilyl (TMS), tert-butyldimethylsilyl (TBS, or referred to as TBDMS), dimethylisopropylsilyl (IPDMS), di-tert-butylmethylsilyl (DTBMS), etc.

The compound of the present disclosure may exist in specific geometric or stereoisomeric forms. The present disclosure contemplates all such compounds, including cis and trans isomers, (−)- and (+)-enantiomers, (R)- and (S)-enantiomers, diastereomer, (D)-isomers, (L)-isomers, and racemic mixtures thereof, as well as other mixtures, such as enantiomer- or diastereomer-enriched mixtures, and all of these mixtures fall within the scope of the present disclosure. The purification and separation of such substances can be achieved by standard techniques known in the art.

The term "hydrocarbon" solvent refers to a solvent of linear, branched or cyclic hydrocarbon having 1-10 carbon atoms. The hydrocarbon can be saturated or unsaturated. Examples of hydrocarbon solvents include, for example, alkane solvents, including but not limited to n-pentane, n-hexane, cyclohexane, n-heptane, octane or a combination thereof, preferably hexane or heptane. Examples of hydrocarbon solvents also include, for example, aromatic hydrocarbon solvents, which contain at least one aromatic ring and are optionally substituted with linear, branched, or cyclic hydrocarbons. Aromatic hydrocarbon solvents include but are not limited to benzene, toluene, xylene or a combination thereof, preferably toluene, toluene or a combination thereof.

The term "halogenated alkane" solvent refers to the alkane solvent mentioned above, of which one or more (e.g. 1-6, 1-5, 1-4, 1-3, or 1-2) hydrogen atoms are substituted with halogen. Those skilled in the art should understand that when there are more than one halogen substituents, the halogens may be the same or different, and may be located on the same or different C atoms. Halogenated alkane solvents include, but are not limited to, dichloromethane, trichloromethane, carbon tetrachloride, 1,2-dichloroethane, hexachloroethane and 1,2,3-trichloropropane, or a combination thereof, preferably dichloromethane, trichloromethane, 1,2-dichloroethane or a combination thereof, preferably dichloromethane, chloroform, dichloroethane and a combination thereof, especially dichloromethane.

The term "alcohol" solvent refers to a solvent of alcohol having 1-10 carbon atoms. Alcohol solvents include, but are not limited to, methanol, ethanol, n-propanol, isopropanol, n-butanol, n-pentanol, cyclohexanol or a combination thereof, preferably methanol, ethanol and a combination thereof.

The term "ester" solvent refers to a solvent of ester having 3-10 carbon atoms. Ester solvents include, but are not limited to, ethyl acetate, propyl acetate, isopropyl acetate, butyl acetate, pentyl acetate or a combination thereof, preferably ethyl acetate, isopropyl acetate, butyl acetate or a combination thereof, especially ethyl acetate.

The term "ether" solvent refers to a solvent of ether having 2-10 carbon atoms. Examples of ether solvents include, but are not limited to, diethyl ether, isopropyl ether, tetrahydrofuran, dimethyltetrahydrofuran, dioxane, ethylene glycol dimethyl ether, methyl tert-butyl ether or a combination thereof, preferably diethyl ether, tetrahydrofuran, dimethyltetrahydrofuran or a combination thereof.

The term "sulfoxide" solvent means dimethyl sulfoxide.

The term "ketone" solvent refers to ketone having 3-8 carbon atoms, examples of which include but are not limited to acetone, 2-butanone, 3-methyl-2-butanone, 4-methyl-2-pentanone or a combination thereof.

As used herein, the term "room temperature" refers to about 10 to 30° C., preferably about 20 to 25° C.

The following detailed description of the present disclosure is intended to illustrate non-limiting embodiments to make other skilled in the art more fully understand the technical solution of the present disclosure, principles and practical applications thereof, so that other skilled in the art can modify and implement the present disclosure in many ways to optimally adapt it to the requirements of a specific use.

Preparation Method of the Present Disclosure

One aspect of the present disclosure provides a method for preparing a compound represented by formula III comprising steps (A) and (B), and step (B) comprises step (B-1) or (B-2):

Step (A):

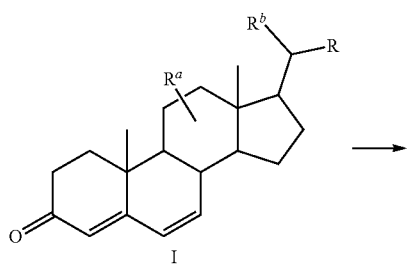

-continued

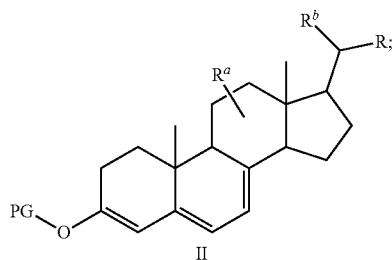

II

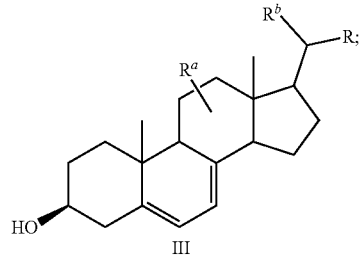

III

Step (B):
Step (B-1):

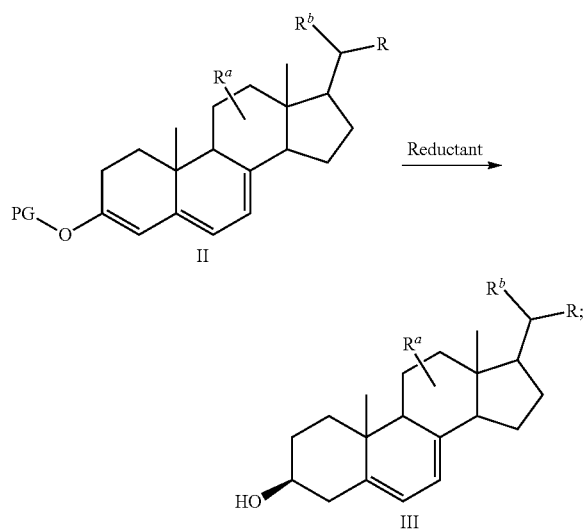

or
Step (B-2):

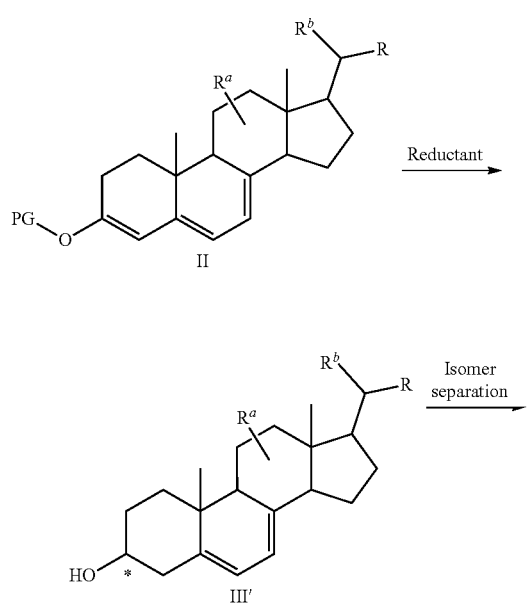

wherein,
" ≈≈≈ " in formula I, formula II, and formula III represents a single bond concurrently, or " ≈≈≈ " in formula I, formula II, and formula III represents a double bond concurrently, or " ≈≈≈ " in formula I represents a single bond or a double bond, and in formula II and formula III represents a double bond;

$R^a$ and $R^b$ are each independently selected from H, —OH, $C_{1-3}$ alkyl;

PG is a hydroxy protecting group, preferably $C_{1-8}$ silyl, acetyl, trifluoroacetyl, or benzoyl optionally substituted with one or more $C_{1-8}$ alkyl;

R is $L^1$-LG or $L^1$-$R^1$;

$L^1$ is null, or $C_{1-8}$ alkylene;

LG is a leaving group;

$R^1$ is selected from H, $C_{1-8}$ alkyl, $C_{1-8}$ alkenyl, —OH, —O($C_{1-8}$ alkyl), —O-$PG^1$, —C(=O)O($C_{1-8}$ alkyl), —C(=O)N($C_{1-8}$ alkyl)$_2$, wherein the alkyl or alkenyl is optionally substituted with 1, 2 or 3 groups selected from —OH, —O($C_{1-8}$ alkyl), —O-$PG^1$, —C(=O)O($C_{1-8}$ alkyl) and —C(=O)N($C_{1-8}$ alkyl)$_2$;

$PG^1$ is a hydroxyl protecting group, preferably selected from $C_{1-8}$ silyl or a $C_{1-6}$ alkoxy substituted methyl group;

* represents the chiral center.

Among them, step (B-1) and step (B-2) both represent the process of preparing the compound represented by formula III in the presence of a reductant. Step (B-1) represents chiral selective obtaining of the target product (compound represented by formula III). Step (B-2) means that in some cases, the compound obtained by the reaction (compound represented by formula III') does not reach the desired optical purity, so isomer separation is performed to obtain the compound represented by formula III.

In one embodiment, PG is selected from acetyl and trifluoroacetyl. In a preferred embodiment, PG is acetyl.

In one embodiment, step (A) is carried out in the presence of an acylating agent, and the acylating agent is selected from acetic anhydride, acetyl chloride, isopropenyl acetate and a combination thereof, or selected from trifluoroacetic anhydride, trifluoroacetyl chloride and a combination thereof. In another embodiment, the acylating agent is selected from acetic anhydride, acetyl chloride, isopropenyl acetate, and a combination thereof. In a particular embodiment, the acylating agent is isopropenyl acetate. In another particular embodiment, the acylating agent is a mixture of acetic anhydride and acetyl chloride. In one embodiment, step (A) is carried out in the presence of an acid, and the acid is an inorganic acid or an organic acid. In one embodiment, the acid is selected from p-TsOH, MsOH, HCl, $H_2SO_4$, $HClO_4$, and a combination thereof. In a particular embodiment, the acid is p-TsOH.

In one embodiment, step (A) is carried out at a temperature of 0 to 110° C., preferably room temperature to 110° C. In one embodiment, the reaction is carried out at a temperature of 40 to 110° C., such as 40° C., 45° C., 50° C., 55° C., 60° C., 65° C., 70° C., 75° C., 80° C., 85° C., 90° C., 95° C., 100° C. or a combination thereof.

In one embodiment, $L^1$ is null. In another embodiment, $L^1$ is $C_{1-6}$ alkylene, preferably $C_{1-6}$ alkylene, more preferably $C_{1-4}$ alkylene. In a particular embodiment, $L^1$ is $C_{1-2}$ alkylene, especially methylene.

In one embodiment, LG is selected from halogen, a $C_{1-6}$ alkylsulfonate leaving group optionally substituted by halogen, and a benzenesulfonate leaving group optionally substituted with $C_{1-6}$ alkyl. In one embodiment, LG is OTf, OTs or OMs. In one embodiment, LG is OTs. In one embodiment, LG is selected from Cl, Br, and I.

In one embodiment, $R^1$ is selected from H, $C_{1-8}$ alkyl and $C_{1-8}$ alkenyl, wherein the alkyl or alkenyl is optionally substituted with 1, 2 or 3 groups selected from —O($C_{1-8}$ alkyl) and —O-$PG^1$.

In one embodiment, $R^1$ is —CH═$CR^4R^5$, wherein $R^4$ and $R^5$ are each independently selected from H, $C_{1-6}$ alkyl, $C_{1-6}$ alkenyl, —C(═O)O($C_{1-8}$ alkyl), —C(═O)N($C_{1-8}$ alkyl)$_2$, wherein the alkyl or alkenyl is optionally substituted with 1, 2 or 3 groups selected from —OH, —O($C_{1-8}$ alkyl), —C(═O)O($C_{1-8}$ alkyl) and —C(═O)N($C_{1-8}$ alkyl)$_2$.

In one embodiment, $R^1$ is selected from —(CH$_2$)$_2$—C(═O)O($C_{1-8}$ alkyl) and —(CH$_2$)$_2$—C(═O)N($C_{1-8}$ alkyl)$_2$. Preferably, $R^1$ is selected from —(CH$_2$)$_2$—C(═O)O($C_{1-6}$ alkyl) and —(CH$_2$)$_2$—C(═O)N($C_{1-6}$ alkyl)$_2$.

In a particular embodiment, $PG^1$ is TMS, TBS, or MOM.

In one embodiment, the chiral center represented by * is a racemic carbon atom. In one embodiment, the chiral center represented by * is an (S)-configuration-enriched carbon atom. In another embodiment, the chiral center represented by * is an (R)-configuration-enriched carbon atom.

In one embodiment, the reductant is selected from a borohydride reagent and lithium aluminum hydride. In another embodiment, the borohydride reagent is selected from Ca(BH$_4$)$_2$, NaBH$_4$, KBH$_4$, and a combination thereof. In a preferred embodiment, the borohydride reagent is Ca(BH$_4$)$_2$. In one embodiment, the reaction is carried out in the presence of a base, and the base is an organic base, an inorganic base, or a combination thereof. In a preferred embodiment, the inorganic base is selected from NaOH, KOH, NaOMe, t-BuOK and a combination thereof. In another preferred embodiment, the organic base is selected from pyridine, triethylamine, DMAP, and a combination thereof. In another particular embodiment, the base is pyridine. In one embodiment, the reaction is carried out in an organic solvent. In one embodiment, the organic solvent is selected from alcohol solvents, ether solvents, and a combination thereof. In a preferred embodiment, the ether solvent is selected from diethyl ether, tetrahydrofuran and a combination thereof. In another preferred embodiment, the alcohol solvent is selected from methanol, ethanol, isopropanol, and a combination thereof, preferably methanol, ethanol, or a combination thereof, or ethanol, isopropanol, or a combination thereof. In a particular embodiment, the organic solvent is a mixed solvent of tetrahydrofuran and at least one of the following alcohols: methanol, ethanol, and isopropanol. In another particular embodiment, the organic solvent is a mixed solvent of tetrahydrofuran and at least one of the following alcohols: methanol and ethanol. In a particular embodiment, the organic solvent is a mixed solvent of tetrahydrofuran, ethanol and isopropanol. In a particular embodiment, the ratio of tetrahydrofuran, ethanol and isopropanol in the mixed solvent of tetrahydrofuran, ethanol and isopropanol is 1:(0.1-1):(0.1-1), preferably 1:(0.3-0.8): (0.3-0.8), especially 1:0.5:0.5.

In one embodiment, step (B) is carried out at a temperature of −20 to 80° C., preferably −20 to 70° C. In one embodiment, the reaction is carried out at a temperature of −20 to 60° C. In one embodiment, the reaction is carried out at a temperature of −20 to 40° C., preferably −10 to 40° C., such as −10° C., −5° C., 0° C., 5° C., 10° C., 15° C., 20° C., 25° C., 30° C., 35° C. or 40° C.

In one embodiment, " ═══ " in formula I represents a single bond or a double bond. When it represents a single bond, the compound represented by formula I can be represented by formula I-1, and the method of the present disclosure optionally includes the following step (a) before step (A) to convert the single bond to a double bond; the structure obtained after the conversion is represented by formula I-2, and is still encompassed by the definition of formula I.

Step (a): Dehydrogenation reaction of the compound represented by formula I-1 to prepare a compound represented by formula I-2

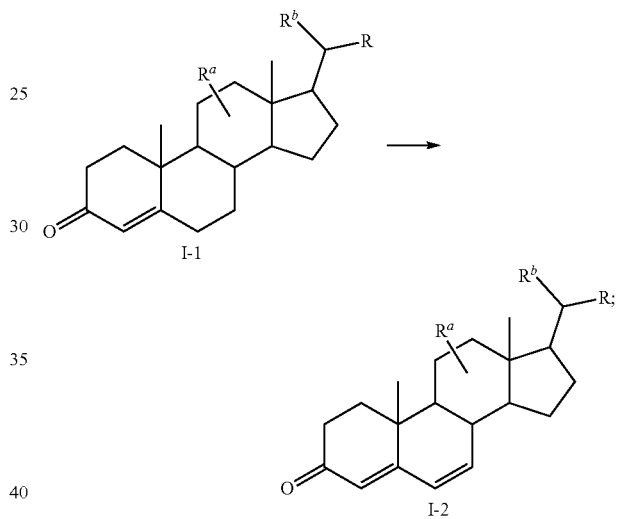

wherein:
R is $L^1$-LG or $L^1$-$R^1$, $R^1$ is selected from H, $C_{1-8}$ alkyl, $C_{1-8}$ alkenyl, —O($C_{1-8}$ alkyl), —O-$PG^1$, —C(═O)O($C_{1-8}$ alkyl), —C(═O)N($C_{1-8}$ alkyl)$_2$, wherein the alkyl or alkenyl is optionally substituted with 1, 2 or 3 groups selected from —O($C_{1-8}$ alkyl), —O-$PG^1$, —C(═O)O($C_{1-8}$ alkyl) and —C(═O)N($C_{1-8}$ alkyl)$_2$;
$L^1$, LG, PG and $PG^1$ are as defined above.

In one embodiment, step (a) is carried out in the presence of a dehydrogenating agent. In one embodiment, the dehydrogenating agent is selected from DDQ and chloranil. In a preferred embodiment, the dehydrogenating agent is selected from chloranil. In another embodiment, the dehydrogenation reaction is carried out by the method described in CN104910231B or Journal of Organic Chemistry, 2005, 70(21), 8513-8521; Tetrahedron Letters, 2004, 45 (40), 7479-7482.

In one embodiment, any one or more of the compounds represented by Formula I, Formula II, Formula III', and Formula III is optionally subjected to an reaction, and the reaction includes any one or more of the following steps and a combination thereof: step (b), step (c), step (d), step (e), step (f), a combination of step (g)-step (h), step (i), and step (j). After the above reaction, R in the compound represented by formula I, formula II, formula III' or formula III undergoes a group conversion, and the group obtained after conversion is still encompassed by the definition of R. Each time the following compounds represented by formula i, formula ii, formula iii, formula iii', formula iii", formula II'" and formula iv appears, "〰〰" therein each independently represents a single bond or a double bond, so that the steroid AB rings structure of formula i, formula ii, formula iii, formula iii', formula iii", formula III'" and formula iv each independently corresponds to the steroid AB rings structure of formula I, formula II, formula III' or formula III. In any of steps (b), (c), (d), (e), (f), (g), (h), (i) and (j), the structure represented by each "〰〰" in the product is the same as the structure represented in the reactant. The structure of $L^1$-LG or $L^1$-$R^1$ in the compounds represented by formula i, formula ii, formula iii, formula iii', formula iii", and formula iii'" is encompassed in the definition of R described above. At each occurrence, the compounds represented by formula i, formula ii, formula iii, formula iii', formula iii", and formula iii'" are each independently encompassed by the structure of formula I, formula II, formula III' or formula III.

In one embodiment, the steroidal 3-position in at least one of formula i, formula ii, formula iii, formula iii', formula iii", formula iii'" and formula iv is a carbonyl group. The carbonyl oxygen atom at the steroidal 3-position is not attached to $R^2$ through a chemical bond, $R^2$ is null, and the structure of the AB rings is

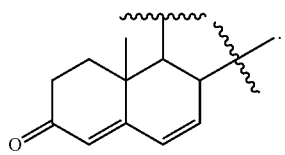 [SMILES: *C1C=CC2=CC(=O)CCC2(C)C1*]

In one embodiment, the structure of the AB rings in formula i, formula ii, formula iii, formula iii', formula iii", formula iii'" and formula iv corresponds to formula I.

In another embodiment, the steroidal 3-position in at least one of formula i, formula ii, formula iii, formula iii', formula iii", formula iii'" and formula iv is a hydroxyl group. The hydroxyl oxygen atom at the steroidal 3-position is attached to $R^2$ through a chemical bond, and the structure of the AB rings is

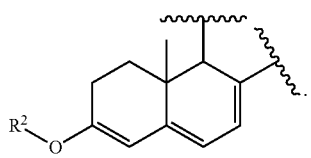

In one embodiment, the structure of the AB rings in formula i, formula ii, formula iii, formula iii', formula iii", formula iii'", and formula iv corresponds to formula II.

In one embodiment, the structure of the AB rings in at least one of formula i, formula ii, formula iii, formula iii', formula iii", formula iii'" and formula iv is

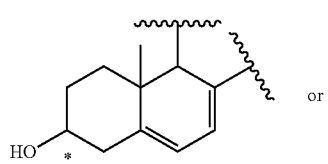

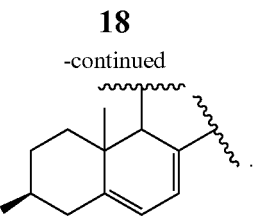

In one embodiment, the structure of the AB rings in formula i, formula ii, formula iii, formula iii', formula iii", formula iii'" and formula iv corresponds to formula III' or formula III. In another embodiment, the structure of the AB rings in at least one of formula i, formula ii, formula iii, formula iii', formula iii", formula iii'" and formula iv is

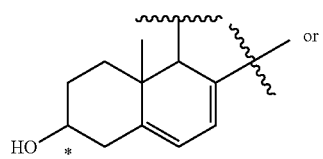

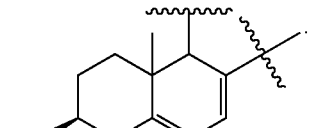

In yet another embodiment, the structure of the AB rings in at least one of formula i, formula ii, formula iii, formula iii', formula iii", formula iii'" and formula iv is

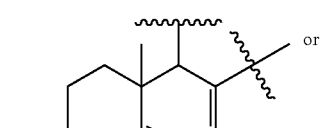

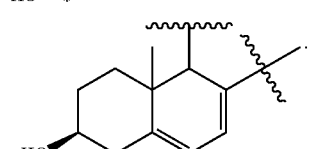

When R is $L^1$-OH, the structure of the compound represented by formula I, formula II, formula III' or formula III is as shown in the following formula i. When R is $L^1$-LG, the structure of the compound represented by formula I, formula II, formula III' or formula III is as shown in the following formula ii.

Step (b): Reacting the compound represented by formula i with a sulfonylating agent or a halogenating agent to prepare a compound represented by formula ii

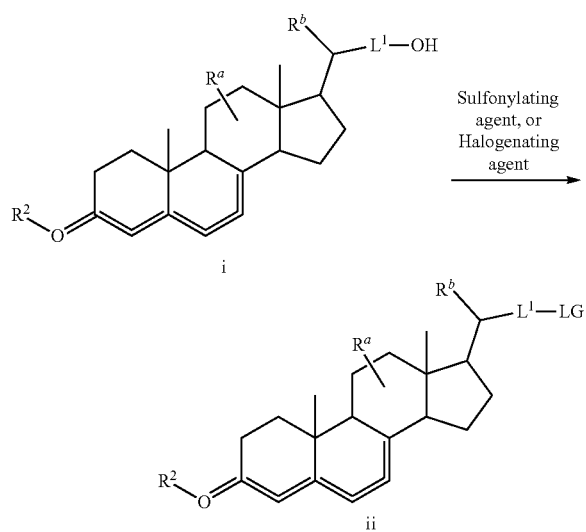

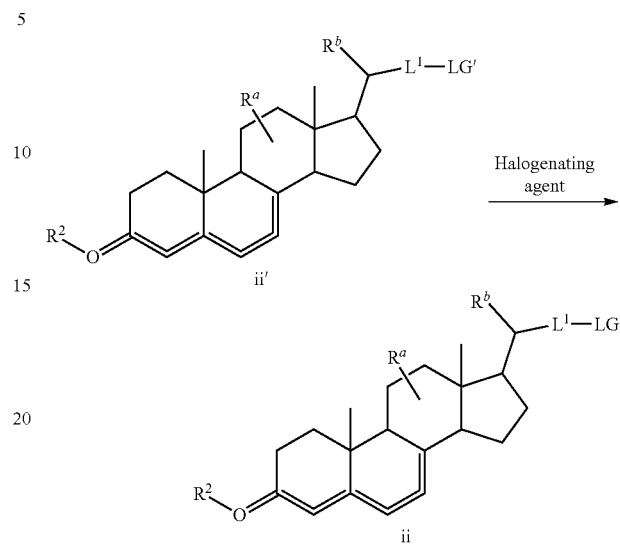

wherein:

$R^2$ is PG, and PG is as defined above;

(i) LG is a $C_{1-6}$ alkylsulfonate leaving group optionally substituted by halogen or a benzenesulfonate leaving group optionally substituted with $C_{1-6}$ alkyl, and the reaction is carried out in the presence of a sulfonylating agent; or (ii) LG is halogen, and the reaction is carried out in the presence of a halogenating agent.

In one embodiment, step (b) is performed before step (A), formula i and formula ii are both encompassed by the structure of formula I, and step (b) is as follows:

Step (c): Reacting the compound represented by formula ii' with a halogenating agent to prepare a compound represented by formula ii wherein:

$R^2$ is PG, and PG is as defined above;

LG' is a $C_{1-6}$ alkylsulfonate leaving group optionally substituted by halogen or a benzenesulfonate leaving group optionally substituted with $C_{1-6}$ alkyl; LG is halogen, and the reaction is carried out in the presence of a halogenating agent.

In one embodiment, step (c) is performed before step (A), formula ii' and formula ii are both encompassed by the structure of formula I, and step (c) is as follows:

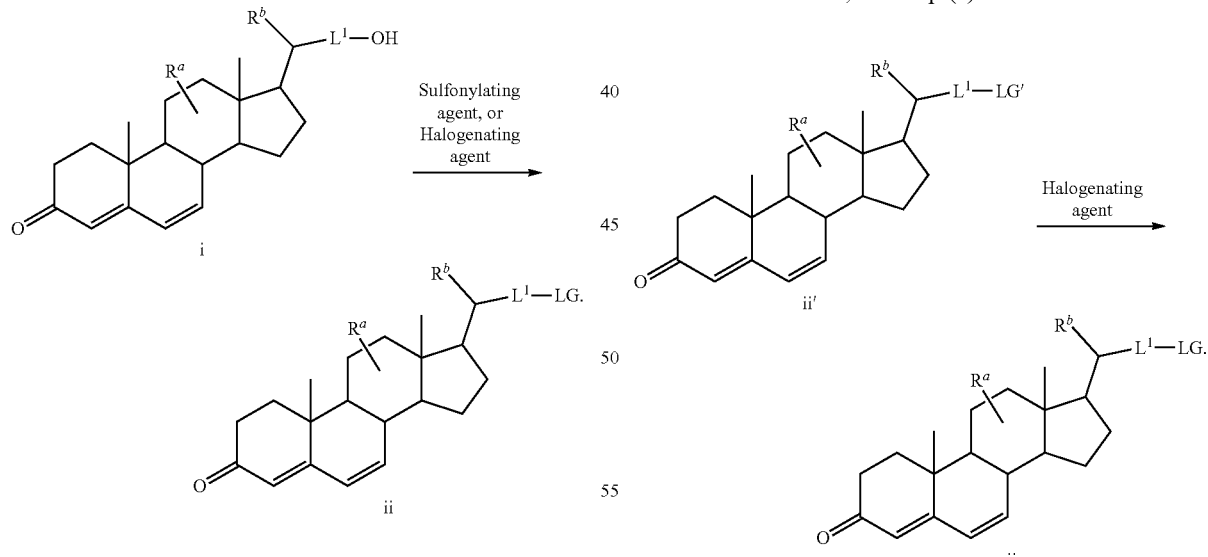

In one embodiment, LG is OTf, OMs, or OTs. In one embodiment, the sulfonylating agent is $(Tf)_2O$, MsCl, or TsCl.

In one embodiment, LG is Cl, Br, or I. In one embodiment, the halogenating agent is $SOCl_2$, $POCl_3$, chlorosilane reagent, phosphorous halide, HBr, NBS, $(PhO)_3P/CH_3I$ system or $Ph_3P/I_2$/imidazole system.

When R is $L^1$-LG', the structure of the compound represented by formula I, formula II, formula III' or formula III is as shown in the following formula ii'.

In one embodiment, LG' is OTf, OMs, or OTs. In one embodiment, LG is Cl, Br, or I. In one embodiment, the halogenating agent is hydrogen halide, $I_2$, $POCl_3$, $PBr_3$, or metal halide. In one embodiment, the metal halide is selected from sodium chloride, lithium chloride, magnesium chloride, and a combination thereof, or selected from sodium bromide, lithium bromide, magnesium bromide, and a combination thereof, or sodium iodide.

When R is $L^1$-$R^1$, the structure of the compound represented by formula I, formula II, formula III' or formula III is as shown in the following formula iii.

Step (d): Reacting the compound represented by formula ii with an organometallic reagent to prepare a compound represented by formula iii

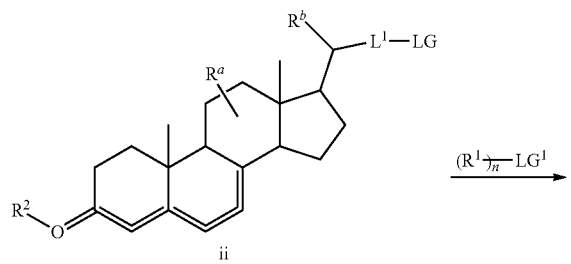

wherein:

$R^2$ is H or PG;

LG is selected from halogen, a $C_{1-6}$ alkylsulfonate leaving group optionally substituted by halogen or a benzenesulfonate leaving group optionally substituted with $C_{1-6}$ alkyl;

$(R^1)_n$—$LG^1$ is an organometallic reagent; LG1 is MgX or CuLi; n is 1 or 2;

$R_1$ is selected from H, $C_{1-8}$ alkyl, and $C_{1-8}$ alkenyl, wherein the alkyl or alkenyl is optionally substituted with 1, 2 or 3 groups selected from —O($C_{1-8}$ alkyl) and —O-$PG^1$;

$L^1$ PG, $PG^1$ are as defined above.

In one embodiment, step (d) is performed between the first step and the second step of step (B-2), formula ii and formula iii are both encompassed by the structure of formula III', and step (d) includes the following step (d-1):

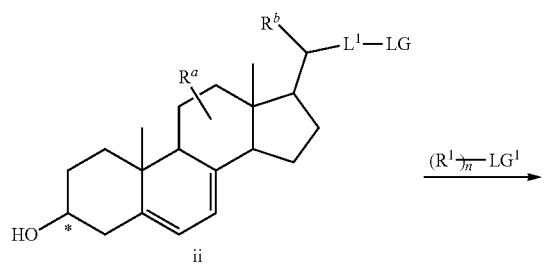

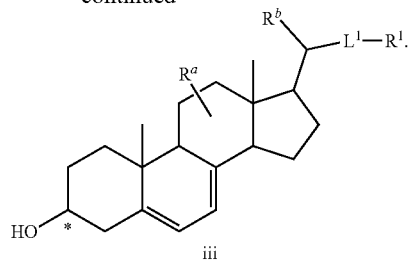

In one embodiment, step (d) is performed after step (B), formula ii and formula iii are both encompassed by the structure of formula III, and step (d) includes the following step (d-2):

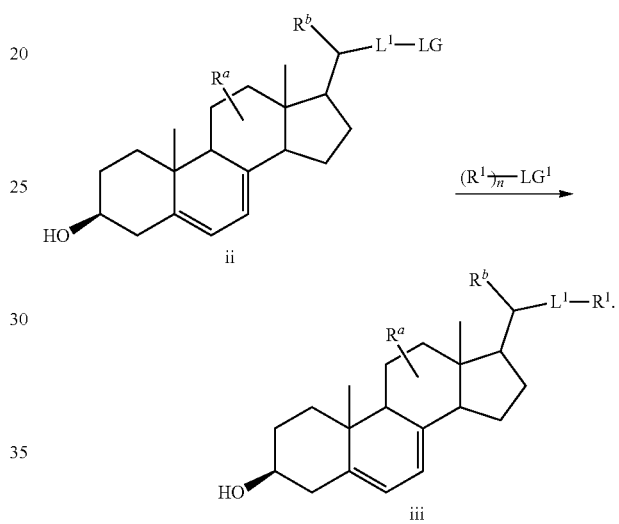

In one embodiment, LG is OTf, OMs, or OTs. In another embodiment, LG is Cl, Br or I.

In one embodiment, LG is MgX, wherein X is Cl, Br or I, n is 1, and $(R^1)_n$—$LG^1$ belongs to a Grignard reagent. In one embodiment, step (d) is carried out in the presence of a catalyst, and the catalyst is selected from copper halide, cuprous halide, lithium chloride, lithium copper double salt, and a combination thereof. In one embodiment, the catalyst is selected from one or more of the following: CuI, CuBr, LiCl, $CuCl_2$, CuCl, $Li_2CuCl_4$, and $LiCuCl_3$.

In one embodiment, $LG^1$ is CuLi, n is 2, and $(R^1)_n$—$LG^1$ belongs to a hydrocarbyl copper lithium reagent.

In one embodiment, step (d) further includes a step of protecting the 3-carbonyl group and a step of deprotecting it. In one embodiment, the step of protecting the 3-carbonyl group is achieved by forming the 3-carbonyl group into a ketal. In one embodiment, the protecting group for protecting the 3-carbonyl group is 1,3-dioxolane.

Step (e): Reacting the compound represented by formula ii with an acrylic acid derivative in the presence of a reductant to prepare a compound represented by formula iii

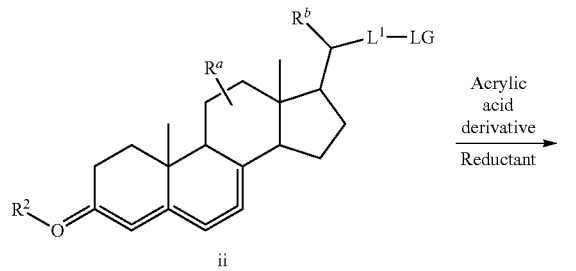

wherein, $R^2$ is H or PG, and PG is as defined above.

LG is selected from halogen, a $C_{1-6}$ alkylsulfonate leaving group optionally substituted by halogen and a benzenesulfonate leaving group optionally substituted with $C_{1-6}$ alkyl. Preferably, LG is halogen.

The acrylic acid derivative is selected from alkyl acrylates, wherein the alkyl groups are each independently selected from $C_{1-8}$ alkyl. Preferably, the alkyl groups are each independently selected from $C_{1-6}$ alkyl, more preferably $C_{1-4}$ alkyl.

The reductant is selected from zinc, iron, aluminum, and magnesium. In a particular embodiment, the reductant is zinc.

$R^1$ is selected from $-(CH_2)_2-C(=O)O(C_{1-8}$ alkyl). Preferably, $R^1$ is selected from $-(CH_2)_2-C(=O)O(C_{1-6}$ alkyl). More preferably, $R^1$ is selected from $-(CH_2)_2-C(=O)O(C_{1-4}$ alkyl).

In one embodiment, step (e) is performed between the first step and the second step of step (B-2), formula ii and formula iii are both encompassed by the structure of formula III', and step (e) includes the following step (e-1):

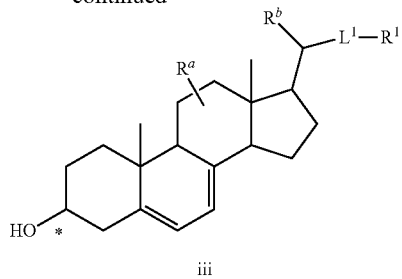

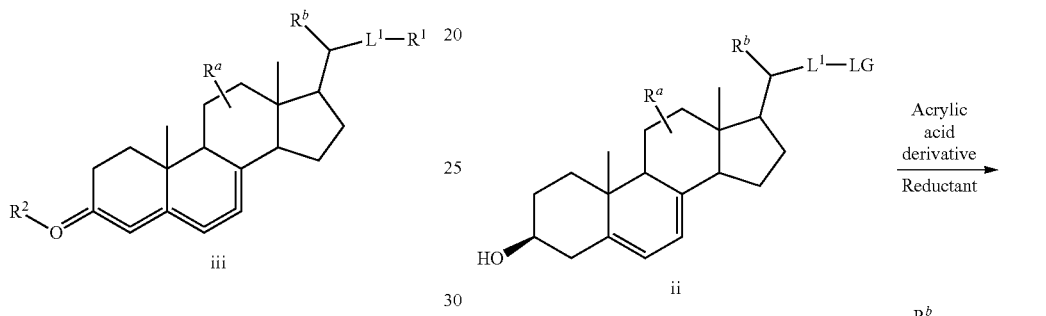

In one embodiment, step (e) is performed after step (B), formula ii and formula iii are both encompassed by the structure of formula III, and step (e) includes the following step (e-2):

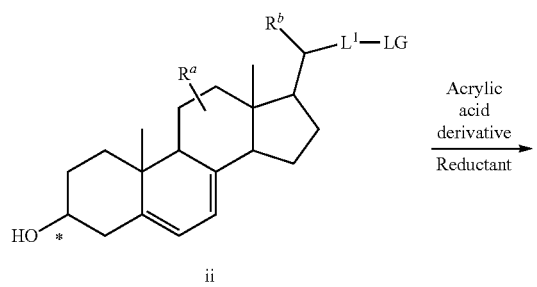

In one embodiment, the acrylic acid derivative is a $C_{1-6}$ alkyl acrylate. In another embodiment, the alkyl acrylate is selected from methyl acrylate, ethyl acrylate, propyl acrylate, n-butyl acrylate, and isobutyl acrylate. In a preferred embodiment, the alkyl acrylate is selected from methyl acrylate and ethyl acrylate.

In one embodiment, step (e) is carried out in the presence of a catalyst, and the catalyst is selected from Cut Ni(0)/ligand, Zn/NiCl$_2$/ligand. In one embodiment, the ligand is selected from PPh$_3$, bipyridine, o-phenanthroline, pyridine, DMAP, and a combination thereof. In a particular embodiment, the catalyst is Zn/NiCl$_2$/pyridine.

In one embodiment, step (e) is carried out at a temperature of 0 to 80° C., preferably 0 to 70° C. In one embodiment, the reaction is carried out at a temperature of 0 to 60° C. In one embodiment, the reaction is carried out at a temperature of 10 to 60° C., such as 10° C., 15° C., 20° C., 25° C., 30° C., 35° C., 40° C., 45° C., 50° C., 55° C., 60° C. or a combination thereof.

In one embodiment, the reaction is carried out in an organic solvent. In one embodiment, the organic solvent is selected from ethyl acetate, tetrahydrofuran, dioxane, diethyl ether, butyl acetate, methyltetrahydrofuran, and pyridine. In one embodiment, the organic solvent is pyridine.

In one embodiment, step (e) includes the following steps i) to iii):

i) mixing a reductant and a catalyst with a solvent to obtain a mixture;
ii) mixing and reacting the mixture obtained in i) with an acrylic acid derivative to obtain an activated acrylic acid derivative;
iii) mixing and reacting the activated acrylic acid derivative obtained in ii) with the compound represented by formula ii to obtain a compound represented by formula iii.

In one embodiment, step ii) is carried out at a temperature of 30 to 80° C., preferably 30 to 70° C., more preferably 40 to 60° C., such as 40° C., 45° C., 50° C., 55° C. or 60° C.

In one embodiment, step ii) is performed by slowly adding an acrylic acid derivative to the mixture obtained in i). In one embodiment, the reaction time of step ii) after the mixing is 0.5 to 4 hours, preferably 1-2 hours.

In one embodiment, step iii) is carried out at a temperature of 0 to 60° C., preferably 0 to 40° C., more preferably 0 to 30° C., such as 0° C., 5° C., 10° C., 15° C., 20° C., 25° C., 30° C. In one embodiment, the reaction time of step iii) after the mixing is 0.5 to 8 hours, preferably 1-6 hours, more preferably 3-4 hours.

When R is $L^1$-$R^1$, the structure of the compound represented by formula I, formula II, formula III' or formula III is as shown in the following formula iii'.

Step (f): Reacting the compound represented by formula iii' with an alkylating agent to prepare a compound represented by formula iii

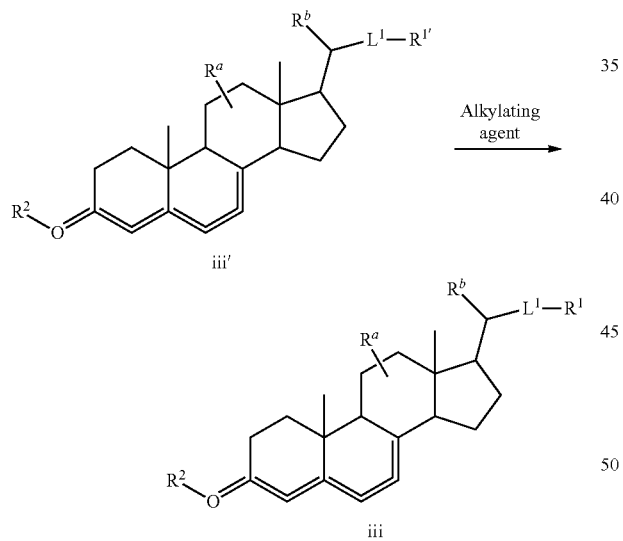

wherein $R^2$ is H or PG, and PG is as defined above;
$R^{1'}$ is selected from $C_{1-8}$ alkyl, $C_{1-8}$ alkenyl, and —C(=O)O($C_{1-8}$ alkyl), wherein the alkyl or alkenyl is substituted with 1 or 2 groups selected from —C(=O)O($C_{1-8}$ alkyl);
$R^1$ is selected from $C_{1-8}$ alkyl, $C_{1-8}$ alkenyl, and

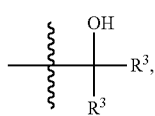

wherein the alkyl or alkenyl is substituted with 1 or 2 groups selected from

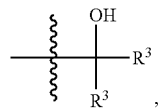

wherein $R^3$ is selected from $C_{1-8}$ alkyl;
the alkylating agent is $R^3$MgX or $R^3$Li, where X is Cl or Br.

In one embodiment, $R^3$ is selected from $C_{1-4}$ alkyl. In a particular embodiment, R3 is methyl.

In one embodiment, step (f) is performed between the first step and the second step of step (B-2), formula iii' and formula iii are both encompassed by the structure of formula III', and step (f) includes the following step (f-1):

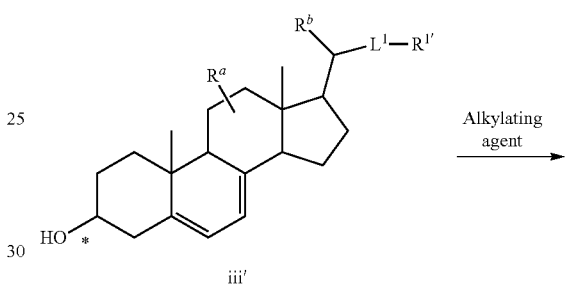

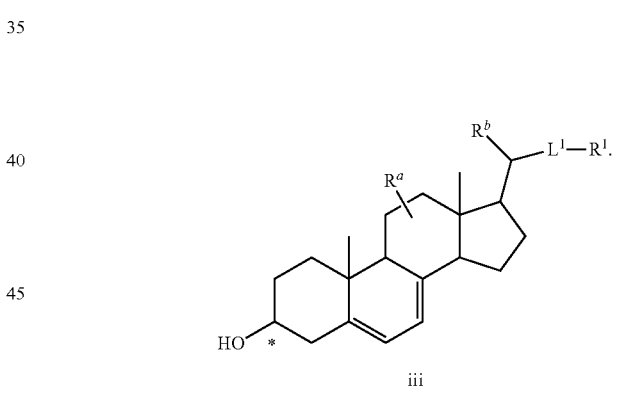

In one embodiment, step (f) is performed after step (B), formula iii' and formula iii are both encompassed by the structure of formula III, and step (f) includes the following step (f-2):

In one embodiment, step (f) further includes a step of protecting 3-OH and a step of deprotecting it. In one embodiment, the protecting group for protecting 3-OH is selected from $C_{1-8}$ silyl, acetyl, trifluoroacetyl, benzyl optionally substituted with methoxy, or a $C_{1-6}$ alkoxy substituted methyl group.

When R is $L^1$-CHO, the structure of the compound represented by formula I, formula II, formula III' or formula III is as shown in the following formula iv.

Step (g): Reacting the compound represented by formula iii with an oxidant to prepare a compound represented by formula iv

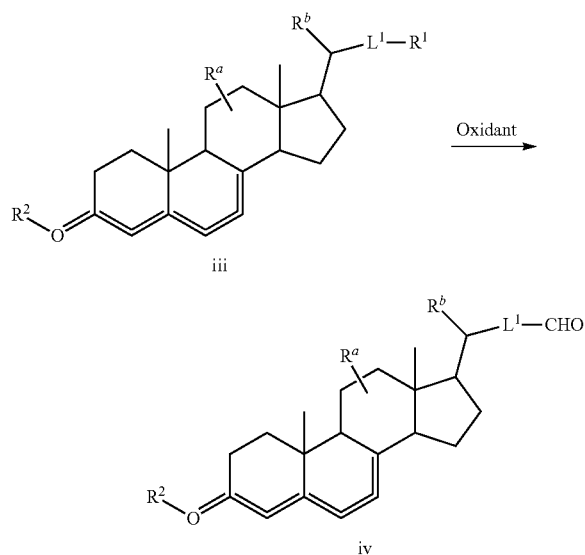

wherein $R^1$ is —$CH_2OH$; $R^2$ is PG;
$L^1$ and PG are as defined above.

In one embodiment, step (g) is performed before step (A), formula iii is encompassed by the structure of formula I, and step (g) includes the following step (g-1):

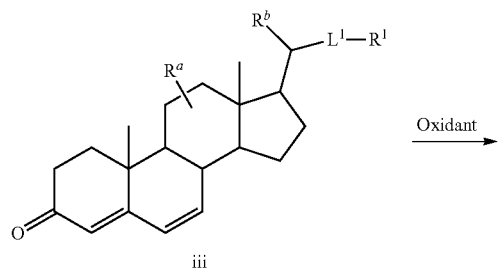

In one embodiment, step (g) is performed between step (A) and step (B), formula iii is encompassed by the structure of formula II, and step (g) includes the following step (g-2):

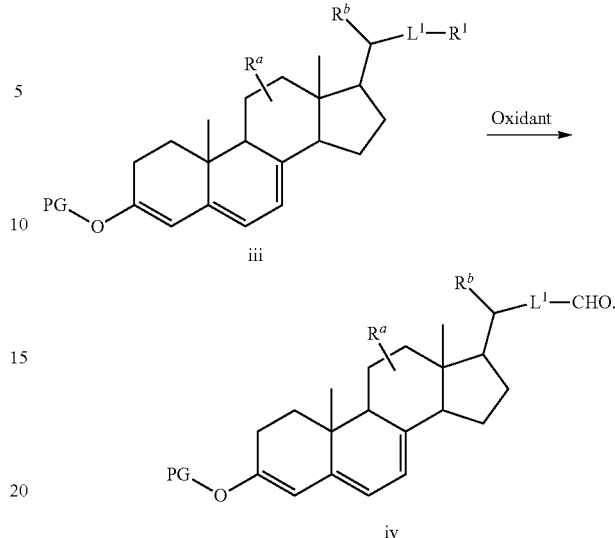

In one embodiment, the oxidant is selected from TEMPO/NaBr/NaClO, TEMPO/NaBr/Ca(ClO)$_2$, TEMPO/TCCA, DMSO/SO$_3$-Py/Et$_3$N, NaNO$_2$/FeCl$_3$/TEMPO/air, NaNO$_2$/FeCl$_3$/TEMPO/O$_2$ and a combination thereof. In a particular embodiment, the oxidant is TEMPO/NaBr/NaClO.

In one embodiment, the reaction is carried out in an organic solvent. In one embodiment, the organic solvent is selected from hydrocarbon solvents, halogenated hydrocarbon solvents, ester solvents, ketone solvents, and a combination thereof. In a preferred embodiment, the hydrocarbon solvent is selected from benzene, toluene and a combination thereof. In another preferred embodiment, the halogenated hydrocarbon solvent is selected from dichloromethane, chloroform, dichloroethane and a combination thereof, preferably dichloromethane. In a preferred embodiment, the ester solvent is ethyl acetate. In another preferred embodiment, the ketone solvent is acetone.

Step (h): Reacting the compound represented by formula iv with Wittig reagent to prepare a compound represented by formula iii

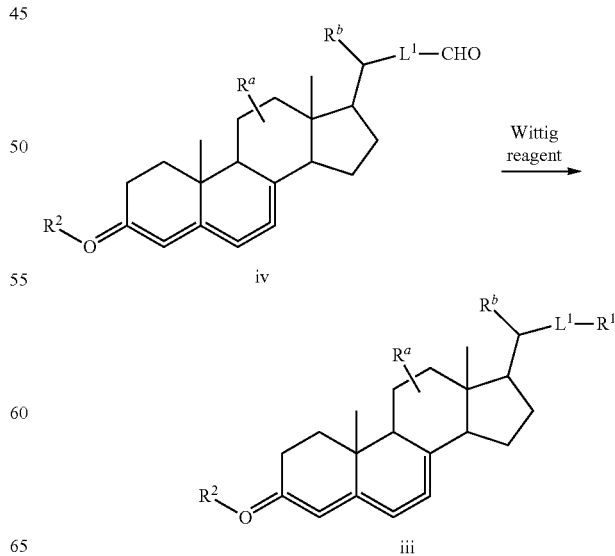

$R^1$ is —CH=$CR^4R^5$, wherein $R^4$ and $R^5$ are each independently selected from H, $C_{1-6}$ alkyl, $C_{1-6}$ alkenyl, —C(=O)O($C_{1-8}$ alkyl), —C(=O)N($C_{1-8}$ alkyl)$_2$, wherein the alkyl or alkenyl is optionally substituted with 1 or 2 groups selected from —OH, —O($C_{1-8}$ alkyl), —O-$PG^1$, —C(=O)O($C_{1-8}$ alkyl) and —C(=O)N($C_{1-8}$ alkyl)$_2$;

$R^2$ is H or PG;

$L^1$, PG, $PG^1$ are as defined above.

In one embodiment, the $CR^4R^5$ structure is selected from

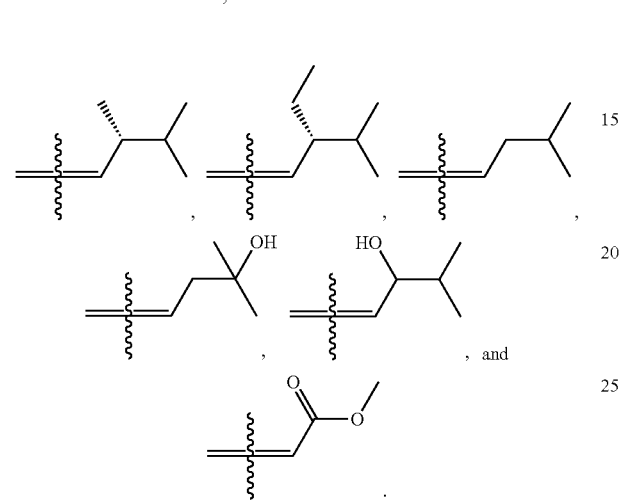

In one embodiment, step (h) is performed before step (A), formula iii is encompassed by the structure of formula I, and step (h) includes the following step (h-1):

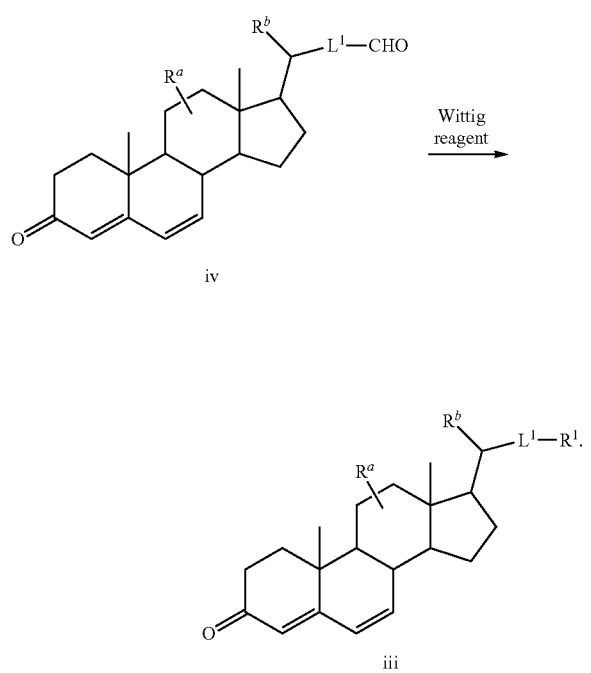

In one embodiment, step (h) is performed between the first step and the second step of step (B-2), formula iii is encompassed by the structure of formula III', and step (h) includes the following step (h-2):

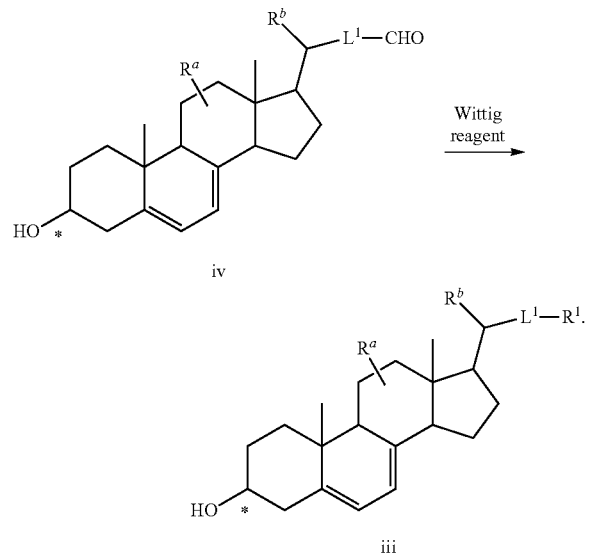

In one embodiment, step (h) is performed after step (B), formula iii is encompassed by the structure of formula III, and step (h) includes the following step (h-3):

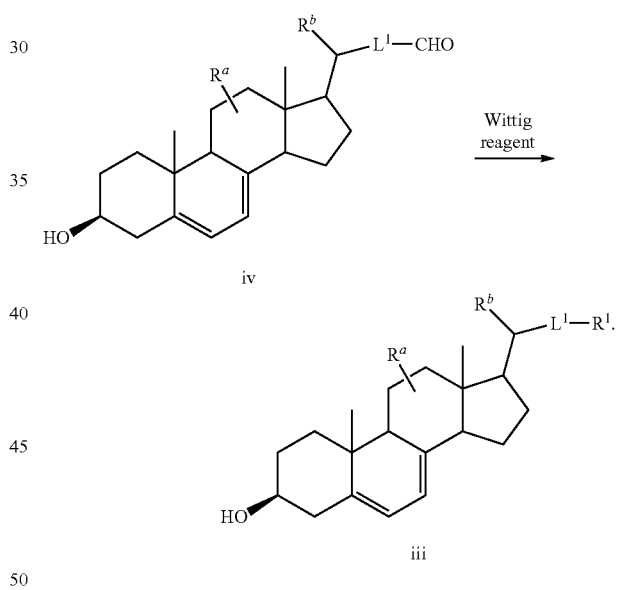

In one embodiment, the Wittig reagent is prepared from a halogenated hydrocarbon and a phosphorus reagent, wherein the halogenated hydrocarbon is X—$CHR^4R^5$, and X is Cl, Br, or I.

In one embodiment, the phosphorous reagent is selected from triphenylphosphine, trimethyl phosphite, triethyl phosphite, etc. In a particular embodiment, the phosphorus reagent is triphenylphosphine.

In one embodiment, the reaction of preparing the Wittig reagent from halogenated hydrocarbon and phosphorous reagent is carried out in the presence of a base, and the base is an organic base, an inorganic base, or a combination thereof. In one embodiment, the base is selected from potassium tert-butoxide, sodium methoxide, potassium methoxide, sodium hydride, butyl lithium, lithium diisopropylamide, and a combination thereof. In a particular embodiment, the base is potassium tert-butoxide.

In one embodiment, step (h) is carried out at a temperature of −20 to 80° C., preferably −20 to 70° C. In one embodiment, the reaction is carried out at a temperature of −20 to 60° C. In one embodiment, the reaction is carried out at a temperature of −10 to 60° C., preferably 0 to 50° C., more preferably 10 to 40° C., such as 10° C., 15° C., 20° C., 25° C., 30° C., 35° C. or 40° C.

In one embodiment, the reaction is carried out in an organic solvent. In one embodiment, the organic solvent is selected from sulfoxide solvents, ether solvents, hydrocarbon solvents, and a combination thereof. In a preferred embodiment, the sulfoxide solvent is DMSO. In another preferred embodiment, the ether solvent is selected from diethyl ether, tetrahydrofuran, dimethyltetrahydrofuran, and a combination thereof. In another preferred embodiment, the hydrocarbon solvent is selected from benzene, toluene, and a combination thereof.

When R is $L^1$-$R^{1''}$, the structure of the compound represented by formula I, formula II, formula III' or formula III is as shown in the following formula iii''.

Step (i): Reducing the compound represented by formula iii'' to prepare a compound represented by formula iii

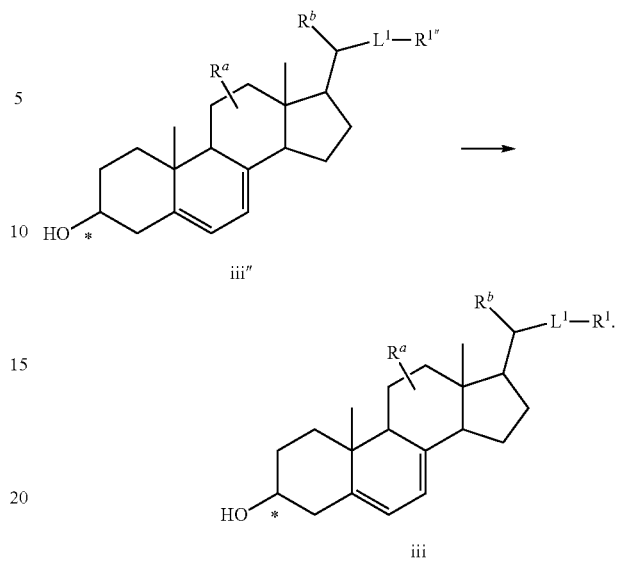

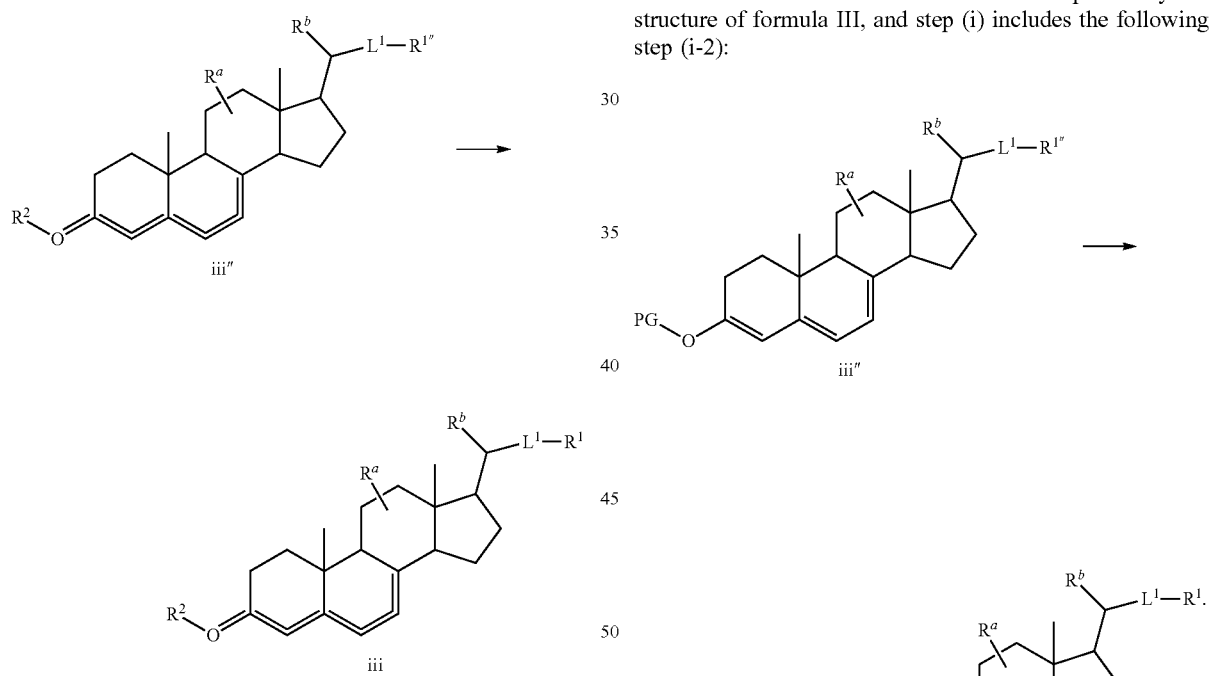

$R^{1''}$ is $C_{1-8}$ alkenyl, wherein the alkenyl is optionally substituted with 1 or 2 groups selected from —OH, —O($C_{1-8}$ alkyl), —O-$PG^1$, and —C(=O)O($C_{1-8}$ alkyl);

R1 is $C_{1-8}$ alkyl, wherein the alkyl is optionally substituted with 1 or 2 groups selected from —OH, —O($C_{1-8}$ alkyl), —O-$PG^1$, —$CH_2OH$, and —C(=O)O($C_{1-8}$ alkyl);

$R^2$ is H;

$L^1$ and $PG^1$ are as defined above.

In one embodiment, step (i) is performed between the first step and the second step of step (B-2), formula iii'' and formula iii are both encompassed by the structure of formula III', and step (i) includes the following step (i-1):

In one embodiment, step (i) is performed after step (B), formula iii'' and formula iii are both encompassed by the structure of formula III, and step (i) includes the following step (i-2):

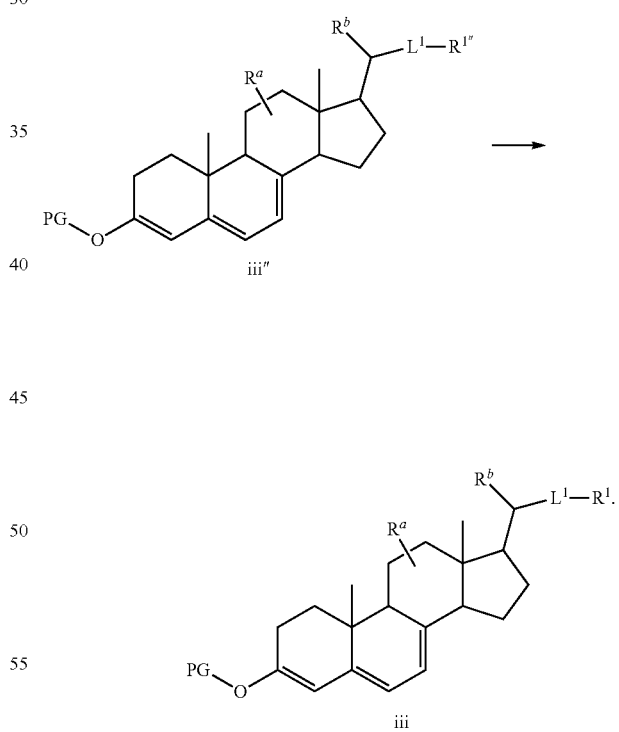

When R is $L^1$-$R^{1'''}$, the structure of the compound represented by formula I, formula II, formula III' or formula III is as shown in the following formula In one embodiment, step (i) is carried out by a catalytic hydrogenation reaction.

Step (j): Deprotecting the compound represented by formula iii'''' to prepare a compound represented by formula iii

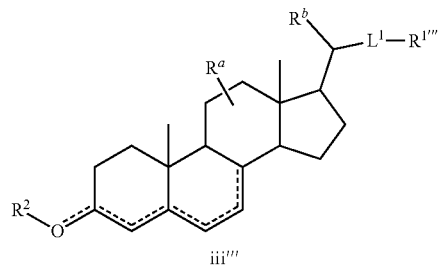 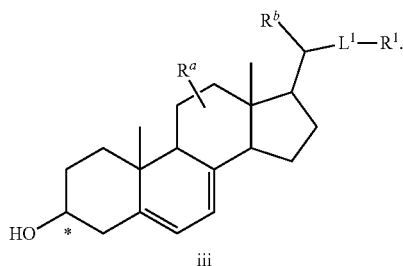

In one embodiment, step (j) is performed after step (B), formula iii'" and formula iii are both encompassed by the structure of formula III, and step (j) includes the following step (j-2):

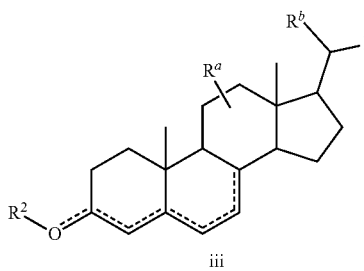 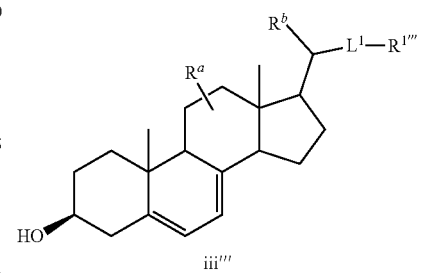

$R^{1'''}$ is selected from H, $C_{1-8}$ alkyl, $C_{1-8}$ alkenyl, —OH, —O($C_{1-8}$ alkyl), —O-$PG^1$, —C(=O)O($C_{1-8}$ alkyl), —C(=O)N($C_{1-8}$ alkyl)$_2$, wherein the alkyl or alkenyl is optionally substituted with 1 or 2 groups selected from —OH, —O($C_{1-8}$ alkyl), —O-$PG^1$, —C(=O)O($C_{1-8}$ alkyl) and —C(=O)N($C_{1-8}$ alkyl)$_2$;

$R^1$ is selected from H, $C_{1-8}$ alkyl, $C_{1-8}$ alkenyl, —OH, —O($C_{1-8}$ alkyl), —C(=O)O($C_{1-8}$ alkyl), —C(=O)N($C_{1-8}$ alkyl)$_2$, wherein the alkyl or alkenyl is optionally substituted with 1, 2 or 3 groups selected from —OH, —O($C_{1-8}$ alkyl), —C(=O)O($C_{1-8}$ alkyl) and —C(=O)N($C_{1-8}$ alkyl)$_2$;

$R^2$ is H;

$L^1$ and $PG^1$ are as defined above.

In one embodiment, step (j) is performed between the first step and the second step of step (B-2), formula iii'" and formula iii are both encompassed by the structure of formula III', and step (j) includes the following step (j-1):

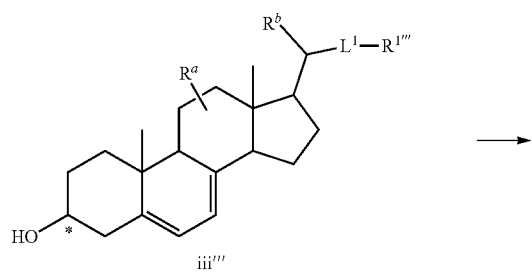

The above-mentioned compounds represented by formula i, formula ii, formula iii, formula iii", and formula iii'" are encompassed by the structure of formula I, formula II, formula III' or formula III, and the structure of the AB rings in formula iv is the same as that of formula iii. Therefore, when formula i, formula ii, formula iii, formula iii", formula iii'", and formula iv have multiple structures in the AB rings, the multiple structures can be transformed according to the method described in step (A) and step (B).

The reactions of step (A), step (B), step (a) to step (j) of the first or second aspect of the present disclosure are summarized in Table 1 below.

TABLE 1

| Step | Reaction | Compound capable of the reaction (formula II, formula II, formula III or formula III') |
|---|---|---|
| (A) | Reaction of the 3-position carbonyl group of the compound to prepare an enol ester | Formula I |
| (B) | Reaction of the enol ester in the presence of a reductant to prepare a compound in which the steroid A ring is a 3-hydroxy substituted saturated ring | Formula II |
| (a) | Dehydrogenation reaction of the compound to prepare a 7-dehydrogen compound | Formula I |
| (b) | Reacting the primary hydroxyl on the side chain of the compound with a sulfonylating agent to prepare a compound containing a leaving group on the side chain | Formula I |
| (c) | Reacting the compound containing a sulfonate leaving group with a halogenating agent to prepare a compound containing a halogen leaving group | Formula I |
| (d) | Reacting the compound containing a leaving group with an organometallic reagent to construct a side chain | Formula III', Formula III |
| (e) | Reacting the compound containing a leaving group with an acrylic acid derivative in the presence of a reductant to construct a side chain | Formula III', Formula III |
| (f) | Reacting the compound containing an ester group on the side chain with an alkylating agent to prepare a compound containing a tertiary hydroxyl group on the side chain | Formula III', Formula III |
| (g) | Reacting the primary hydroxyl on the side chain of the compound with an oxidant to prepare a compound containing aldehyde group on the side chain | Formula I, Formula II |
| (h) | Wittig reaction of the compound containing aldehyde groups on the side chain to prepare a compound containing double bond on the side chain | Formula I, Formula III', Formula III |
| (i) | Reduction reaction of the compound with double bond on the side chain to construct the side chain | Formula III', Formula III |
| (j) | Deprotection reaction of the compound containing the protective group on the side chain to construct the side chain | Formula III', Formula III |

The second aspect of the present disclosure is to provide a method for preparing a compound represented by formula III, comprising:

Step (1): converting a compound represented by formula ii to a compound represented by formula a;

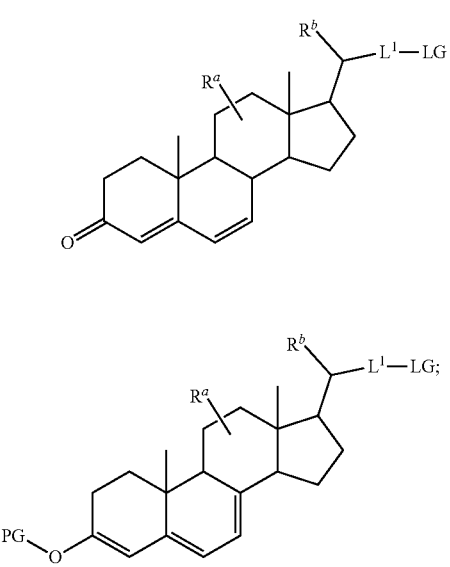

Step (2): reducing the compound represented by formula a to a compound represented by formula b under the action of sodium borohydride, calcium chloride and pyridine;

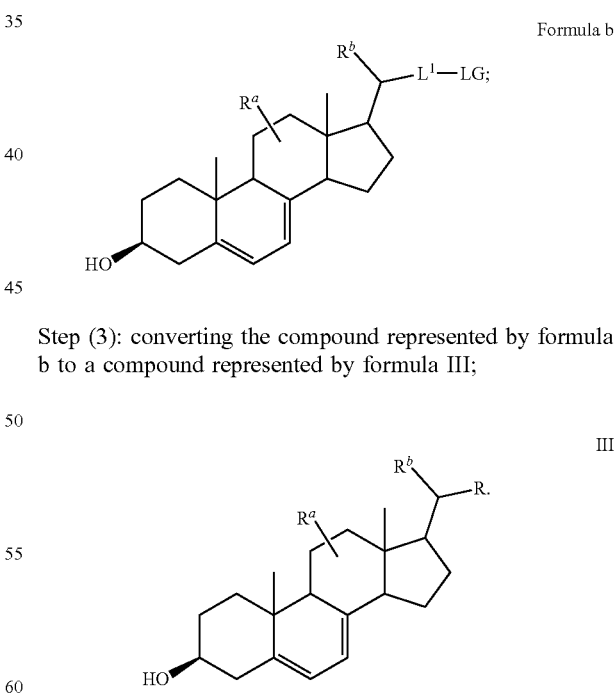

Step (3): converting the compound represented by formula b to a compound represented by formula III;

Wherein, " ̃ ", Ra, Rb, PG, RL1, LG, and R have the same definitions as described above, which will not be repeated here.

In one embodiment, PG is selected from acetyl and trifluoroacetyl. In a preferred embodiment, PG is acetyl.

In one embodiment, step (1) is carried out in the presence of an acylating agent, and the acylating agent is selected from acetic anhydride, acetyl chloride, isopropenyl acetate and a combination thereof, or selected from trifluoroacetic anhydride, trifluoroacetyl chloride and a combination thereof. In another embodiment, the acylating agent is selected from acetic anhydride, acetyl chloride, isopropenyl acetate, and a combination thereof. In a particular embodiment, the acylating agent is isopropenyl acetate. In another particular embodiment, the acylating agent is a mixture of acetic anhydride and acetyl chloride. In one embodiment, step (1) is carried out in the presence of an acid, and the acid is an inorganic acid or an organic acid. In one embodiment, the acid is selected from p-TsOH, MsOH, HCl, $H_2SO_4$, $HClO_4$, and a combination thereof. In a particular embodiment, the acid is p-TsOH.

In one embodiment, step (1) is carried out at a temperature of 0 to 110° C., preferably room temperature to 110° C. In one embodiment, the reaction is carried out at a temperature of 40 to 110° C., such as 40° C., 45° C., 50° C., 55° C., 60° C., 65° C., 70° C., 75° C., 80° C., 85° C., 90° C., 95° C., 100° C. or a combination thereof.

In one embodiment, $L^1$ is null. In another embodiment, $L^1$ is $C_{1-6}$ alkylene, preferably $C_{1-6}$ alkylene, more preferably $C_{1-4}$ alkylene. In a particular embodiment, $L^1$ is $C_{1-2}$ alkylene, especially methylene.

In one embodiment, LG is selected from halogen, a $C_{1-6}$ alkylsulfonate leaving group optionally substituted by halogen, and a benzenesulfonate leaving group optionally substituted with $C_{1-6}$ alkyl. In one embodiment, LG is OTf, OTs or OMs. In one embodiment, LG is OTs. In one embodiment, LG is selected from Cl, Br, and I.

In one embodiment, $R^1$ is selected from H, $C_{1-8}$ alkyl and $C_{1-8}$ alkenyl, wherein the alkyl or alkenyl is optionally substituted with 1, 2 or 3 groups selected from —O($C_{1-8}$ alkyl) and —O-$PG^1$.

In one embodiment, $R^1$ is —CH=$CR^4R^5$, wherein $R^4$ and $R^5$ are each independently selected from H, $C_{1-6}$ alkyl, $C_{1-6}$ alkenyl, —C(=O)O($C_{1-8}$ alkyl), —C(=O)N($C_{1-8}$ alkyl)$_2$, wherein the alkyl or alkenyl is optionally substituted with 1, 2 or 3 groups selected from —OH, —O($C_{1-8}$ alkyl), —O-$PG^1$, —C(=O)O($C_{1-8}$ alkyl) and —C(=O)N($C_{1-8}$ alkyl)$_2$.

In one embodiment, $R^1$ is selected from —(CH$_2$)$_2$—C(=O)O($C_{1-8}$ alkyl) and —(CH$_2$)$_2$—C(=O)N($C_{1-8}$ alkyl)$_2$. Preferably, $R^1$ is selected from —(CH$_2$)$_2$—C(=O)O($C_{1-6}$ alkyl) and —(CH$_2$)$_2$—C(=O)N($C_{1-6}$ alkyl)$_2$.

In a particular embodiment, $PG^1$ is TMS, TBS, or MOM.

In one embodiment, in step (2), the compound represented by formula a is reduced to a compound represented by formula b under the action of sodium borohydride, calcium chloride and pyridine. In one embodiment, the reaction is carried out in an organic solvent. In one embodiment, the organic solvent is selected from a mixed solvent of an alcohol solvent and tetrahydrofuran. In another preferred embodiment, the alcohol solvent is selected from methanol, ethanol, isopropanol, and a combination thereof, preferably methanol, ethanol, or a combination thereof, or ethanol, isopropanol, or a combination thereof. In one embodiment, a volume ratio of the ethanol to the isopropanol is 1:1. In a particular embodiment, the organic solvent is a mixed solvent of tetrahydrofuran and at least one of the following alcohols: methanol, ethanol, and isopropanol. In another particular embodiment, the organic solvent is a mixed solvent of tetrahydrofuran and at least one of the following alcohols: methanol and ethanol. In a particular embodiment, the organic solvent is a mixed solvent of tetrahydrofuran, ethanol and isopropanol. In one embodiment, the volume ratio of the alcohol to tetrahydrofuran is 1-2:1, especially 1:1. In a particular embodiment, the ratio of tetrahydrofuran, ethanol and isopropanol in the mixed solvent of tetrahydrofuran, ethanol and isopropanol is 1:(0.1-1):(0.1-1), preferably 1:(0.3-0.8):(0.3-0.8), especially 1:0.5:0.5.

In one embodiment, step (2) is carried out at a temperature of −20 to 80° C., preferably −20 to 70° C. In one embodiment, the reaction is carried out at a temperature of −20 to 60° C. In one embodiment, the reaction is carried out at a temperature of −20 to 40° C., preferably −10 to 40° C., such as −10° C., −5° C., 0° C., 5° C., 10° C., 15° C., 20° C., 25° C., 30° C., 35° C. or 40° C.

In one embodiment, step (3) is carried out according to the above step (d), that is, reacting the leaving group of the compound represented by formula b with an organometallic reagent to construct the side chain to obtain a compound represented by formula III; the construction process is similar to that described above, which will not be repeated here.

In one embodiment, step (3) is carried out according to the above step (e), that is, reacting the leaving group of the compound represented by formula b with an acrylic acid derivative under the action of a reductant to construct the side chain to generate a compound represented by formula III; the construction process is similar to that described above, which will not be repeated here.

In one embodiment, it further comprises step f, reacting the compound containing an ester group on the side chain with an alkylating agent to prepare a compound containing a tertiary hydroxyl group on the side chain. The process is similar to that described above, which will not be repeated here.

In one embodiment, " ~~~~~ " in formula I represents a single bond or a double bond. When it represents a single bond, the compound represented by formula ii can be represented by formula ii-1, and the method of the present disclosure optionally includes the following step (a) before step (1) to subject the compound to a dehydrogenation reaction to convert the single bond to a double bond; the structure obtained after the conversion is represented by formula ii-2, and is still encompassed by the definition of formula I. The process is similar to step a described above, which will not be repeated here.

In some embodiments, it further comprises step (b), reacting the primary hydroxyl on the side chain of the compound with a sulfonylating agent or a halogenating agent to prepare a compound containing a leaving group on the side chain. The process is similar to that described above, which will not be repeated here.

In some embodiments, it further comprises step (c): reacting the compound represented by formula ii' containing a sulfonate group with a halogenating agent to prepare a compound represented by formula ii containing a halogen leaving group. The process is similar to that described above, which will not be repeated here.

In some embodiments, it further comprises step (i): reducing the compound represented by formula iii'' with double bond on the side chain to prepare a compound represented by formula iii with the side chain. The process is similar to that described above, which will not be repeated here.

In one embodiment, it further comprises step (j): deprotecting the compound represented by formula iii''' containing a protective group on the side chain to construct the side chain of the compound represented by formula iii. The process is similar to that described above, which will not be repeated here.

The third aspect of the present disclosure is to provide another method for preparing a compound represented by formula III, comprising:

Step (11): converting a compound represented by formula ii to a compound represented by formula I;

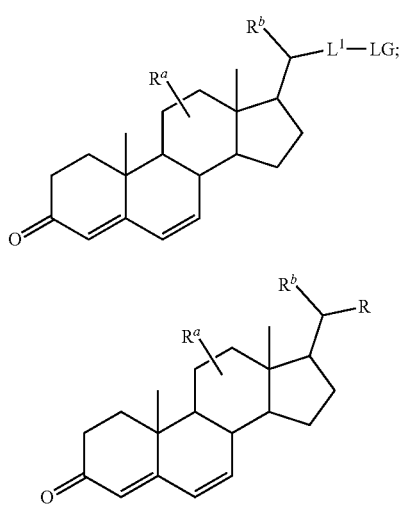

ii

I

Step (12): converting the compound represented by formula I to a compound represented by formula II;
Step (13): reducing the compound represented by formula II to a compound represented by formula III under the action of sodium borohydride and calcium chloride;

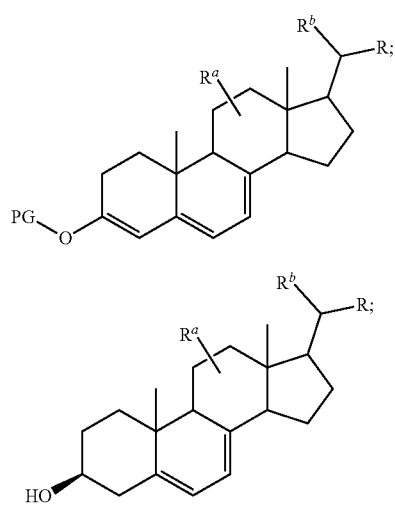

II

III wherein, wherein, "⁓", $R^a$, $R^b$, PG, $RL^1$, LG, and R have the same definitions as described above, which will not be repeated here.

In one embodiment, PG is selected from acetyl and trifluoroacetyl. In a preferred embodiment, PG is acetyl.

In one embodiment, step (12) is carried out in the presence of an acylating agent, and the acylating agent is selected from acetic anhydride, acetyl chloride, isopropenyl acetate and a combination thereof, or selected from trifluoroacetic anhydride, trifluoroacetyl chloride and a combination thereof. In another embodiment, the acylating agent is selected from acetic anhydride, acetyl chloride, isopropenyl acetate, and a combination thereof. In a particular embodiment, the acylating agent is isopropenyl acetate. In another particular embodiment, the acylating agent is a mixture of acetic anhydride and acetyl chloride. In one embodiment, step (12) is carried out in the presence of an acid, and the acid is an inorganic acid or an organic acid. In one embodiment, the acid is selected from p-TsOH, MsOH, HCl, $H_2SO_4$, $HClO_4$, and a combination thereof. In a particular embodiment, the acid is p-TsOH.

In one embodiment, step (12) is carried out at a temperature of 0 to 110° C., preferably room temperature to 110° C. In one embodiment, the reaction is carried out at a temperature of 40 to 110° C., such as 40° C., 45° C., 50° C., 55° C., 60° C., 65° C., 70° C., 75° C., 80° C., 85° C., 90° C., 95° C., 100° C. or a combination thereof.

In one embodiment, $L^1$ is null. In another embodiment, $L^1$ is $C_{1-6}$ alkylene, preferably $C_{1-6}$ alkylene, more preferably $C_{1-4}$ alkylene. In a particular embodiment, $L^1$ is $C_{1-2}$ alkylene, especially methylene.

In one embodiment, LG is selected from halogen, a $C_{1-6}$ alkylsulfonate leaving group optionally substituted by halogen, and a benzenesulfonate leaving group optionally substituted with $C_{1-6}$ alkyl. In one embodiment, LG is OTf, OTs or OMs. In one embodiment, LG is OTs. In one embodiment, LG is selected from Cl, Br, and I.

In one embodiment, $R^1$ is selected from H, $C_{1-8}$ alkyl and $C_{1-8}$ alkenyl, wherein the alkyl or alkenyl is optionally substituted with 1, 2 or 3 groups selected from —O($C_{1-8}$ alkyl) and —O-$PG^1$.

In one embodiment, $R^1$ is —CH=$CR^4R^5$, wherein $R^4$ and $R^5$ are each independently selected from H, $C_{1-6}$ alkyl, $C_{1-6}$ alkenyl, —C(=O)O($C_{1-8}$ alkyl), —C(=O)N($C_{1-8}$ alkyl)$_2$, wherein the alkyl or alkenyl is optionally substituted with 1, 2 or 3 groups selected from —OH, —O($C_{1-8}$ alkyl), —C(=O)O($C_{1-8}$ alkyl) and —C(=O)N($C_{1-8}$ alkyl)$_2$.

In one embodiment, $R^1$ is selected from —(CH$_2$)$_2$—C(=O)O($C_{1-8}$ alkyl) and —(CH$_2$)$_2$—C(=O)N($C_{1-8}$ alkyl)$_2$. Preferably, $R^1$ is selected from —(CH$_2$)$_2$—C(=O)O($C_{1-6}$ alkyl) and —(CH$_2$)$_2$—C(=O)N($C_{1-6}$ alkyl)$_2$.

In a particular embodiment, $PG^1$ is TMS, TBS, or MOM.

In one embodiment, in step (13), reducing the compound represented by formula II to a compound represented by formula III under the action of sodium borohydride and calcium chloride. In one embodiment, the reaction is carried out in an organic solvent. In one embodiment, the organic solvent is selected from a mixed solvent of an alcohol solvent and dichloromethane. In another preferred embodiment, the alcohol solvent is selected from methanol, ethanol, isopropanol, and a combination thereof, preferably methanol, ethanol, or a combination thereof, or ethanol, isopropanol, or a combination thereof. In one embodiment, a volume ratio of the ethanol to the isopropanol is 1:1. In a particular embodiment, the organic solvent is a mixed solvent of dichloromethane and at least one of the following alcohols: methanol, ethanol, and isopropanol. In another particular embodiment, the organic solvent is a mixed solvent of dichloromethane and at least one of the following alcohols: methanol and ethanol. In a particular embodiment, the organic solvent is a mixed solvent of dichloromethane, ethanol and isopropanol. In one embodiment, the volume ratio of the alcohol to the dichloromethane is 1-2:1, especially 1:1. In a particular embodiment, the ratio of dichloromethane, ethanol and isopropanol in the mixed solvent of dichloromethane, ethanol and isopropanol is 1: (0.1-1): (0.1-1), preferably 1:(0.3-0.8):(0.3-0.8), especially 1:0.5: 0.5.

In one embodiment, step (13) is carried out at a temperature of −20 to 80° C., preferably −20 to 70° C. In one embodiment, the reaction is carried out at a temperature of −20 to 60° C. In one embodiment, the reaction is carried out at a temperature of −20 to 40° C., preferably −10 to 40° C., such as −10° C., −5° C., 0° C., 5° C., 10° C., 15° C., 20° C., 25° C., 30° C., 35° C. or 40° C.

In one embodiment, step (11) can be carried out according to the above step d, converting the compound represented by formula ii containing a leaving group to a compound represented by formula I under the action of an organometallic reagent to construct the side chain. The process is similar to that described above, which will not be repeated here.

In some embodiments, step (11) can be carried out according to step e, converting the compound represented by formula ii containing a leaving group to a compound represented by formula I under the action of an acrylic acid derivative and a reductant to construct the side chain. The process is similar to that described above, which will not be repeated here.

In one embodiment, it further comprises step f, reacting the compound represented by formula ii containing an ester group on the side chain with an alkylating agent to prepare a compound represented by formula I containing a tertiary hydroxyl group on the side chain. The process is similar to that described above, which will not be repeated here.

In one embodiment, " ===== " in formula I represents a single bond or a double bond. When it represents a single bond, the compound represented by formula ii can be represented by formula ii-1, and the method of the present disclosure optionally includes the following step (a) before step (12) to subject the compound represented by formula ii to a dehydrogenation reaction to prepare a dehydrogenated compound represented by formula ii-2. The process is similar to that described above, which will not be repeated here.

In some embodiments, it further comprises step (b): reacting the compound represented by formula i containing a primary hydroxyl group on the side chain with a sulfonylating agent or a halogenating agent to prepare a compound represented by formula ii containing a leaving group. The process is similar to that described above, which will not be repeated here.

In some embodiments, it further comprises step (c): reacting the compound represented by formula ii' containing a sulfonate leaving group with a halogenating agent to prepare a compound represented by formula ii containing a halogen leaving group. The process is similar to that described above, which will not be repeated here.

In one embodiment, it further comprises step (g): reacting the compound represented by formula iii containing a primary hydroxyl group on the side chain with an oxidant to prepare a compound represented by formula iv containing an aldehyde group on the side chain. The process is similar to that described above, which will not be repeated here.

In one embodiment, it further comprises step (h), subjecting the compound containing an aldehyde group on the side chain to a Wittig reaction to prepare a compound containing double bond on the side chain. The process is similar to that described above, which will not be repeated here.

The present disclosure also provides a method for preparing a compound represented by formula III-1 from the compound represented by formula I-1:

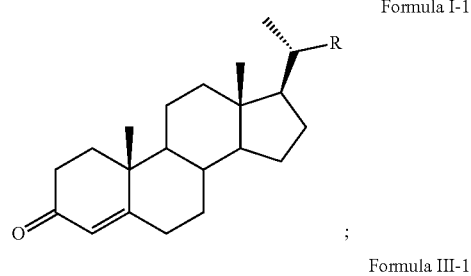

Formula I-1

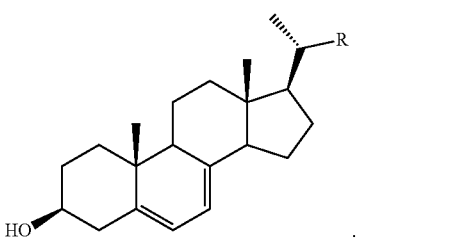

Formula III-1

The preparation process is the same as that described above, except that the substituents and chirality are different, which will not be repeated here.

It should be understood that those skilled in the art can also appropriately adjust the synthesis method of the present disclosure as needed, such as adjusting the order of the reaction steps, and adding or omitting protection/deprotection reaction steps. In addition, according to needs and actual conditions, the various steps of the synthesis method of the present disclosure can be carried out separately or simultaneously, and there is no particular limitation. For example, in the above-mentioned various aspects, step (j) can be carried out simultaneously with other reactions.

According to the existing knowledge in the art, the compound represented by the following formula I can be prepared by microbial transformation using phytosterol as a raw material. Therefore, in an optional aspect of the present disclosure, the compound represented by formula I can be prepared from phytosterols through microbial transformation and chemical synthesis, and the method comprises the step (A')

Step (A'): Contacting the compound represented by formula I' with a microorganism of the genus *Mycobacterium* or a culture thereof to prepare a compound represented by formula I

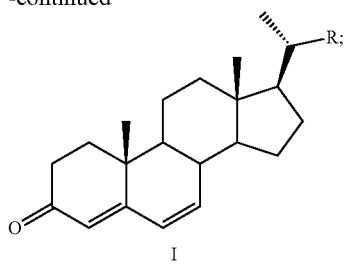

wherein the compound represented by formula I' is a phytosterol, and R' is selected from

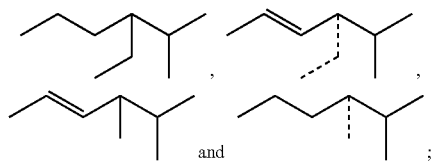

R is —CH$_2$OH.

Beneficial effect

The present disclosure provides a new method for preparing cholesterol and derivatives thereof, which is urgently needed in the art, especially a method for preparing 25-hydroxycholesterol and 25-hydroxy-7-dehydrocholesterol, which solves the technical problems in the prior art, such as the problems of the source of raw materials and the difficulty of constructing the 25-hydroxy group on the side chain.

The raw materials for the method of the present disclosure are readily available. The step operation is simple and there is no special separation means. The reaction yield is high, the production cost is low, and it is suitable for industrial production. Besides, there is no need to use precious metal catalysts, highly toxic reagents such as trifluoroacetone peroxide or chromium trioxide/acetic anhydride system, or hydrazone reagents, so the introduction of nitrogen-containing wastewater that pollutes the environment can be avoided.

The method of the present disclosure can optionally use low-cost and easily available phytosterols as raw materials to prepare intermediates through microbial transformation, with high efficiency and little or no pollution to the environment. More importantly, the present disclosure successfully prepared cholesterol and derivatives thereof starting from a completely plant-derived starting material, avoiding the safety risks faced by the previous synthetic process with animal-derived starting material, such as infection of bovine spongiform encephalopathy and Streptococcus suis disease, which has high economic value and broad application prospects.

EXAMPLES

The embodiments of the present disclosure will be described in detail below in conjunction with examples, but those skilled in the art will understand that the following examples are only used to illustrate the present disclosure and should not be regarded as limiting the scope of the present disclosure. If specific conditions are not indicated in the examples, it shall be carried out in accordance with the conventional conditions or the conditions recommended by the manufacturer. The reagents or instruments used without indicating the manufacturer are all conventional products that can be purchased commercially.

Example 1: Preparation of Cholesterol from Compound 1

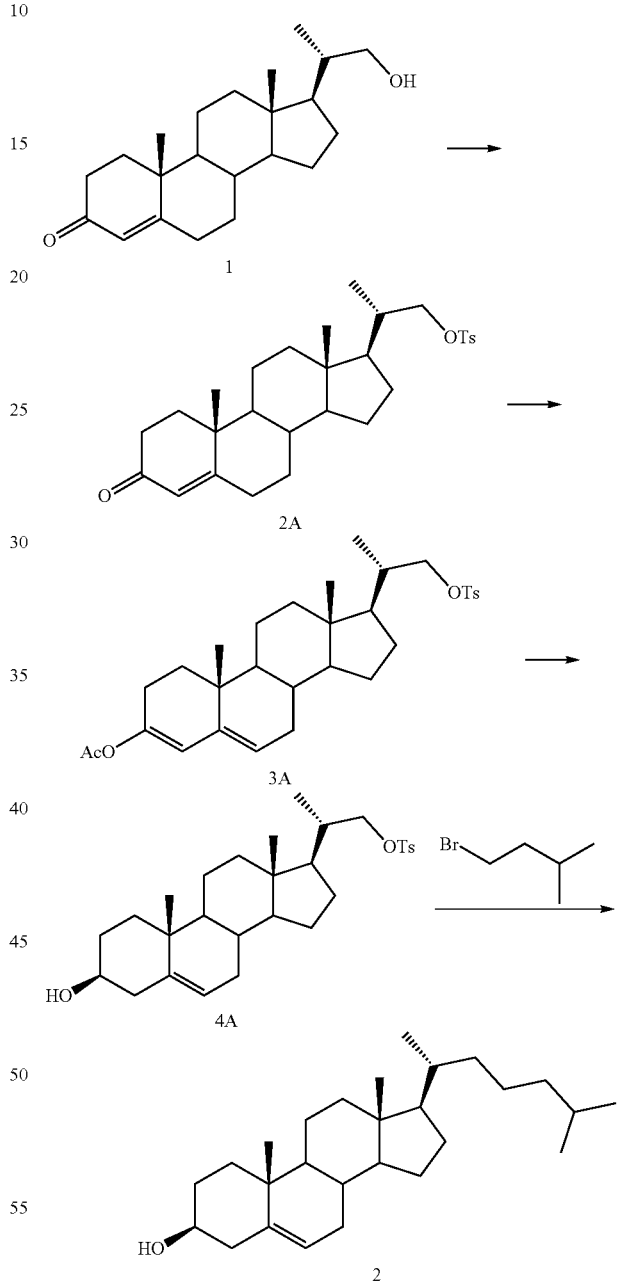

Step (1) Preparation of Intermediate 2A 200 g of compound 1, 10 g of DMAP, 200 mL of triethylamine and 1000 mL of DCM were added to a reaction flask at room temperature. The system was subjected to nitrogen replacement, stirred until the solution was clear, and subjected to heating to reflux. 150 g of p-toluenesulfonyl chloride in DCM (400 mL) solution was added dropwise to the system. The addition was completed in about 30 min, and the reflux and reaction were continued for 1-2 h. The reaction was monitored by TLC until the starting material disappeared. After the reaction was completed, the system was cooled to 10° C., and 80 mL of 50% methanol aqueous solution was added dropwise to quench the reaction. Then 600 mL of water was added to separate the layers. The organic layer was washed with water and concentrated under reduced pressure to remove most of the solvent. An appropriate amount of methanol was added, and the organic layer was continued to be concentrated until the DCM was completely removed and about 200 mL of methanol was retained. The organic layer was then cooled to 0-10° C., crystallized under stirring for 1 h, filtered with suction, eluted with methanol, and dried at 45-50° C. to obtain 2A. The weight yield was about 140%, and the purity was greater than 98%. $^1$H NMR (400 MHz, CDCl$_3$) δ7.75 (d, J=8.1 Hz, 2 H), 7.32 (d, J=8.0 Hz, 2 H), 5.69 (s, 1 H), 3.93 (dd, J=9.2, 2.9 Hz, 1 H), 3.75 (dd, J=9.1, 6.5 Hz, 1 H), 2.52-2.16 (m, 7 H), 2.06-1.88 (m, 2 H), 1.86-1.32 (m, 8 H), 1.18-0.78 (m, 13 H), 0.65 (s, 3 H).

Step (2) Preparation of Intermediate 3A 200 g of intermediate 2A, 20 g of p-TsOH, 400 mL of isopropenyl acetate, and 600 L of dichloromethane were added to a reaction flask at room temperature. The system was slowly heated and refluxed and reacted with stirring. The reaction was completed in about 3-4 h, which was monitored by TLC until no raw material remained. The system was cooled to 30° C. and concentrated under reduced pressure to remove most of the solvent. Then 200 mL methanol was added and the system was continued to be concentrated (this operation was performed 3 times).

Finally, it was concentrated until thickened, cooled to 0° C., crystallized under stirring for 1 h, filtered with suction, eluted with methanol, and dried at 45-50° C. to obtain 3 A. The weight yield was about 104%, and the purity was greater than 98%. $^1$H NMR (400 MHz, CDCl$_3$) δ7.76 (d, J=7.9 Hz, 2 H), 7.33 (d, J=7.9 Hz, 2 H), 5.66 (s, 1 H), 5.36 (s, 1 H), 4.06-3.87 (m, 1 H), 3.85-3.67 (m, 1 H), 2.41 (d, J=16.4 Hz, 4 H), 2.19-2.04 (m, 5 H), 1.92 (d, J=12.5 Hz, 1 H), 1.81 (dd, J=12.5, 5.2 Hz, 1 H), 1.74-1.47 (m, 6 H), 1.44-0.89 (m, 14 H), 0.65 (s, 3 H).

Step (3) Preparation of Intermediate 4 A 7 g of anhydrous calcium chloride, 40 g of pyridine, 400 mL of methanol, and 400 mL of THF were added to a reaction flask at room temperature, and stirred to dissolve. After that, the system was cooled to −10 to −15° C., and sodium borohydride was added in 4 batches, each batch of 4 g with a feeding interval of 10 min while the temperature of the reaction system was maintained below −10° C. After all the addition, Intermediate 3 A (100 g) was added, and the system was warmed naturally to room temperature and reacted. The reaction was completed in about 8-10 h. The reaction solution was slowly poured into 1000 mL of ice water with stirring, and was left until a solid was precipitated. 20 mL was continued to be stirred, and 20 mL of glacial acetic acid was slowly added into the system dropwise, filtered with suction, and eluted with water. The solid was dissolved with 300 mL of DCM. The aqueous layer was separated off, and the organic phase was concentrated under reduced pressure to remove most of the solvent. Then methanol was added and the organic layer was continued to be concentrated (this operation was performed 3 times). Finally, about 100 mL of methanol was retained. The organic layer was then cooled to 0° C., crystallized for 1 h, filtered with suction, eluted with ice methanol, and dried at 45-50° C. to obtain 4 A. The weight yield was about 75%, and the purity detected by HPLC was greater than 92%. $^1$H NMR (400 MHz, CDCl$_3$) δ7.76 (t, J=7.6 Hz, 2 H), 7.33 (t, J=7.4 Hz, 2 H), 5.30 (d, J=3.9 Hz, 1 H), 3.93 (dd, J=8.9, 2.3 Hz, 1 H), 3.83-3.66 (m, 1 H), 3.58-3.36 (m, 1 H), 2.51-2.36 (m, 3 H), 2.34-2.10 (m, 2 H), 2.06-1.84 (m, 3 H), 1.80 (d, J=10.6 Hz, 2 H), 1.51 (dddd, J=25.8, 21.7, 12.1, 8.1 Hz, 8 H), 1.23-0.78 (m, 13 H), 0.67-0.55 (m, 3 H). $^{13}$C NMR (101 MHz, CDCl$_3$) δ144.52, 140.73, 133.00, 129.68, 127.78, 121.32, 75.59, 71.55, 56.23, 51.68, 49.89, 42.33, 42.11, 39.31, 37.14, 36.36, 36.08, 31.79, 31.71, 31.47, 27.33, 24.15, 21.54, 20.90, 19.28, 16.76, 11.7. (2 carbon signals overlapped with other signals).

Step (4) Preparation of Cholesterol (Compound 2)

2.33 g of copper chloride, 1.47 g of lithium chloride, and 80 mL of THF were added to a 250 mL dry reaction flask at room temperature, and the system was subjected to nitrogen replacement three times. The reaction was carried out at a temperature controlled at 10-30° C. for 1-2 hours until the solution was clear, and the lithium tetrachlorocuprate solution 1 was obtained.

9.37 g of magnesium chips, 58.9 g of bromoisopentane, and 400 mL of THF were added to a 1 L dry reaction flask at room temperature, and the system was subjected to nitrogen replacement three times. Then the system was slowly heated to 37-42° C. and reacted for about 3-4 hours, and Grignard reagent reaction solution 2 was obtained. The reaction solution 2 was cooled to -40° C. The lithium tetrachlorocuprate solution was added dropwise within about 1 hour. Then a solution of Intermediate 4 A (25 g) in THF (250 mL) was added dropwise. After the addition, the system was slowly heated to room temperature and reacted for 3 h. Samples were applied for TLC until the raw materials basically disappeared. The temperature was controlled at 0-20° C., and 200 mL of 5% hydrochloric acid was added to quench the reaction and the system was stirred for 10-30 min. The system was concentrated under reduced pressure to almost no fraction. 100 mL water and 200 mL DCM were added, stirred and dissolved for 0.5-1 hour. The layers were separated. The organic layer was concentrated under reduced pressure at 40-45° C. to almost no fraction. 25 mL methanol was added and the organic layer was continued to be concentrated at 40-50° C. 25 mL methanol was added, and the system was cooled to below 10-30° C., stirred for 0.5-1 hour and filtered to obtain a crude product. The solid was recrystallized with DCM and methanol, and the obtained solid was dried below 50° C. to obtain 5 A. The weight yield was 52%, and the purity was about 99%. $^1$H NMR (400 MHz, CDCl$_3$) δ5.35(t, J=2.8 Hz, 1 H), 3.02-3.43 (m, 1 H), 2.36-2.27(m, 2 H), 2.00-1.82(m, 5 H), 1.56-0.87 (m, 28 H), 0.86(d, J=1.6 Hz, 6 H), 0.68(s, 3 H). $^{13}$C NMR (101 MHz, CDCl$_3$) δ140.78, 121.71, 71.80, 56.78, 56.18, 50.15, 42.33, 39.80, 39.53, 37.27, 36.51, 36.21, 35.80, 31.92, 31.92, 31.68, 28.24, 28.02, 24.31, 23.85, 22.83, 22.72, 22.57, 21.10, 19.41, 19.22, 12.35. (1 carbon signal overlapped with other signals)

Example 2: Preparation of 7-Dehydrocholesterol from Compound 1

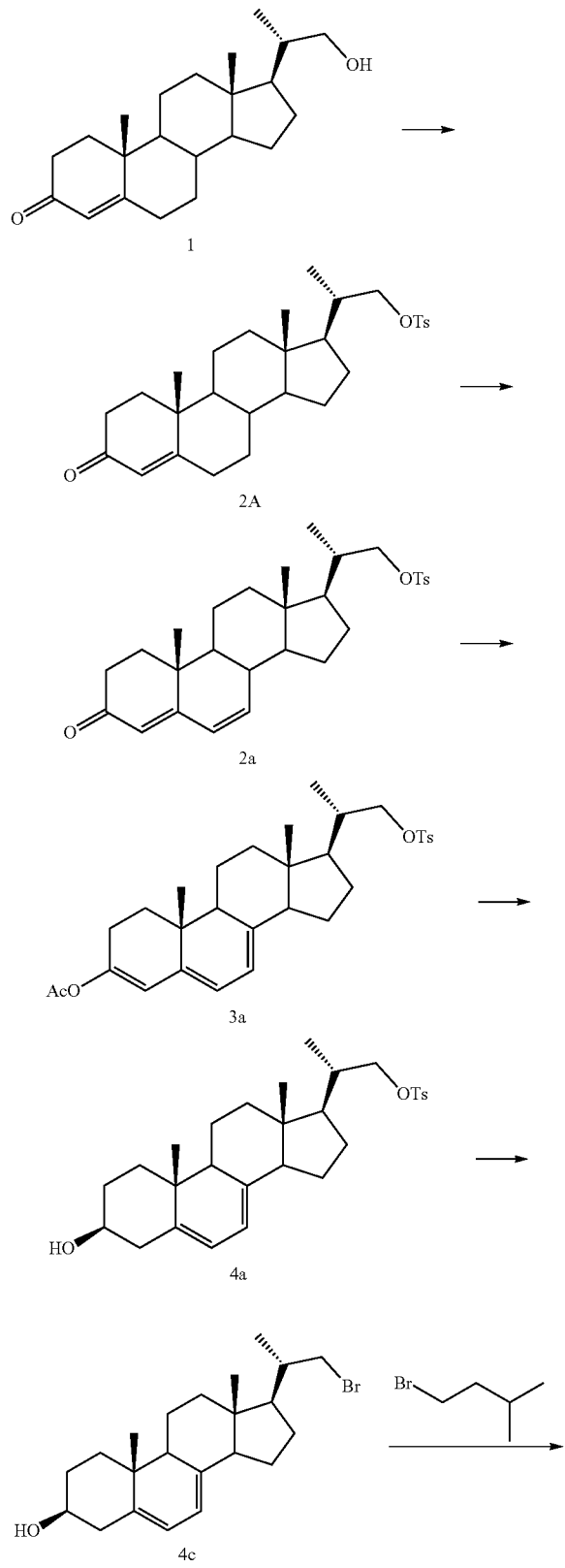

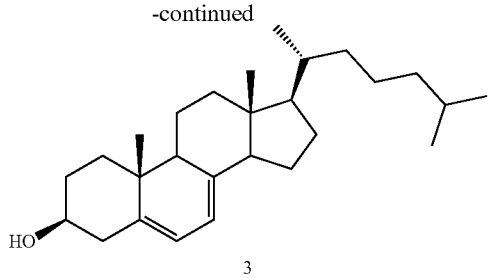

Step (1) See Example 1

Step (2) Intermediate 2a

Intermediate 2A (100 g), 500 mL of anhydrous methanol, PTS (5 g), and trimethyl orthoacetate (80 mL) were added to a reaction flask at room temperature under stirring. The reaction was maintained at 30° C. and was completed in about 3 h. After the reaction of the raw materials monitored by TLC was completed, 400 mL of acetone, 70 mL of water, and 80 g of tetrachlorobenzoquinone was added. The system was slowly heated to about 40° C. under stirring and reacted. The reaction was monitored by TLC and completed after about 3-4 h. The reaction system was poured into 1000 mL water to precipitate the solid and filtered. The solid was heated to 50° C. and dissolved with 400 mL of chloroform, and then filtered while it was still hot. The filter cake was heated and dissolved with 100 mL of chloroform. The mixture was filtered. The organic phases were combined. The combined organic phase was added with saturated sodium sulfite aqueous solution (containing 50 g of sodium sulfite), stirred for 1 h, left to stand for separation, and concentrated under reduced pressure to remove most of the solvent. Methanol was added and the organic layer was continued to be concentrated (this operation was performed 3 times). About 100 mL of methanol was retained. The organic layer was then cooled to 0° C., crystallized for 1 h, filtered with suction, eluted with methanol, and dried at 45-50° C. to obtain 2a. The weight yield was about 90%, and the purity was greater than 93%. $^1$H NMR (400 MHz, CDCl$_3$) δ7.74 (t, J=7.1 Hz, 2 H), 7.32 (d, J=7.7 Hz, 2 H), 6.06 (d, J=6.6 Hz, 2 H), 5.62 (d, J=6.5 Hz, 1 H), 3.94 (dd, J=9.0, 2.3 Hz, 1 H), 3.84-3.61 (m, 1 H), 2.64-2.46 (m, 1 H), 2.45-2.25 (m, 4 H), 2.13 (t, J=10.1 Hz, 1 H), 2.04-1.84 (m, 2 H), 1.82-1.31 (m, 6 H), 1.31-1.02 (m, 9 H), 1.04-0.89 (m, 3H), 0.73-0.58 (m, 3 H).

Step (3) Intermediate 3a

Intermediate 2a (100 g), 500 mL of acetic anhydride, and 200 mL of acetyl chloride were added to a reaction flask, and the system was heated and refluxed, and reacted under dark condition. After about 6-8 h, as monitored by TLC, the remaining raw material was less than 5%. The reaction solution was concentrated to dryness under reduced pressure at about 75° C. and cooled to room temperature. 50 mL of methanol was added dropwise to quench the remaining acetic anhydride. 100 mL of acetone was added and the system was concentrated under reduced pressure to remove most of the solvent. 200 mL of acetone was added and the system was continued to be concentrated. About 100 mL of acetone was retained. The system was then cooled to 0° C., crystallized for 1 h, filtered, and eluted with ice acetone. The solid was dried at 45-50° C. to obtain 3a. The weight yield was about 90%, and the purity was greater than 95%. $^1$H NMR (400 MHz, CDCl$_3$) δ7.76 (d, J=7.8 Hz, 2 H), 7.32 (d, J=7.9 Hz, 2H), 5.73 (s, 1 H), 5.55 (d, J=5.7 Hz, 1 H), 5.47 (s, 1 H), 3.95 (dd, J=9.2, 2.3 Hz, 1 H), 3.85-3.69 (m, 1 H), 2.54 (dd, J=21.0, 8.4 Hz, 1 H), 2.42 (s, 3 H), 2.19-1.96 (m, 6 H), 1.87 (dd, J=12.4, 5.3 Hz, 2 H), 1.77-1.49 (m, 6 H), 1.48-1.14 (m, 4 H), 1.03-0.91 (m, 6 H), 0.56 (s, 3 H).

Step (4) Intermediate 4a 7 g of anhydrous calcium chloride, 40 g of pyridine, 400 mL of methanol, and 400 mL of THF were added to a reaction flask at room temperature, and they were stirred and dissolved. After that, the system was cooled to −10 to −15° C., and sodium borohydride was added in 4 batches, each batch of 4 g with an interval of 10 min. After all the addition, Intermediate 3a (100 g) was added, and the system was maintained at −5 to −10° C. and reacted after the addition. The reaction was completed in about 8-10 h, which was monitored by TLC until no raw material remained. The reaction solution was slowly poured into 1000 mL of ice water with stirring, and was left until a solid was precipitated. 20 mL was stirred, and 20 mL of glacial acetic acid was slowly added into the system dropwise, filtered with suction, and eluted with water. The solid was dissolved with 300 mL of DCM. The aqueous layer was separated off, and the organic phase was concentrated under reduced pressure to remove most of the solvent. Then methanol was added and the organic layer was continued to be concentrated (this operation was performed 3 times). Finally, about 100 mL of methanol was retained. The organic layer was then cooled to 0° C., crystallized for 1 h, filtered with suction, eluted with ice methanol, and dried at 45-50° C. to obtain 4a. The weight yield was about 70%, and the purity was greater than 95%. $^1$H NMR (400 MHz, CDCl$_3$) δ7.77 (d, J=8.1 Hz, 2 H), 7.33 (d, J=8.0 Hz, 2 H), 5.54 (d, J=3.7 Hz, 1 H), 5.44 -5.20 (m, 1 H), 3.95 (dd, J=9.2, 2.7 Hz, 1 H), 3.80 (dd, J=9.1, 6.4 Hz, 1 H), 3.67-3.52 (m, 1 H), 2.58-2.37 (m, 4 H), 2.26 (t, J=12.8 Hz, 1 H), 2.08-1.78 (m, 6 H), 1.74-1.14 (m, 11 H), 0.98 (dd, J=11.3, 6.1 Hz, 3 H), 0.87 (d, J=31.0 Hz, 3 H), 0.59 (d, J=23.9 Hz, 3 H). $^{13}$C NMR (101 MHz, CDCl$_3$) δ144.59, 140.44, 140.05, 133.01, 129.72, 127.84, 119.39, 116.57, 75.49, 70.26, 53.97, 51.43, 46.03, 42.94, 40.67, 38.77, 38.27, 36.94, 36.44, 31.84, 27.26, 22.93, 21.57, 20.94, 16.92, 16.19, 11.70. (2 carbon signals overlapped with other signals).

Step (5) Intermediate 4c 500 mL of DMF, 100 g of Intermediate 4a, 39 g of lithium bromide, and 10 g of lithium carbonate were added to a reaction flask under room temperature conditions. The system was stirred well and subjected to nitrogen replacement three times, and shielded from light. The system was slowly heated to 80-85° C. and reacted. The reaction was monitored by TLC until the reaction was completed. The reaction solution was cooled to 10-30° C. and the temperature was controlled at 10-30° C. The reaction solution was then transferred to 10V water and stirred for 1-2 hours. The reaction solution was filtered, eluted with appropriate amount of water, and dried in an oven which was shielded from light at about 50° C., with a weight yield of about 80%. $^1$H NMR (400 MHz, CDCl$_3$) δ5.57 (d, J=3.8 Hz, 1 H), 5.45-5.30 (m, 1 H), 3.63 (dd, J=13.3, 9.3 Hz, 1 H), 3.51 (dd, J=9.7, 2.0 Hz, 1 H), 3.37 (dd, J=9.7, 5.9 Hz, 1 H), 2.47 (dd, J=14.1, 2.3 Hz, 1 H), 2.28 (t, J=12.8 Hz, 1 H), 2.13-1.83 (m, 6 H), 1.68 (ddd, J=26.3, 16.9, 7.6 Hz, 5 H), 1.51-1.22 (m, 6 H), 1.10 (t, J=8.6 Hz, 3 H), 0.95 (d, J=11.5 Hz, 3 H), 0.67 (d, J=23.9 Hz, 3 H).

Step (6) 7-Dehydrocholesterol (Compound 3)

0.80 g of copper chloride, 0.51 g of lithium chloride, and 30 mL of THF were added to a 250 mL dry reaction flask at room temperature, and the system was subjected to nitrogen replacement three times. The reaction was carried out at a temperature controlled at 10-30° C. for 1-2 hours until the solution was clear, and the lithium tetrachlorocuprate solution 1 was obtained. 4.16 g of magnesium chips and 100 mL of THF were added to a 1 L dry reaction flask at room temperature, and the system was subjected to nitrogen replacement three times. 26.2 g of bromoisopentane was added dropwise. The system was slowly heated to 37-42° C. and reacted for about 3-4 hours, and Grignard reagent reaction solution 2 was obtained. The reaction solution 2 was cooled to −40 to −10° C. The lithium tetrachlorocuprate solution was added dropwise within about 1 hour. The temperature was controlled at −20 to −10° C., and 20 g of Intermediate 4c solid was added. After the addition, the system was slowly heated to room temperature and reacted for 4 h. Samples were applied for TLC, and the raw materials were controlled to basically disappear. The temperature was controlled at 0-20° C., and 225 mL of ammonium chloride solution was added to quench the reaction. The temperature was controlled at 40-45° C. and the system was concentrated under reduced pressure to almost no fraction. 100 mL DCM was added for extraction. The layers were separated, and then the system was washed again with water. The organic layer was concentrated under reduced pressure at 40-45° C. to almost no fraction. 25 mL methanol was added and the organic layer was continued to be concentrated at 40-50° C. 25 mL methanol was added. The system was cooled to 10° C., stirred for 0.5-1 hour, and filtered. The filter cake was washed with 10 mL methanol. The solid was dried under vacuum below 50° C. to obtain compound 3 with a weight yield of 65%. $^1$H NMR (400 MHz, CDCl$_3$) δ5.57-5.40(m, 2 H), 3.64-3.58(m, 1 H), 2.49-2.23(m, 2 H), 2.12-1.83(m, 7 H), 1.72-0.83(m, 29 H), 0.62(s, 3 H).

Example 3: Preparation of 25-Hydroxy-7-Dehydrocholesterol from Compound 1

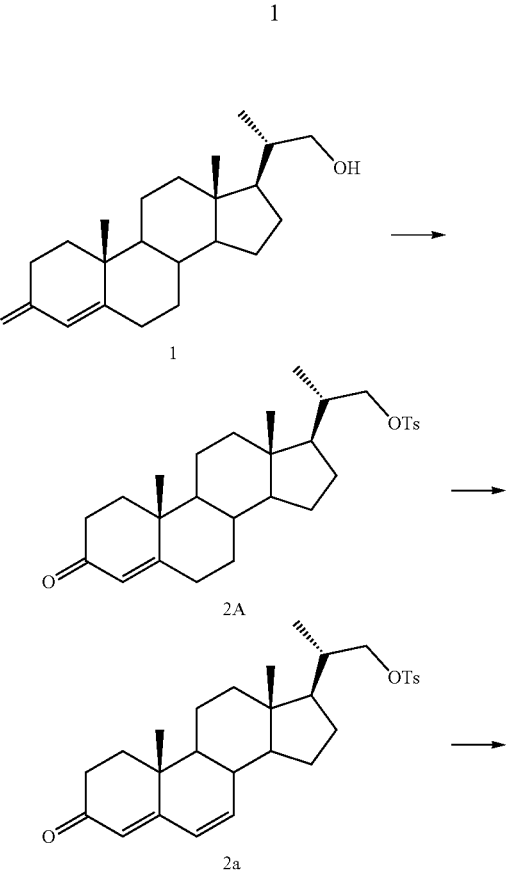

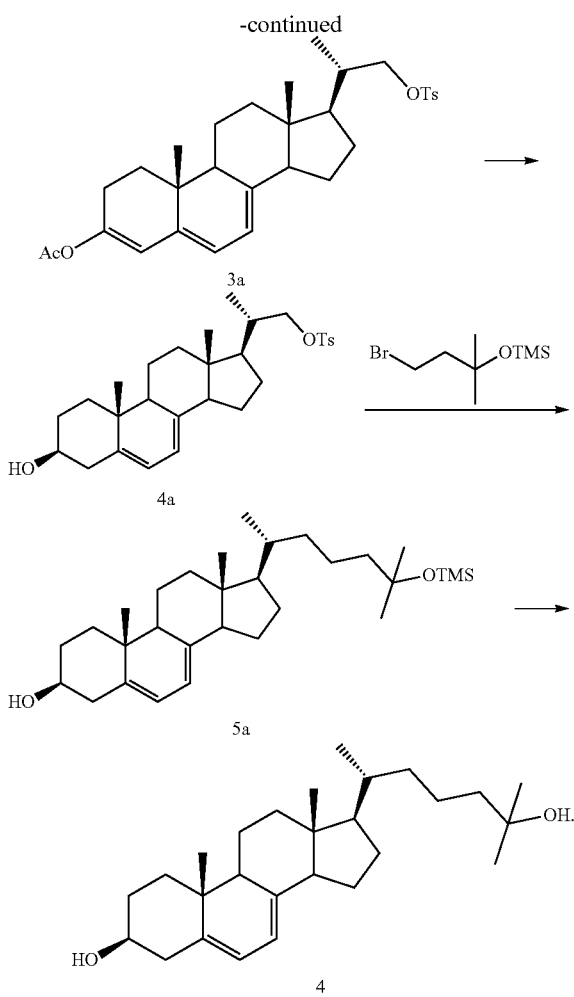

Step (1)-Step (4) See Example 2

Step (5) Intermediate 5a 2.41 g of copper chloride, 1.52 g of lithium chloride, and 80 mL of THF were added to a 250 mL dry reaction flask at room temperature, and the system was subjected to nitrogen replacement three times. The reaction was carried out at a temperature controlled at 10-30° C. for 1-2 hours until the solution was clear, and the lithium tetrachlorocuprate solution 1 was obtained. 12.5 g of magnesium chips and 350 mL of THF were added to a 1 L dry reaction flask at room temperature, and the system was subjected to nitrogen replacement three times. 138.5 g of 4-bromo-2-methyl-2-trimethylsiloxybutane was added dropwise. The system was slowly heated to 37-42° C. and reacted for about 3-4 hours, and Grignard reagent reaction solution 2 was obtained. The reaction solution 2 was cooled to −40° C. The lithium tetrachlorocuprate solution was added dropwise within about 1 hour. The temperature was controlled at −20 to −10° C., and 25 g of Intermediate 4a solid was added. After the addition, the system was slowly heated to room temperature and reacted for 4 h. Samples were applied for TLC, and the raw materials were controlled to basically disappear. 225 mL of ammonium chloride solution was added to quench the reaction. The temperature was controlled at 40-45° C. and the system was concentrated under reduced pressure to almost no fraction. The resulting mixture was directly used in the next reaction.

Step (6) 25-Hydroxy-7-Dehydrocholesterol (Compound 4)

The mixture obtained in step (5) was added with 125 mL of DCM for dissolution, and hydrochloric acid was added to adjust the pH to 3-4. After stirring at room temperature for 1 h, the organic phase was separated out and washed with water (50 mL×2). The organic phase was concentrated under reduced pressure at 40-45° C. to almost no fraction. 25 mL methanol was added, and the organic phase was continued to be concentrated at 40-50° C. 25 mL methanol was added. The system was cooled to 10-30° C., stirred for 0.5-1 hour, and filtered. The filter cake was washed with 10 mL methanol. The solid was dried under vacuum below 50° C. to obtain 5b with a weight yield of 65%. $^1$H NMR (400 MHz, CDCl$_3$) δ5.57(t, J=2.8 Hz, 1 H), 5.39(t, J=2.8 Hz, 1 H), 3.72-3.56(m, 1 H), 2.48-2.08(m, 3 H), 1.98-1.82(m, 5 H), 1.67-1.18(m, 23 H), 1.10-1.06(m, 1 H), 0.95-0.94(m, 6 H), 0.62(s, 3 H).

Example 4: Preparation of 25-Hydroxycholesterol from Compound 1

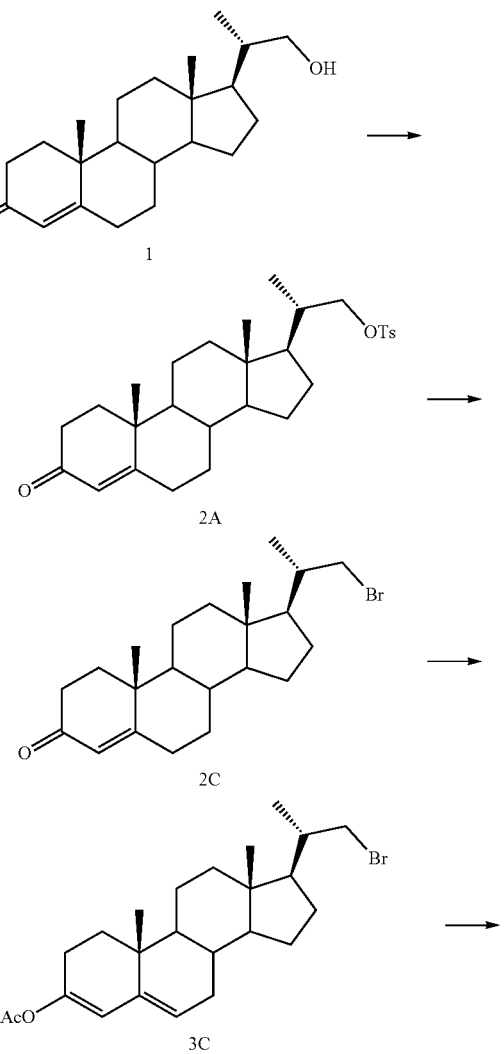

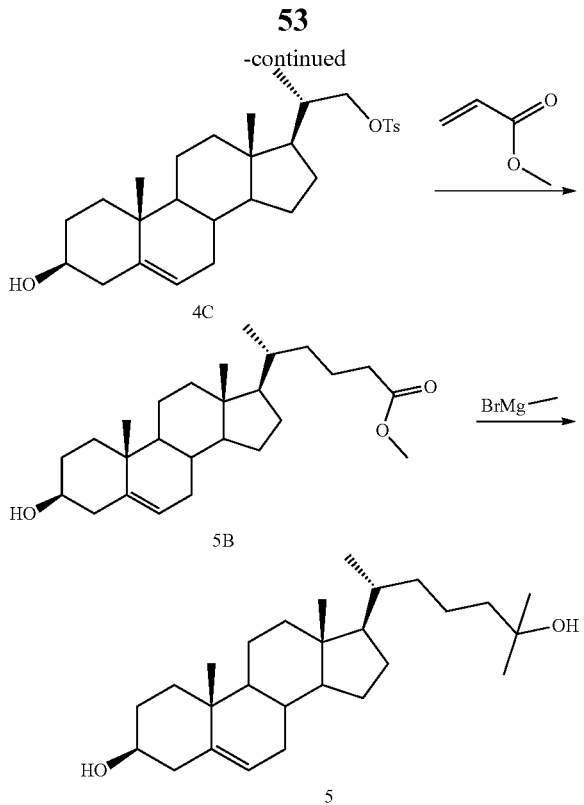

Step (1) See Example 1
Step (2) Intermediate 2C 500 mL of THF, 100 g of Intermediate 2A, 39 g of lithium bromide, and 10 g of lithium carbonate were added to a reaction flask at room temperature. The system was stirred well and subjected to nitrogen replacement three times, and shielded from light. The system was slowly heated to 55-60° C. and reacted. The reaction was monitored by TLC until the reaction was completed. The reaction solution was concentrated to a small volume to recover THF, and was cooled to 10-30° C. The temperature was controlled at 10-30° C., and the reaction solution was transferred to 1 L of water and stirred for 1-2 hours. The reaction solution was filtered, eluted with appropriate amount of water, and dried in an oven which was shielded from light at about 50° C., with a weight yield of about 80% and a purity of 96%.

Step (3) Intermediate 3C 200 g of Intermediate 2A, 20 g of PTS, and 600 mL of acetic anhydride were added to a reaction flask at room temperature. The system was slowly heated to 30-35° C. and reacted under stirring. The reaction was completed in about 4-6 hours, which was monitored by TLC until no raw material remained. The system was cooled to below 20° C. and slowly poured into 4 L of ice water with vigorous stirring. The system was then continued to be stirred for 2 h, filtered with suction, eluted with plenty of water to neutrality, and dried at 45-50° C. to obtain 3C. The weight yield was about 98%, and the purity was greater than 96%.

Step (4) Intermediate 4C 7 g of anhydrous calcium chloride, 40 g of pyridine, 400 mL of methanol, and 400 mL of THF were added to a reaction flask at room temperature, and they were stirred and dissolved. After that, the system was cooled to −10 to −15° C., and sodium borohydride was added in 4 batches, each batch of 4 g with an interval of 10 min while the temperature of the reaction system was maintained below −10° C. After all the addition, Intermediate 3C (100 g) was added, and the system was warmed naturally to room temperature and reacted after the addition. The reaction was completed in about 8-10 h, which was monitored by TLC until no raw material remained. The reaction solution was slowly poured into 1000 mL of ice water with stirring, and was left until a solid was precipitated. 20 mL was stirred, and 20 mL of glacial acetic acid was slowly added into the system dropwise, filtered with suction, and eluted with water. The solid was dissolved with 300 mL of DCM. The aqueous layer was separated off, and the organic phase was concentrated under reduced pressure to remove most of the solvent. Then methanol was added and the organic layer was continued to be concentrated (this operation was performed 3 times).

Finally, about 100 mL of 9 methanol was retained. The organic layer was then cooled to 0° C., crystallized for 1 h, filtered with suction, eluted with methanol, and dried at 45-50° C. to obtain 4A. The weight yield was about 80%, and the purity was greater than 95%. $^1$H NMR (400 MHz, CDCl$_3$) δ5.35 (d, J=5.2 Hz, 1 H), 3.50 (dd, J=9.8, 2.6 Hz, 2 H), 3.35 (dd, J=9.7, 5.9 Hz, 1 H), 2.26 (dt, J=24.0, 9.9 Hz, 2 H), 2.04-1.92 (m, 2 H), 1.84 (d, J=10.3 Hz, 3 H), 1.73-1.60 (m, 3 H), 1.49 (td, J=14.6, 9.6 Hz, 6 H), 1.31-1.18 (m, 3 H), 1.08 (t, J=7.8 Hz, 5 H), 1.01 (s, 3 H), 0.97-0.89 (m, 1 H), 0.70 (s, 3 H).

Step (5) Intermediate 5B 180 mL of pyridine, 30 g of zinc powder, and 21 g of nickel chloride hexahydrate were added to a reaction flask. The system was subjected to nitrogen replacement three times, and added with 45 g of methyl acrylate dropwise within 10 min. After heated to 60° C. and stirred vigorously for 1 h, the solution turned black and the system was basically homogeneous. The system was cooled to 15-20° C., and added with 30 g of Intermediate 4C solid. After the addition, the reaction was carried out at about 20-30° C. for 3 h. After the reaction was completed as monitored by TLC, 150 mL of ethyl acetate was added and stirred for 20 minutes, and a large amount of suspension was produced in the system.

After filtered through a layer of celite, the filter cake was eluted with ethyl acetate. 180 mL of 10% hydrochloric acid was added to wash the filter cake, and the layers were separated. The organic layer was washed with a 6V 10% sodium carbonate aqueous solution and separated out. The organic phase was concentrated to dryness, and added with methanol to recrystallize to obtain Intermediate 5B with a weight yield of about 80%. $^1$H NMR (400 MHz, CDCl$_3$) δ5.32 (d, J=4.1 Hz, 1 H), 3.64 (s, 3 H), 3.49 (td, J=10.7, 5.4 Hz, 1 H), 2.41-2.08 (m, 4 H), 2.01-1.91 (m,3 H), 1.79 (t, J=15.3 Hz, 3 H), 1.68 (dd, J=11.2, 6.9 Hz, 1 H), 1.59-1.26 (m, 9 H), 1.23-0.87 (m, 14 H), 0.65 (s, 3 H). $^{13}$C NMR (101 MHz, CDCl$_3$) δ174.32, 140.74, 121.56, 71.67, 56.69, 55.76, 51.39, 50.06, 42.28, 42.21, 39.70, 37.21, 36.45, 35.44, 35.36, 34.47, 31.84, 31.86, 31.56, 28.10, 24.21, 21.48, 21.02, 19.34, 18.55, 11.79.

Step (6) 25-Hydroxycholesterol (Compound 5)

50 g of Intermediate 5B and 500 mL of THF were added to a reaction flask. The system was subjected to nitrogen replacement three times. After that, the system was cooled down to 0-10° C., and slowly added with 300 mL of a solution of 2M methylmagnesium chloride in THF dropwise within 0.5 h. After the addition, the system was heated to room temperature and reacted for 1 h. The reaction was monitored by TLC to confirm that the reaction was complete. The system was cooled to 0-10° C., and slowly added with ammonium chloride aqueous solution dropwise to quench the reaction. The layers were separated, and the aqueous layer was extracted with 150 mL DCM. The organic layers were combined, concentrated under reduced pressure below 50° C. to remove most of the solvent, and added with toluene to continue to be concentrated to a paste. It was stirred at 10-30° C. for 1 h and filtered. The filter cake was transferred to a reaction flask. DCM and 3 methanol were added to make it dissolved and clear. It was concentrated under reduced pressure below 50° C. to remove most of the solvent, added with methanol to continue to be concentrated until about a solid was precipitated. The system was stirred at 10-30° C. for 1 h and filtered. The filter cake was washed with a small amount of methanol and dried at 50° C. to obtain compound 5 with a weight yield of about 70%. $^1$H NMR (400 MHz, CDCl$_3$) δ5.27 (s, 1 H), 4.59(s, 1 H), 4.03(s, 1 H), 2.13-2.03(m, 2 H), 1.96-1.91(m, 2 H), 1.78-1.68(m, 3 H), 1.67-0.95(m, 33 H), 0.66(s, 3 H).

Example 5: Preparation of 25-Hydroxy-7-Dehydrocholesterol from Compound 1.

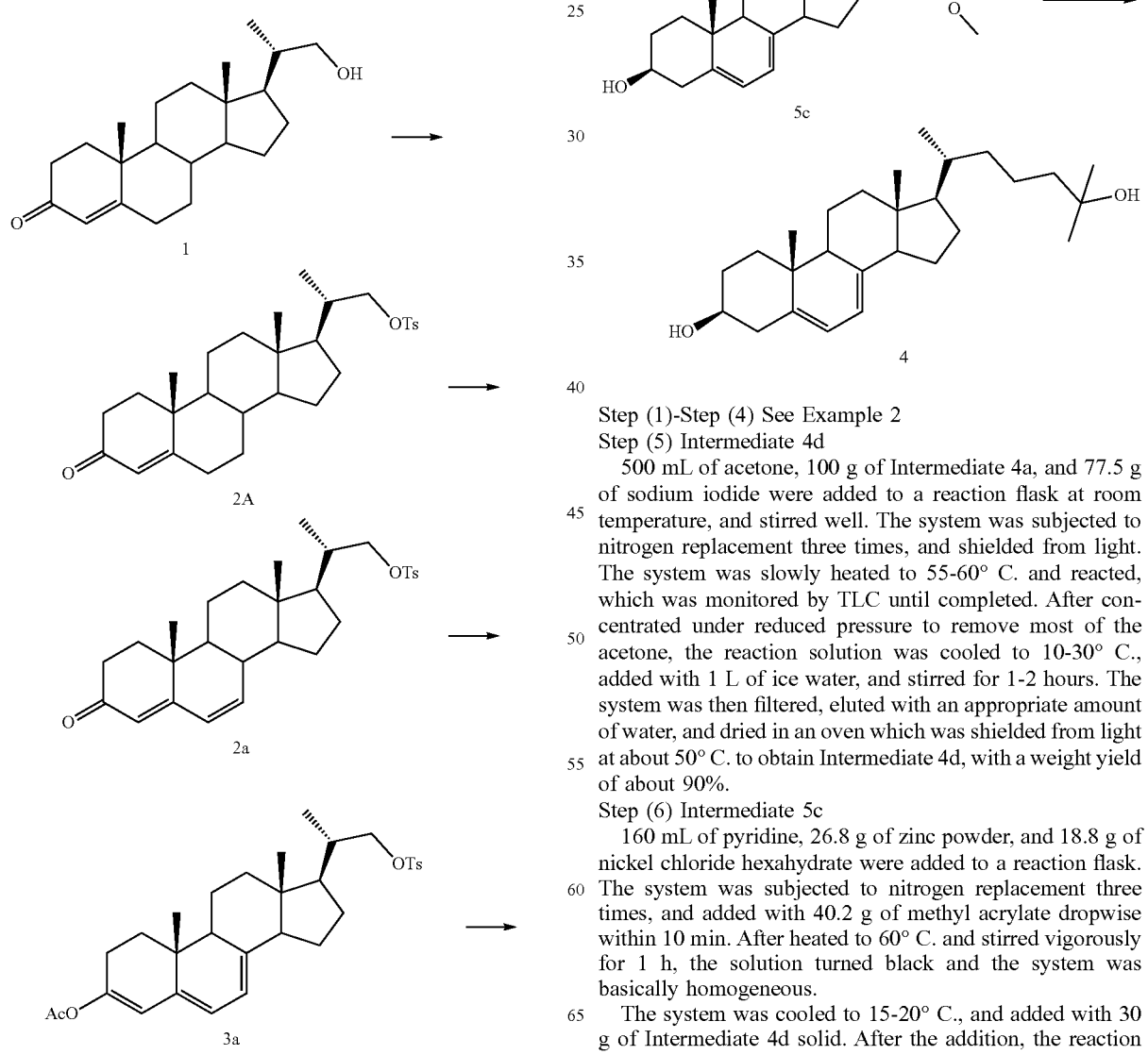

Step (1)-Step (4) See Example 2

Step (5) Intermediate 4d 500 mL of acetone, 100 g of Intermediate 4a, and 77.5 g of sodium iodide were added to a reaction flask at room temperature, and stirred well. The system was subjected to nitrogen replacement three times, and shielded from light. The system was slowly heated to 55-60° C. and reacted, which was monitored by TLC until completed. After concentrated under reduced pressure to remove most of the acetone, the reaction solution was cooled to 10-30° C., added with 1 L of ice water, and stirred for 1-2 hours. The system was then filtered, eluted with an appropriate amount of water, and dried in an oven which was shielded from light at about 50° C. to obtain Intermediate 4d, with a weight yield of about 90%.

Step (6) Intermediate 5c 160 mL of pyridine, 26.8 g of zinc powder, and 18.8 g of nickel chloride hexahydrate were added to a reaction flask. The system was subjected to nitrogen replacement three times, and added with 40.2 g of methyl acrylate dropwise within 10 min. After heated to 60° C. and stirred vigorously for 1 h, the solution turned black and the system was basically homogeneous.

The system was cooled to 15-20° C., and added with 30 g of Intermediate 4d solid. After the addition, the reaction was carried out at about 20-30° C. for 3 h. After the reaction was completed as monitored by TLC, 150 mL of ethyl acetate was added and stirred for 20 minutes, and a large amount of suspension was produced in the system. After filtered through a layer of celite, the filter cake was eluted with ethyl acetate. The organic phases were combined and concentrated under reduced pressure to dryness. The obtained oily substance was subjected to column chromatography separation (with an eluant of ethyl acetate: petroleum ether of 1:6), concentrated to a paste, cooled to 0° C. for crystallization and filtered. The filter cake was dried to obtain Intermediate 5c with a weight yield of about 65%. $^1$H NMR (400 MHz, CDCl$_3$) δ5.54 (d, J=3.9 Hz, 1 H), 5.41-5.27 (m, 1 H), 3.71-3.51 (m, 4 H), 2.44 (dd, J=14.0, 2.8 Hz, 1 H), 2.33-2.17 (m, 3 H), 2.13-1.80 (m, 8 H), 1.74-1.18 (m, 12 H), 1.15-1.01 (m, 1 H), 0.96-0.86 (m, 6 H), 0.59 (s, 3 H). $^{13}$C NMR (101 MHz, CDCl$_3$) δ174.31, 141.14, 139.81, 119.51, 116.31, 70.33, 55.48, 54.41, 51.40, 46.18, 42.87, 40.72, 39.13, 38.34, 36.97, 35.78, 35.29, 34.46, 31.90, 27.97, 22.95, 21.49, 21.05, 18.69, 16.23, 11.74.

Step (7) 25-Hydroxy-7-Dehydrocholesterol (Compound 4)

50 g of Intermediate 5c and 500 mL of were added to a reaction flask. The system was subjected to nitrogen replacement three times. After that, the system was cooled down to 0-10° C., and slowly added with 300 mL of 2M methylmagnesium chloride dropwise within 0.5 h. After the addition, the system was heated to room temperature and reacted for 1 h. The reaction was monitored by TLC to confirm that the reaction was complete. The system was cooled to 0-10° C., and slowly added with ammonium chloride aqueous solution dropwise to quench the reaction. The layers were separated, and the aqueous layer was extracted with 150 mL DCM. The organic phases were combined, concentrated under reduced pressure below 50° C. to remove most of the solvent, and added with toluene to continue to be concentrated until a solid was precipitated. The system was cooled to 10° C., stirred for 1 h, and filtered. The filter cake was transferred to a reaction flask, and 150 mL of DCM and 100 mL of methanol were added until the solution was clear. It was concentrated under reduced pressure below 50° C. to remove most of the solvent, and added with methanol to continue to be concentrated to a paste. The system was stirred at 0-10° C. for 1 h and filtered. The filter cake was washed with a small amount of methanol and dried at 50° C. to obtain 25-hydroxydehydrocholesterol with a weight yield of about 80%. The $^1$H NMR data were basically the same as those determined in step (6) of Example 3.

Example 6: Preparation of 25-Hydroxycholesterol from Compound 1

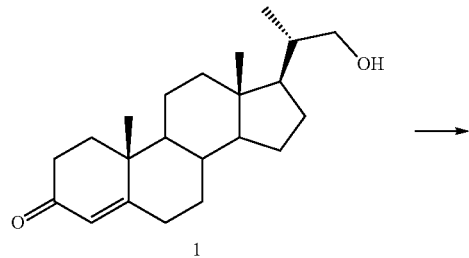

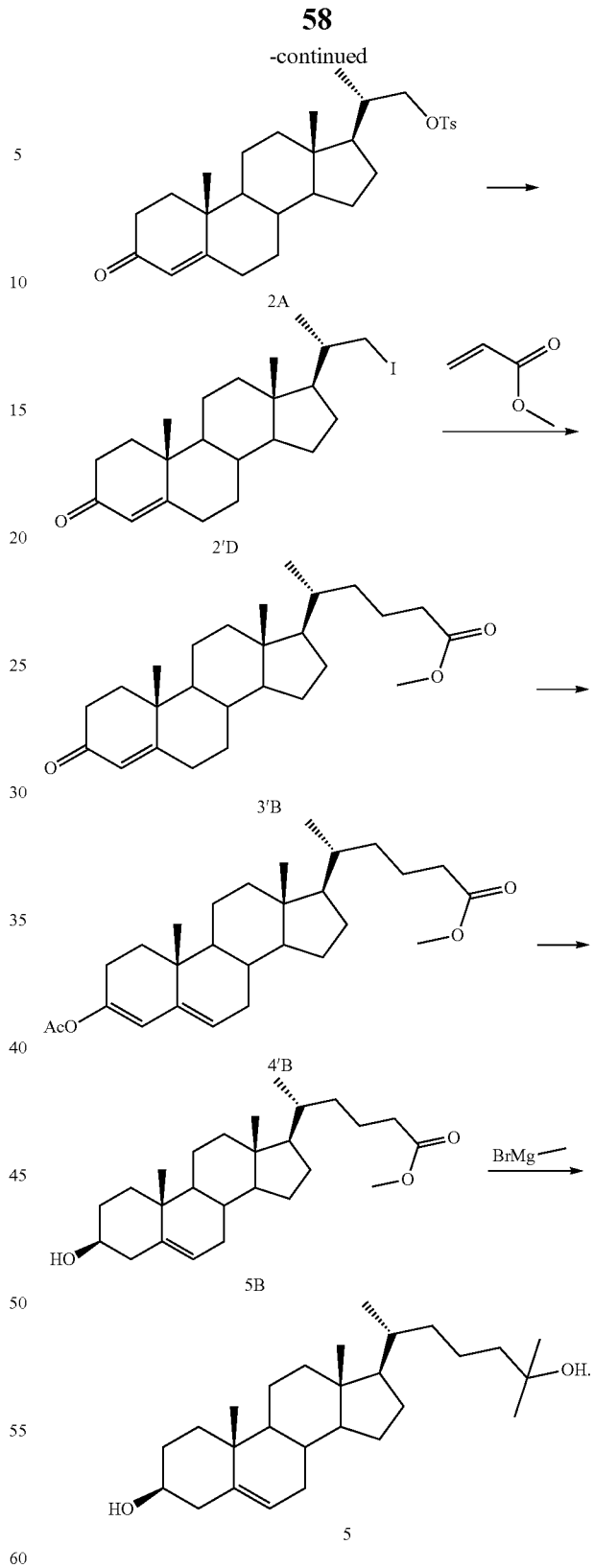

Step (1) See Example 1

Step (2) Intermediate 2'D 500 mL of acetone, 100 g of Intermediate 2A, and 80 g of sodium iodide were added to a reaction flask at room temperature and stirred well. The system was subjected to nitrogen replacement three times, and shielded from light.

The system was slowly heated to 55-60° C. and reacted for 2-3 h, which was monitored by TLC until the reaction was completed. After concentrated under reduced pressure to remove most of the acetone, the reaction solution was cooled to 10-30° C., added with 1 L of ice water, and stirred for 1-2 hours. The system was then filtered, eluted with an appropriate amount of water, and dried in an oven which was shielded from light at about 50° C. The weight yield was about 90% and the purity was greater than 97%.

Step (3) Intermediate 3'B 160 mL of pyridine, 26.8 g of zinc powder, and 18.8 g of nickel chloride hexahydrate were added to a reaction flask. The system was subjected to nitrogen replacement three times, and added with 40.2 g of methyl acrylate dropwise within 10 min. After heated to 60° C. and stirred vigorously for 1 h, the solution turned black and the system was basically homogeneous. The system was cooled to 15-20° C., and added with 30 g of Intermediate 2'D. After the addition, the reaction was carried out at about 25-30° C. for 3 h. After the reaction was completed as monitored by TLC, 150 mL of ethyl acetate was added and stirred for 20 minutes, and a large amount of suspension was produced in the system. After filtered through a layer of celite, the filter cake was eluted with ethyl acetate. 200 L of 5% hydrochloric acid was added to wash, and the layers were separated. Then 200 mL of water was added to wash, and the layers were separated. The organic layer was concentrated to a small volume. Ethanol was added to continue the concentration, and the organic layer was continued to be concentrated to a paste. The system was cooled to 0-10° C., crystallized for 1 h, and filtered. The filter cake was dried to obtain the product with a weight yield of about 70% and a purity of 94%. $^1$H NMR (400 MHz, CDCl$_3$) δ5.71 (s, 1 H), 3.65 (s, 3 H), 2.49-2.14 (m, 6 H), 2.01 (dd, J=13.3, 3.3 Hz, 2 H), 1.92-1.31 (m, 10 H), 1.31-0.83 (m, 15 H), 0.69 (s, 3 H).

Step (4) Intermediate 4'B 100 mL of acetic anhydride and 50 g of Intermediate 3'B were added to a reaction flask followed by 5 g of p-toluenesulfonic acid under nitrogen protection. The system was heated to 25-30° C. and reacted for 4-6 h. The reaction was monitored by TLC, and the raw materials were basically reacted completely. Under vigorous stirring, the reaction system was slowly added into 1000 mL of water dropwise, and a solid was precipitated. After stirring for 2 h, the system was filtered. The filter cake was washed with a large amount of water until neutral, and dried at 45-50° C. The weight yield was 104%, and the purity was 95%.

Step (5) Intermediate 5B 10 g of anhydrous calcium chloride and 400 mL of absolute ethanol were added to a reaction flask at room temperature, and stirred until the solution was clear. 200 mL of DCM was added followed by 100 g of Intermediate 4'B all at once and stirred well. Sodium borohydride was added in 4 batches, each batch of 4 g with an interval of 5 min. After all the addition, the reaction was continued to perform at room temperature for 2-4 h, which was monitored by TLC until no raw material remained. The system was slowly added with 20 mL of glacial acetic acid to quench the reaction, concentrated to remove the organic solvent, added with 1000 mL of ice water to precipitate a solid, filtered with suction, and eluted with water. The solid was dissolved with 300 mL of DCM. The aqueous layer was separated off, and the organic phase was concentrated under reduced pressure to remove most of the solvent. Then methanol was added and the organic layer was continued to be concentrated. Finally, about 100 mL of methanol was retained. The system was then cooled to 0-10° C., crystallized for 1 h, filtered with suction, eluted with methanol, and dried at 45-50° C. to obtain Intermediate 5B. The weight yield was about 70%, and the purity was greater than 97%. The $^1$H NMR data were basically the same as those determined in step (5) of Example 4.

Step (7) 25-Hydroxycholesterol (Compound 5)

Compound 5 was prepared according to step (7) of Example 4, and $^1$H NMR data were basically the same as those determined in Example 4.

Example 7: Preparation of 25-Hydroxy-7-Dehydrocholesterol from Compound 1

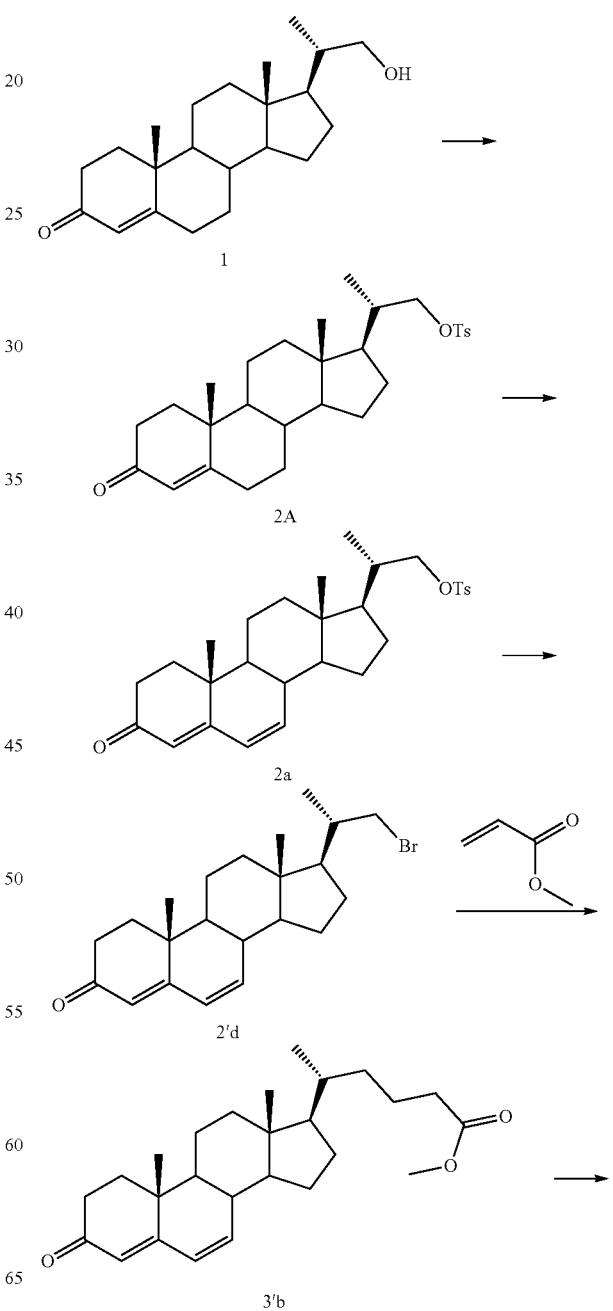

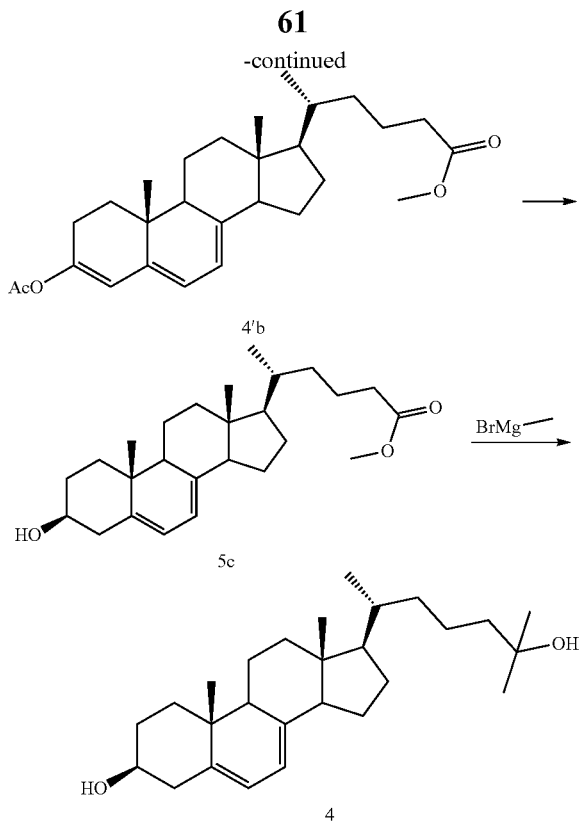

Step (1)-Step (2) See Example 2
Step (3) Intermediate 2'd 500 mL of THF, 100 g of Intermediate 2a, and 39 g of lithium bromide were added to a reaction flask at room temperature. The system was stirred well and subjected to nitrogen replacement three times. The system was slowly heated to 80-85° C. and reacted for 3-5 h, and the reaction was monitored by TLC. After the reaction was completed, the reaction solution was cooled to 10-30° C. The temperature was controlled at 10-30° C., and the reaction solution was transferred to 1 L of water and stirred for 1-2 hours. The reaction solution was filtered, eluted with appropriate amount of water, and dried in an oven at about 50° C., with a weight yield of about 78% and a purity of 96%.

Step (4) Intermediate 3'b 180 mL of pyridine, 30 g of zinc powder, and 21 g of nickel chloride hexahydrate were added to a reaction flask. The system was subjected to nitrogen replacement three times, and added with 45 g of methyl acrylate dropwise within 10 min. After heated to 60° C. and stirred vigorously for 1 h, the solution turned black and the system was basically homogeneous. The system was cooled to 15-20° C., and added with 30 g of Intermediate 2'd solid. After the addition, the reaction was carried out at about 20-30° C. for 3 h. After the reaction was completed as monitored by TLC, 150 mL of ethyl acetate was added and stirred for 20 minutes, and a large amount of suspension was produced in the system.

After filtered through a layer of celite, the filter cake was eluted with ethyl acetate. The filtrate was combined and added with 100 mL of 10% hydrochloric acid to wash, and the layers were separated. The organic layer was added with 200 mL of water to wash, and the layers were separated. The organic layer was concentrated to dryness, added with about 100 mL of methanol, cooled to 0-5° C., crystallized for 1 h, and filtered. The filter cake was dried to obtain 3'b. The weight yield was about 78%, and the purity was 92%.

Step (5) Intermediate 4'b

Intermediate 3'b (100 g), 300 mL of acetic anhydride, and 200 mL of acetyl chloride were added to a reaction flask at room temperature, and the system was heated to 75-85° C. and reacted under dark condition. When the remaining raw material was less than 5% (about 6-8 h) as monitored by TLC, the reaction solution was concentrated to dryness under reduced pressure at about 75° C. and cooled to room temperature. 50 mL of methanol was added dropwise to quench the remaining acetic anhydride. 100 mL of acetone was added and the system was concentrated under reduced pressure to a small volume. 200 mL of acetone was added and the system was continued to be concentrated. About 50 mL of acetone was retained. The system was then cooled to 0° C., crystallized for 1 h, filtered, and eluted with ice acetone. The solid was dried at 45-50° C. to obtain 4'b. The weight yield was about 95%, and the purity was greater than 95%.

Step (6) Intermediate 5c 10 g of anhydrous calcium chloride and 400 mL of absolute methanol were added to a reaction flask at room temperature, and stirred until the solution was clear. 200 mL of DCM was added followed by 100 g of Intermediate 4'b all at once and stirred well. 10 g of sodium borohydride was added, and the reaction was maintained at room temperature for 2-4 h. After the reaction was completed as monitored by TLC, the system was slowly added with 20 mL of glacial acetic acid to quench the reaction, concentrated to remove the organic solvent, added with 1000 mL of ice water to precipitate a solid, filtered with suction, and eluted with water. The solid was dissolved with 300 mL of DCM. The aqueous layer was separated off, and the organic phase was concentrated under reduced pressure to remove most of the solvent. Then methanol was added and the organic layer was continued to be concentrated. Finally, about 100 mL of methanol was retained. The system was then cooled to 0-10° C., crystallized for 1 h, filtered with suction, eluted with methanol, and dried at 45-50° C. to obtain Intermediate 5'B. The weight yield was about 70%, and the purity was greater than 97%. $^1$H NMR (400 MHz, CDCl$_3$) δ5.54 (d, J=3.9 Hz, 1 H), 5.41-5.27 (m, 1 H), 3.71-3.51 (m, 4 H), 2.44 (dd, J=14.0, 2.8 Hz, 1 H), 2.33-2.17 (m, 3H), 2.13-1.80 (m, 8 H), 1.74-1.18 (m, 12 H), 1.15-1.01 (m, 1 H), 0.96-0.86 (m, 6 H), 0.59 (s, 3 H). $^{13}$C NMR (101 MHz, CDCl$_3$) δ174.31, 141.14, 139.81, 119.51, 116.31, 70.33, 55.48, 54.41, 51.40, 46.18, 42.87, 40.72, 39.13, 38.34, 36.97, 35.78, 35.29, 34.46, 31.90, 27.97, 22.95, 21.49, 21.05, 18.69, 16.23, 11.74.

Step (7) 25-Hydroxy-7-Dehydrocholesterol (Compound 4)

Compound 4 was prepared according to step (7) of Example 5, and $^1$H NMR data were basically the same as those determined in Example 5.

Example 8: Preparation of Ergosterol from Compound 1

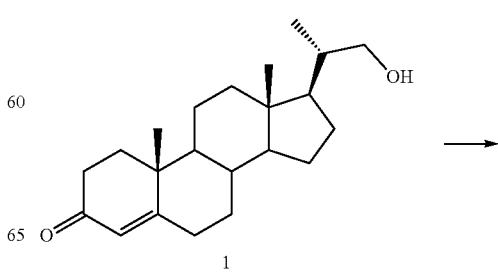

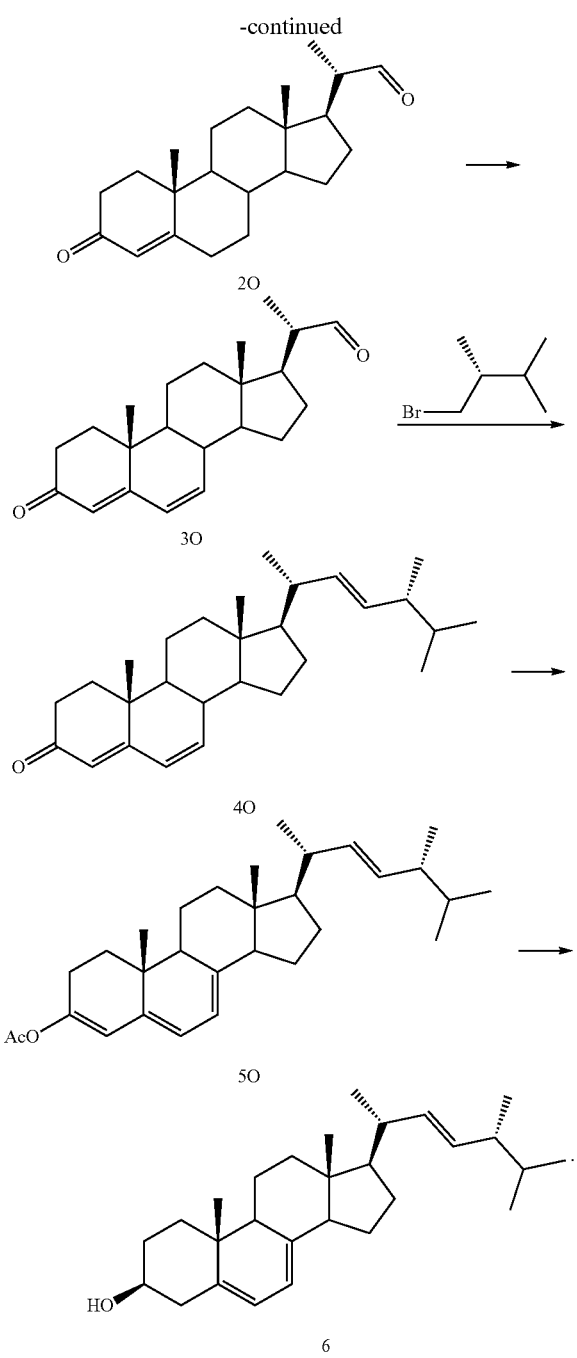

Step (1) Intermediate 2O 200 g of compound 1 and 1 g of TEMPO were added to a 3000 mL three-necked flask, and then 700 mL of DCM was added. After stirring to dissolve, an aqueous solution of sodium bromide/sodium bicarbonate (containing 7.2 g of sodium bromide and 9.88 g of sodium bicarbonate, 50 mL of water) was added. The system was cooled to below 5° C., and the temperature was controlled at −5 to 5° C. 500 mL of 8% sodium hypochlorite solution was added dropwise. After the reaction was completed as monitored by TLC (ethyl acetate: toluene=1:1), an aqueous sodium thiosulfate solution (17.2 g of sodium thiosulfate, 178 mL of water) was added to terminate the reaction. The system was heated to 30-35° C. and stirred for 10 min. The layers were separated. The aqueous phase was extracted with DCM (400 mL*2), and the organic phases were combined and washed with water. The organic layer was added with 80 mL of water to continue to be concentrated to remove the solvent. The system was then added with 1200 mL of water, stirred, cooled to 0-5° C., crystallized for 1 h, filtered, and dried at 50° C. to obtain Intermediate 2O. The purity detected by HPLC was >98.5%, and the yield was 97%. $^1$H NMR (400 MHz, CDCl$_3$) δ9.53 (d, J=3.1 Hz, 1 H), 5.69 (s, 1 H), 2.50-2.15 (m, 5 H), 2.01-1.89 (m, 2 H), 1.88-1.73 (m, 2 H), 1.72-1.57 (m, 2 H), 1.56-1.28 (m, 5 H), 1.25-0.83 (m, 11 H), 0.72 (s, 3 H).

Step (2) Intermediate 3O 100 g of Intermediate 2O and 100 mL of trimethyl orthoacetate were added to a three-necked reaction flask, and stirred at room temperature for 10 min. 1 g of p-toluenesulfonic acid was added under nitrogen protection. The system was slowly heated to 40-45° C., and the reaction was maintained at the temperature for 4-5 h. The reaction was monitored by TLC (the developing reagent was PE:EA=5:1). After the reaction was completed, the system was cooled to room temperature (20-25° C.), and added with triethylamine to adjust the pH of the system to about 8. Then 500 mL of acetone and 80 g of water were added to a reaction flask and stirred for 10 min. 80 g of tetrachlorobenzoquinone was added. The system was then heated to 35-40° C. and reacted for 4 h. 200 g of water was added, and then 80 mL of concentrated hydrochloric acid was added dropwise. The reaction solution was stirred for 2 h at 40° C. for hydrolysis. After the hydrolysis was completed as confirmed by TLC, the reaction solution was poured into 1000 mL of water and stirred at room temperature for 2 h. The precipitated solid was collected by filtration. The filter cake was washed with water to neutrality, and then mixed with 400 mL of chloroform.

The mixture was heated to dissolve the solid, and filtered while it was hot. 300 mL of sodium sulfite aqueous solution (containing 50 g of sodium sulfite) was added to the filtrate and stirred for 1 h. After standing, the organic phase was separated out and concentrated under reduced pressure to remove most of the solvent. Then methanol was added and the organic phase was continued to be concentrated (this operation was performed 3 times). About 100 mL of methanol was retained. The system was then cooled to 0° C., crystallized for 1 h, filtered with suction, eluted with methanol, and dried at 45-50° C. to obtain Intermediate 3O. The weight yield was 93%, and the purity was greater than 95%.

$^1$H NMR (400 MHz, CDCl$_3$) δ9.54 (d, J=2.9 Hz, 1 H), 6.17-5.95 (m, 2 H), 5.63 (s, 1 H), 2.58-2.47 (m, 1 H), 2.45-2.29 (m, 2 H), 2.17 (t, J=10.5 Hz, 1 H), 2.03-1.74 (m, 4 H), 1.67 (td, J=13.8, 5.0 Hz, 1 H), 1.58-1.12 (m, 9 H), 1.08 (d, J=5.0 Hz, 5 H), 0.74 (d, J=18.5 Hz, 3 H). $^{13}$C NMR (101 MHz, CDCl$_3$) δ204.43, 199.29, 163.44, 140.73, 127.91, 123.57, 52.68, 50.70, 50.54, 49.25, 43.83, 39.09, 37.52, 35.93, 33.81, 33.79, 26.89, 23.96, 20.50, 16.19, 13.33, 12.17.

Step (3) Intermediate 4O 500 mL of acetonitrile was added to a 1000 mL three-necked flask, followed by 100 g of bromoisopentane and 100 g of triphenylphosphine. Under nitrogen protection, the system was refluxed and reacted for 24 h. After the reaction was basically completed as monitored by TLC, the reaction solution was concentrated to remove the solvent, added with an appropriate amount of petroleum ether and stirred for 1 h. The remaining triphenylphosphine was removed from the reaction by filtration, and the resulting filter cake was Ylide reagent.

1000 mL of anhydrous THF was added to a 1000 mL three-necked flask, followed by the prepared Ylide reagent. Under nitrogen protection, 300 mL of n-butyllithium was added dropwise at 0° C. The temperature was controlled at below 10° C., and then 100 g of Intermediate 3O was added. The system was slowly heated to room temperature and reacted for 1 h. The reaction was monitored by TLC. After the reaction was completed, 50 mL of water was added dropwise to quench the reaction. The reaction solution was concentrated to remove THF, and added with 500 mL of water. The aqueous phase was extracted with petroleum ether (400 mL*2), and the organic phases were combined and concentrated. Methanol was added and the organic phase was continued to be concentrated to a small volume. The system was stirred, cooled to 0-5° C., crystallized for 1 hour, filtered, and dried at 50° C. to obtain Intermediate 4O with a yield of 70%.

Step (4) Intermediate 5O 280 mL of acetic anhydride, 140 mL of acetyl chloride and 70 g of Intermediate 4O were sequentially added to a clean, dry and light-proof reaction flask, and the system was subjected to nitrogen replacement three times. Under stirring, the system was slowly heated to 75-85° C. and reacted under dark condtion (violent reflux). As monitored by TLC (toluene: acetone=4:1), the reaction was completed in about 6-8 h. After the reaction was completed, the reaction solution was concentrated under reduced pressure to a small volume at 70-80° C. under dark condition. Methanol was added dropwise, and the temperature was maintained below 10° C. After the addition of methanol, the system was stirred for 15-20 min, and 200 mL of methanol was added again. The system was concentrated to a paste, cooled to 0-5° C. to crystallize, filtered, and dried at 45-50° C. under dark condition to obtain Intermediate 5O with a yield of about 90% and a purity of 94%.

Step (5) Ergosterol (Compound 6)

180 g of absolute ethanol, 180 g of DCM, and 6 g of anhydrous calcium chloride were added to a reaction flask. The mixture was stirred to dissolve the anhydrous calcium chloride. 60 g of Intermediate 5O was added and stirred. The temperature in the reactor was controlled to about 20° C., and 6 g of sodium borohydride was added in batches within 20 min. The reaction was carried out at 30-35° C. for 2-3 hours. The reaction was monitored by TLC until there was no raw material, and if the reaction was not completed, the reaction time was extended until the reaction was completed. The developing solvent was PE:EA:DCM 5:1:2. After the reaction was completed, the temperature was controlled, and the stock solution was slowly added dropwise. 60 mL of 3% hydrochloric acid. The reaction solution was concentrated to remove DCM and ethanol. 200 mL of DCM was added, and 3% hydrochloric acid was used to adjust to weak acidity. The organic phase was separated out, washed with sodium bicarbonate aqueous solution, and concentrated under reduced pressure. Ethanol was added. The organic phase was continued to be concentrated until there was no DCM, and continued to be concentrated until thick. The organic phase was stirred and crystallized at 0° C. for 1-2 hours. The precipitated solid was collected by filtration, and dried at 45-50° C. under dark condition to obtain 45 g of solid. The yield was about 75%, and the purity was 96%. $^{1}$H NMR (400 MHz, CDCl$_3$) δ5.56 (dd, J=10.6, 7.2 Hz, 1 H), 5.37 (dd, J=14.1, 11.3 Hz, 1 H), 5.26-5.04 (m, 2 H), 3.71-3.50 (m, 1 H), 2.45 (dt, J=30.1, 15.1 Hz, 1 H), 2.26 (dd, J=25.2, 12.7 Hz, 1 H), 2.11-1.18 (m, 19 H), 1.02 (t, J=7.4 Hz, 3 H), 0.96-0.88 (m, 6 H), 0.82 (dd, J=13.1, 6.7 Hz, 6 H), 0.63 (s, 3 H). $^{13}$C NMR (101 MHz, CDCl$_3$) δ141.35, 139.77, 135.56, 131.98, 119.59, 116.28, 70.47, 55.74, 54.56, 46.26, 42.83, 40.79, 40.41, 39.09, 38.38, 37.04, 33.09, 31.99, 28.28, 23.00, 21.11, 19.95, 19.64, 17.60, 16.28, 12.05

Example 9: Synthesis of Cholesterol According to Wittig Route

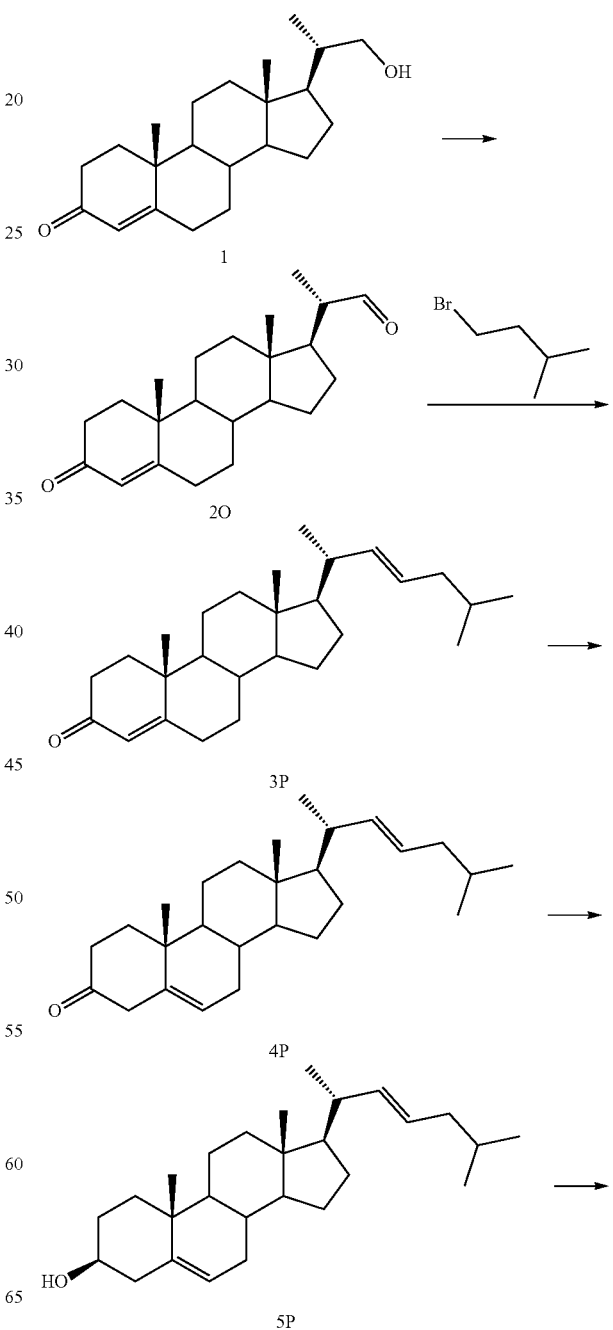

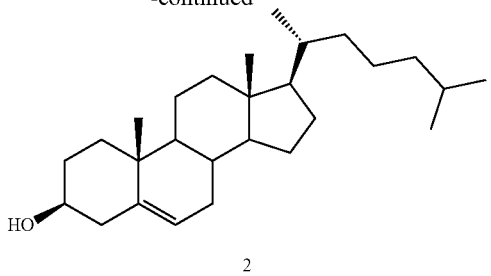

2

Step (1) See Example 8
Step (2) Intermediate 3P 500 mL of toluene was added to a 1000 mL three-necked flask, followed by 110 g of bromoisopentane and 100 g of triphenylphosphine. Under nitrogen protection, the reaction was carried out at 100° C. for 24 h. Filtration was performed. The filter cake was eluted with petroleum ether and squeezed to remove most of the solvent, and Ylide reagent was obtained.

300 mL of DMSO was added to a 1000 mL three-necked flask, followed by the prepared Ylide reagent. Under nitrogen protection, 40 g of potassium tert-butoxide was added. The temperature was controlled at below 10° C., and then 80 g of Intermediate 2O was added. The reaction was carried out at room temperature for 1-2 h. Samples were applied for TLC to observe whether the reaction of the raw materials was completed. If the reaction was not completed, the reaction time was extended until the reaction was completed. 50 mL of water was added dropwise to quench the reaction. The reaction solution was poured into 500 mL of ice water. The aqueous phase was extracted with petroleum ether (400 mL*2), and the organic phases were combined and concentrated. Methanol was added and the organic phase was concentrated to a small volume. The system was stirred, cooled to 0-5° C., crystallized for 1 hour, filtered, and dried at 50° C. The yield was 70%. $^1$H NMR (400 MHz, CDCl$_3$) δ5.62 (s, 1 H), 5.28-5.16 (m, 2 H), 2.50-2.36 (m, 3 H), 2.24-1.75 (m, 6 H), 1.61-1.30 (m, 8 H), 1.26-0.97 (m, 22 H).

Step (3) Intermediate 4P 150 mL of tert-butanol was added to a reaction flask at room temperature, and the system was subjected to nitrogen replacement 3 times. 20 g of potassium tert-butoxide was added. The system was heated to 40° C. and stirred to dissolve to be clear. Under strict nitrogen protection, Intermediate 3P solid was added. After adding, the reaction was maintained at the temperature for 2 h. When the raw materials basically disappeared as monitored by TLC, the reaction was stopped and cooled to room temperature. 10 g of glacial acetic acid and 5 g of sodium ascorbate were added to 200 mL of prepared ice water, and stirred well to prepare buffer 1. The tert-butanol reaction solution was poured into buffer 1 quickly, and a solid was precipitated. The system was continued to be stirred for 20 min and filtered. Intermediate 4P was obtained as a wet solid.

Step (4) Intermediate 5P

The above wet product and 200 mL of ethanol were added to a reaction flask and stirred well. 2.5 g of sodium borohydride was then added and stirred for 2 h. After the reaction was completed, 2 mL of glacial acetic acid was added to quench the reaction. Ethanol was concentrated to a small volume, and 100 mL of water was added for precipitation. After filtration, a crude product of Intermediate 5P was obtained, and Intermediate 5P was obtained by recrystallization from methanol. The yield was 80%, and the purity was 96%. $^1$H NMR (400 MHz, CDCl$_3$) δ5.35 (s, 1 H), 5.17 (d, J=6.8 Hz, 2 H), 3.63-3.38 (m, 1 H), 2.48-2.09 (m, 2 H), 1.93 (m, 6 H), 1.70-1.36 (m, 10 H), 1.22-0.82 (m, 19 H), 0.70 (d, J=11.2 Hz, 3 H).

Step (5) Cholesterol (Compound 2)

10 g of Intermediate 5P was added to a reaction flask, and 25 mL of THF and 25 mL of methanol were added to dissolve. 1 g of palladium on carbon (5%) was added. The system was subjected to nitrogen replacement and then hydrogen replacement by connecting a hydrogen balloon. The system was maintained at 15-20° C. and reacted for 24 h and then filtered. The filter cake was washed with methanol. The filtrate was combined, concentrated under reduced pressure, and added with methanol to continue concentration until all THF was removed. The filtrate was crystalized from methanol. After stirring at room temperature for 1 h, the crystal was filtered and dried, to obtain cholesterol with a weight yield of 85% and a purity of 99%. The $^1$H NMR and $^{13}$C NMR data were basically the same as those determined in Example 1.

Example 10: Influence of Different Reagents Used on Reaction

The acylating agents shown in the following table were used to perform the reactions of step (A) in the first to seventh aspects of the present disclosure to prepare enol ester Intermediate 3A-m and Intermediate 3a-m with different PG groups, which correspond to the compound represented by formula II in the first to seventh aspects of the present disclosure, where m is the serial number and PG is the hydroxyl protecting group. Further, Intermediate 3A-m and Intermediate 3a-m were used as raw materials, and the reagents shown in the following table were used to perform the reaction of step (B) in the first to seventh aspects of the present disclosure to prepare Intermediate 4A and Intermediate 4a, which correspond to the compound represented by formula III in the first to seventh aspects of the present disclosure.

1. Intermediate 4A

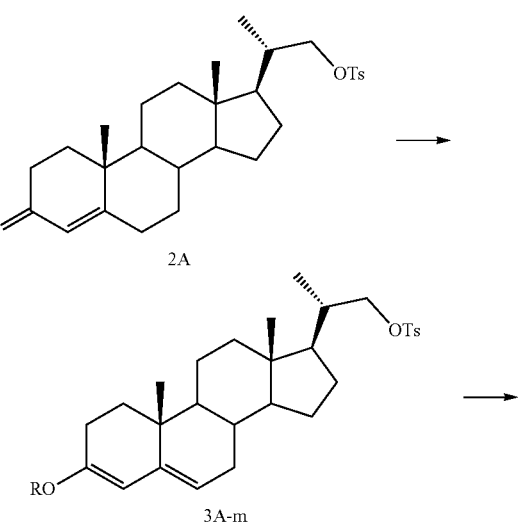

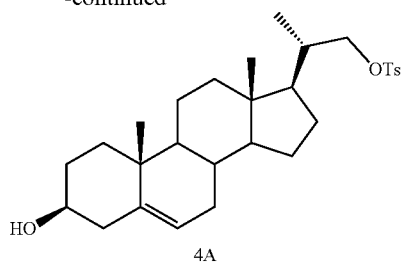

4A (1) Intermediate 2A (20 g) and 40 mL of chloroform were added to a reaction vessel, followed by an acylating agent (8 eq.) and a catalyst p-TsOH (1 g). The system was heated to reflux and reacted for 4-8 h. After the reaction was completed, the system was cooled to 0-20° C., and methanol was slowly added dropwise to quench the reaction. 40 mL of water was added, and the organic phase was separated out and concentrated. Then methanol was added, and the organic phase was continued to be concentrated to a paste, cooled to 0-5° C., stirred for 1 h, filtered, and dried to obtain Intermediate 3A-m. Intermediate 3A-m (1 g), 10 mL of dichloromethane, and 10 mL of methanol were added to a reaction flask. The system was cooled to 0-5° C., and 0.2 g of sodium borohydride was added in three batches (each batch with an interval of 20 min). After the addition, the system was maintained at the temperature and reacted for 12 h. 1 mL of glacial acetic acid was added dropwise to quench the reaction. The reaction solution was concentrated to remove the solvent. 10 mL of water was added and stirred to obtain a mixture, which was then filtered and dried. Intermediate 4A was obtained by silica gel column chromatography separation, and the molar yield was calculated. The results are shown in Table 2.

TABLE 2

| | Influence of different acylating agents on the reaction | | | | |
|---|---|---|---|---|---|
| Serial No. m | Acylating agent | Group R | Molar yield of acylation reaction | Conversion rate of reduction reaction % | Molar yield of 4A % |
| 1 | isopropenyl acetate | acetyl | 96 | >99 | 75 |
| 2 | propionic anhydride | propionyl | 92 | >99 | 56 |
| 3 | trifluoroacetic anhydride | trifluoroacetyl | 95 | 92 | 41 |
| 4 | benzoyl chloride | benzoyl | 92 | >99 | 69 |
| 5 | 4-methylbenzoyl chloride | 4-methylbenzoyl | 94 | >99 | 75 |
| 6 | 4-nitrobenzoyl chloride | 4-nitrobenzoyl | 90 | 83 | 28 |

It can be seen from Table 2 that when the acylating agents therein were used, the conversion rate of the enol esterification reaction was high. When PG was acetyl or benzoyl optionally substituted with alkyl, especially when PG was acetyl, a higher yield of the final product can be achieved.

(2) Intermediate 3A-m (1 g), 10 mL of dichloromethane, and 10 mL of methanol were added to a reaction flask. The system was cooled to 0-5° C., added with $CaCl_2$ or $ZnCl_2$ (0.3 eq.) as needed according to the situation, and added with 0.2 g of sodium borohydride in three batches (each batch with an interval of 10 min). After the addition, the corresponding base (2 eq.) was immediately added. The system was maintained at the temperature and reacted for 12 h. 1 mL of glacial acetic acid was added dropwise to quench the reaction. The reaction solution was concentrated to remove the solvent. 10 mL of water was added and stirred to obtain a mixture, which was then filtered and dried. Intermediate 4A was obtained by silica gel column chromatography separation, and the molar yield was calculated. The results are shown in Table 3.

-continued

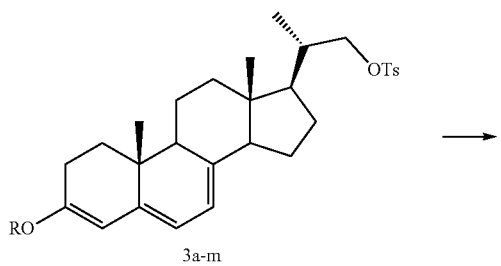

3a-m

TABLE 3

Preparation of Intermediate 4A using different reagents

| Serial No. | Reductant | Base (2 eq.) | Solvent (1:1) | Conversion rate % | Molar yield of 4A % |
| --- | --- | --- | --- | --- | --- |
| 1 | NaBH4 | — | $CH_2Cl_2$/MeOH | >99 | 66 |
| 2 | KBH4 | — | $CH_2Cl_2$/MeOH | 42 | <10 |
| 3 | $NaBH_4$/$CaCl_2$ | — | $CH_2Cl_2$/MeOH | 80 | 40 |
| 4 | $NaBH_4$/$ZnCl_2$ | — | $CH_2Cl_2$/MeOH | 0 | 0 |
| 5 | $NaBH_4$/$CaCl_2$ | — | THF/MeOH | >99 | 71 |
| 6 | $NaBH_4$/$CaCl_2$ | — | MeOH | 72 | 43 |
| 7 | $NaBH_4$/$CaCl_2$ | — | THF/EtOH | >99 | 74 |
| 8 | $NaBH_4$/$CaCl_2$ | Pyridine | THF/MeOH | >99 | 81 |
| 9 | $NaBH_4$/$CaCl_2$ | DMAP | THF/MeOH | >99 | 65 |
| 10 | $NaBH_4$/$CaCl_2$ | NaOH | THF/MeoH | >99 | 60 |

It can be seen from Table 3 that the use of $NaBH_4$/$CaCl_2$ for the reaction can achieve better results in general. When THF was used as a component in a mixed solvent containing alcohol (methanol), the effect was better than using $CH_2Cl_2$. For the base used in the reaction, when DMAP or NaOH was added, the yield was reduced compared to that with no base added (decreased by about 8.5% and 15.5%, respectively); when pyridine was added, the yield was increased by about 14.1% compared to that with no base added.

2. Intermediate 4a

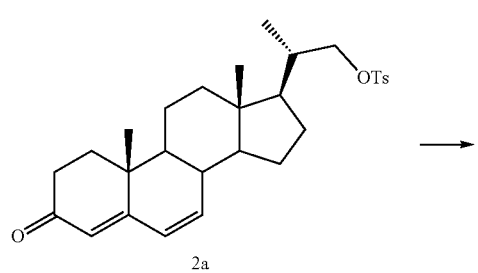

2a

-continued

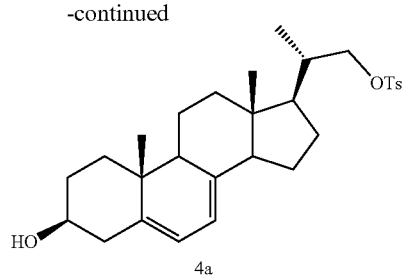

4a

Step (1) Preparation of Intermediate 3a-m

Intermediate 2a (20 g) and 40 mL of 1,2-dichloroethane were added to a reaction vessel, followed by an acylating agent (10 eq.) and a catalyst p-TsOH (2 g). The system was heated to 80° C. and reacted for 6-12 h. After the reaction, the system was cooled to 0-20° C., and methanol was slowly added dropwise to quench the reaction. 60 mL of water was added, and the organic phase was separated out, washed with water and concentrated to remove the solvent. Then ethyl acetate was added. The organic phase was continued to be concentrated to a paste, cooled to 0-5° C., stirred for 1 h, filtered, and dried to obtain an esterified product. Then a reduction reaction was carried out, and the results are shown in Table 4.

TABLE 4

Preparation of enol ester using different acylating agents

| Serial No. m | Acylating agent | Group R | Molar yield of esterification reaction | Conversion rate of reduction reaction % | Molar yield % |
|---|---|---|---|---|---|
| 1 | Acetic anhydride and acetyl chloride | acetyl (CH₃C(O)−) | 91 | 95 | 81 |
| 2 | Propionic anhydride | propionyl (CH₃CH₂C(O)−) | 41 | 69 | 55 |
| 3 | Trifluoroacetic anhydride | trifluoroacetyl (F₃CC(O)−) | 85a | 95 | 77 |
| 4 | Benzoyl chloride | benzoyl | 33 | 43 | 21 |
| 5 | 4-methylbenzoyl chloride | 4-methylbenzoyl | 25 | 40 | 20 |
| 6 | 4-nitrobenzoyl chloride | 4-nitrobenzoyl | 40 | 45 | 17 |

$^a$Pressure reaction

It can be seen from Table 4 that when acetic anhydride/acetyl chloride mixture and trifluoroacetic anhydride were used as the acylating agent, the yield of the acylation reaction was higher.

Step (2) Preparation of Intermediate 4a

Intermediate 3a-m (1 g) and 10 mL of a solvent were added to a reaction flask, and CaCl$_2$ or ZnCl$_2$ (0.1 g) was added as needed according to the situation. The system was cooled to 0-5° C., and added with 0.2 g of sodium borohydride in three batches (each batch with an interval of 10 min). Then the corresponding base (2 eq.) was immediately added. After the addition, the system was maintained at the temperature and reacted for 12 h. 1 mL of glacial acetic acid was added dropwise to quench the reaction. The reaction solution was concentrated to remove the solvent. 10 mL of water was added and stirred to obtain a mixture, which was then filtered and dried. Intermediate 4a was obtained by silica gel column chromatography separation, and the molar yield was calculated. The results are shown in Table 5.

TABLE 5

Preparation of Intermediate 4a using different reagents

| Serial No. | Reductant | Base (2 eq.) | Solvent (1:1) | Conversion rate % | Yield of 4a % |
|---|---|---|---|---|---|
| 1 | NaBH4 | — | THF/MeOH$^a$ | >99 | 54 |
| 2 | NaBH$_4$/ZnCl$_2$ | — | THF/MeOH$^a$ | — | — |
| 3 | NaBH$_4$/CaCl$_2$ | — | THF/MeOH$^a$ | >99 | 55 |
| 4 | NaBH$_4$/CaCl$_2$ | Pyridine | THF/MeOH$^a$ | >99 | 70 |
| 5 | NaBH$_4$/CaCl$_2$ | Pyridine | MeOH$^a$ | 91 | 65 |
| 6 | NaBH$_4$/CaCl$_2$ | Pyridine | THF/EtOH$^a$ | >99 | 74 |
| 7 | NaBH$_4$/CaCl$_2$ | Pyridine | THF/i-PrOH$^a$ | 87 | 58 |
| 8 | NaBH$_4$/CaCl$_2$ | Pyridine | THF/EtOH/i-PrOH$^b$ | >99 | 86 |
| 9 | NaBH$_4$/CaCl$_2$ | Pyridine | THF/EtOH/MeOH$^c$ | >99 | 71 |

$^a$(1:1); $^b$THF/EtOH/i-PrOH = (1:0.5:0.5); $^c$THF/EtOH/MeOH = (1:0.5:0.5)

It can be seen from Table 5 that the use of NaBH₄/CaCl₂ for the reaction can achieve better results, which was better than or equivalent to the use of NaBH₄ alone. The type of alcohol contained in the alcohol-containing mixed solvent has a certain effect on the reaction. Among the tested mixed solvents, tetrahydrofuran/ethanol/isopropanol achieved the best effect. Using mixed ethanol/isopropanol (e.g. 1:1 mixed ethanol/isopropanol) as the alcohol component contained in the alcohol-containing mixed solvent, the yield was increased by 10.8% and 48.3% respectively compared with using ethanol or isopropanol alone. The inventors unexpectedly found that using mixed ethanol/isopropanol as the alcohol component in the mixed solvent can greatly increase the yield of the reaction.

The invention claimed is:

1. A method for preparing a compound represented by formula III, comprising:
    step (1): converting a compound represented by formula ii to a compound represented by formula a;

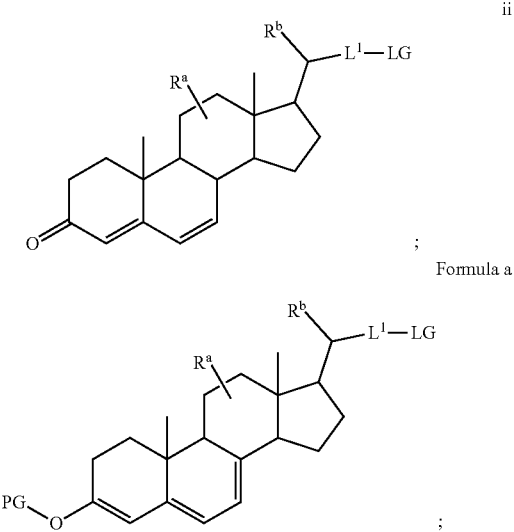

Formula a step (2): reducing the compound represented by formula a to a compound represented by formula b under the action of sodium borohydride, calcium chloride and pyridine;

Formula b

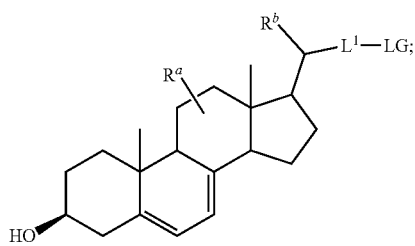

step (3): converting the compound represented by formula b to a compound represented by formula III;

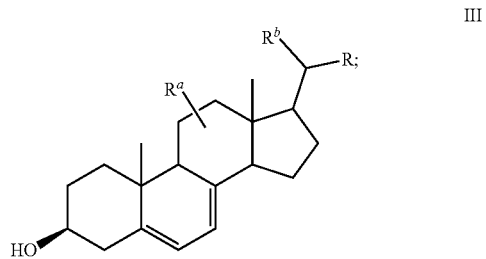

III wherein,
" ≈≈≈≈ " in formula ii, formula a, formula b, and formula III represents a single bond concurrently, or
" ≈≈≈≈ " in formula ii, formula a, formula b, and formula III represents a double bond concurrently, or
" ≈≈≈≈ " in formula ii represents a single bond or a double bond, and in formula a, formula b and formula III represents a double bond;
$R^a$ and $R^b$ are each independently selected from H, —OH, $C_{1-3}$ alkyl;
PG is a hydroxy protecting group, preferably $C_{1-8}$ silyl, acetyl, trifluoroacetyl, or benzoyl optionally substituted with one or more $C_{1-8}$ alkyl;
R is $L^1$-$R^1$;
$L^1$ is null, or $C_{1-8}$ alkylene;
LG is a leaving group;
$R^1$ is selected from H, $C_{1-8}$ alkyl, $C_{1-8}$ alkenyl, —OH, —O($C_{1-8}$ alkyl), —O-$PG^1$, —C(=O)O($C_{1-8}$ alkyl), —C(=O)N($C_{1-8}$ alkyl)₂, wherein the alkyl or alkenyl is optionally substituted with 1, 2 or 3 groups selected from —OH, —O($C_{1-8}$ alkyl), —O-$PG^1$, —C(=O)O ($C_{1-8}$ alkyl) and —C(=O)N($C_{1-8}$ alkyl)₂;
$PG^1$ is a hydroxyl protecting group, preferably selected from $C_{1-8}$ silyl or a $C_{1-6}$ alkoxy substituted methyl group.

2. The method according to claim 1, wherein in the step (2), the compound represented by formula a is reduced to the compound represented by formula b in a mixed solvent of alcohol and tetrahydrofuran under the action of sodium borohydride, calcium chloride and pyridine.

3. The method according to claim 2, wherein the alcohol is selected from one or more of methanol, ethanol and isopropanol.

4. The method according to claim 2, wherein a volume ratio of the alcohol to the tetrahydrofuran is 1-2:1.

5. The method according to claim 3, wherein the alcohol is selected from ethanol and isopropanol, and a volume ratio of the ethanol to the isopropanol is 1:1.

6. The method according to claim 1, wherein PG is selected from acetyl, p-benzoyl or trifluoroacetyl;
LG is selected from a $C_{1-6}$ alkylsulfonate leaving group substituted by halogen, a benzenesulfonate leaving group optionally substituted with $C_{1-6}$ alkyl, or halogen.

7. The method according to claim 4, wherein the alcohol is selected from ethanol and isopropanol, and a volume ratio of the ethanol to the isopropanol is 1:1.

* * * * *